US012663626B2

(12) United States Patent
Uchida et al.

(10) Patent No.: US 12,663,626 B2
(45) Date of Patent: Jun. 23, 2026

(54) OPTICAL SYSTEM, IMAGE PROJECTION APPARATUS, AND IMAGING APPARATUS

(71) Applicant: Panasonic Intellectual Property Management Co., Ltd., Osaka (JP)

(72) Inventors: Tsuneo Uchida, Chiba (JP); Satoshi Kuzuhara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 250 days.

(21) Appl. No.: 18/679,937

(22) Filed: May 31, 2024

(65) Prior Publication Data

US 2024/0319485 A1     Sep. 26, 2024

Related U.S. Application Data

(63) Continuation of application No. PCT/JP2022/037159, filed on Oct. 4, 2022.

(30) Foreign Application Priority Data

Dec. 21, 2021     (JP) ................................ 2021-207312

(51) Int. Cl.
   *G02B 17/08*          (2006.01)
   *G02B 13/16*          (2006.01)
(52) U.S. Cl.
   CPC ......... *G02B 17/0816* (2013.01); *G02B 13/16* (2013.01)
(58) Field of Classification Search
   None
   See application file for complete search history.

(56) References Cited

U.S. PATENT DOCUMENTS

| | | | |
|---|---|---|---|
| 2020/0033574 A1 | 1/2020 | Morikuni | |
| 2020/0033715 A1 | 1/2020 | Morikuni | |

(Continued)

FOREIGN PATENT DOCUMENTS

| | | |
|---|---|---|
| JP | 9-222561 | 8/1997 |
| JP | 2006-154364 | 6/2006 |

(Continued)

OTHER PUBLICATIONS

International Preliminary Report on Patentability issued Jun. 20, 2024 in International (PCT) Application No. PCT/JP2022/037159.

(Continued)

*Primary Examiner* — James C. Jones
(74) *Attorney, Agent, or Firm* — Wenderoth, Lind & Ponack, L.L.P.

(57)                ABSTRACT

The present disclosure is directed to an optical system having a reduction conjugate point on a reduction side and a magnification conjugate point on a magnification side, and internally having an intermediate imaging position having a conjugate relationship with each of the reduction conjugate point and the magnification conjugate point, the optical system including: a prism provided on the magnification side, the prism formed of a transparent medium; and a sub-optical system provided between the reduction conjugate point and the prism, the sub-optical system, wherein the prism includes a first transmission surface positioned on the reduction side, a second transmission surface positioned on the magnification side, and at least one reflection surface positioned therebetween, wherein the following Expression is satisfied:

$$0.40 < \left(TN - \left((NI - 1)/8\right)\right)/PN^2 < 0.64.$$

19 Claims, 27 Drawing Sheets

(56)         References Cited

U.S. PATENT DOCUMENTS

| | | | |
|---|---|---|---|
| 2021/0033829 A1 | 2/2021 | Ishigame | |
| 2022/0082805 A1 | 3/2022 | Uchida et al. | |
| 2023/0288685 A1* | 9/2023 | Uchida ................. | G02B 13/16 |

FOREIGN PATENT DOCUMENTS

| | | |
|---|---|---|
| JP | 2019-133061 | 8/2019 |
| JP | 2020-20860 | 2/2020 |
| JP | 2020-24377 | 2/2020 |
| JP | 2020-42103 | 3/2020 |
| WO | 2020/240899 | 12/2020 |

OTHER PUBLICATIONS

Extended European Search Report issued Apr. 7, 2025 in corresponding European Patent Application No. 22910516.8.
International Search Report issued Dec. 20, 2022 in International (PCT) Application No. PCT/JP2022/037159.

\* cited by examiner

Fig. 6B
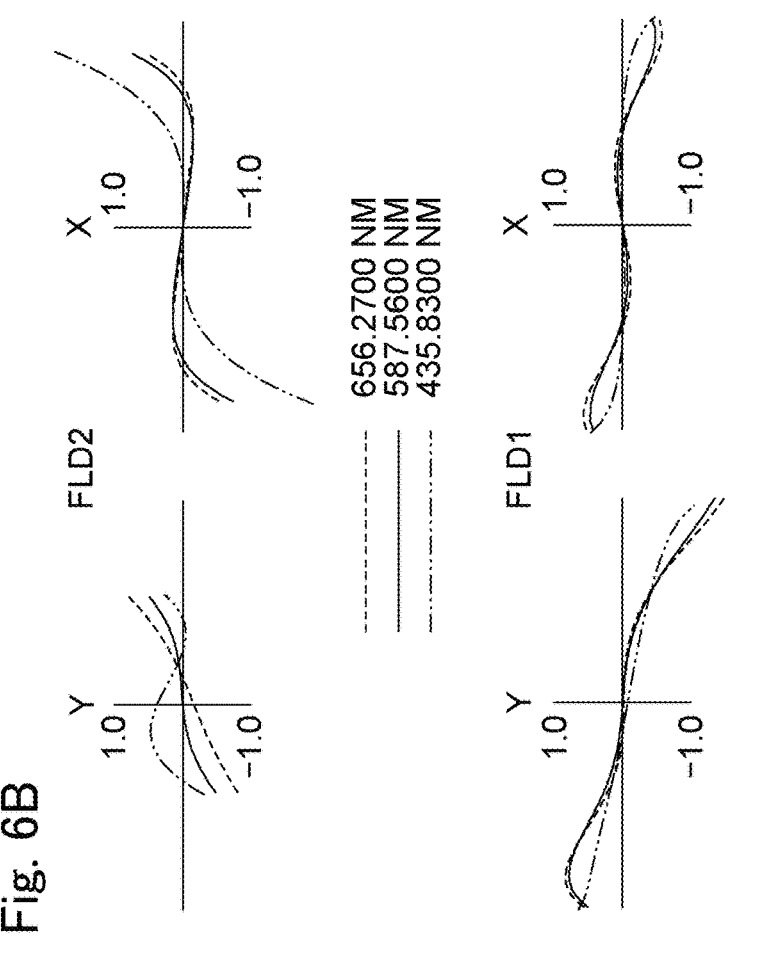
FLD2
FLD1
656.2700 NM
587.5600 NM
435.8300 NM
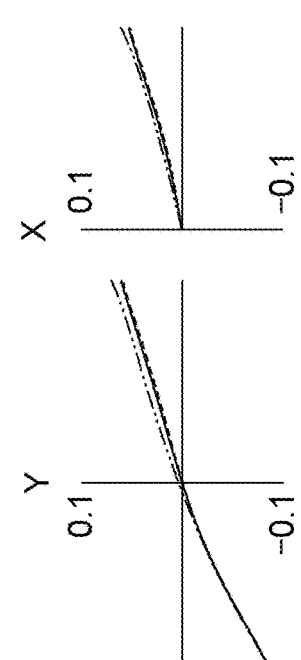
Fig. 6C
Fig. 6A
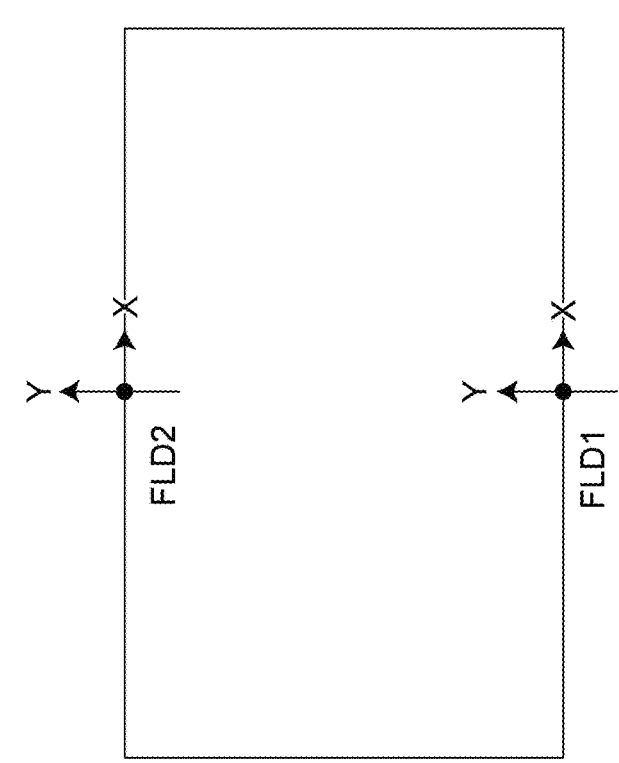
FLD2
FLD1

Fig. 8B
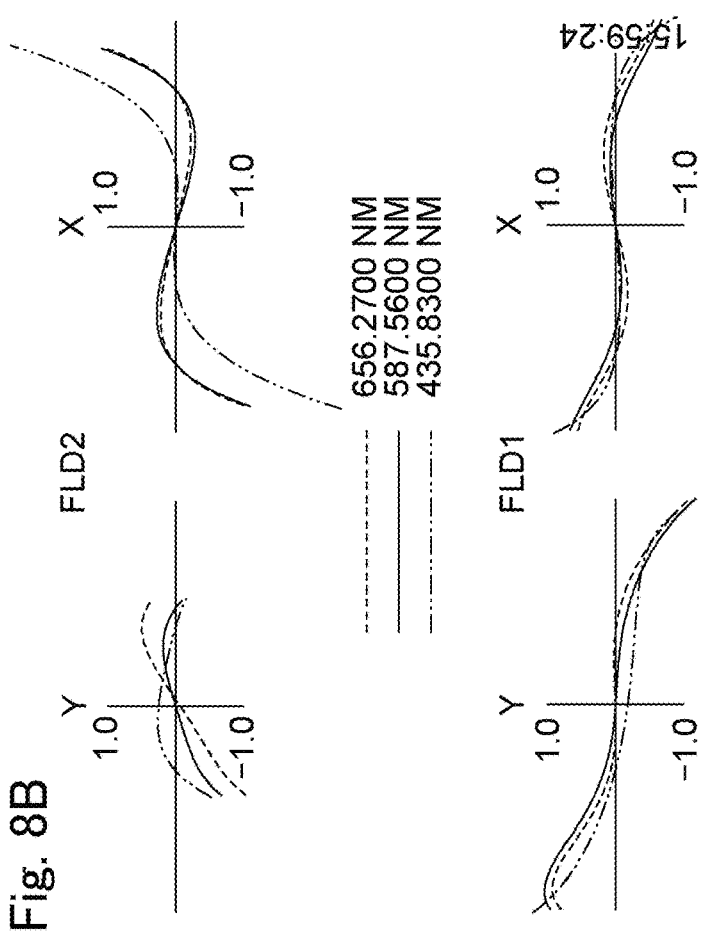
656.2700 NM
587.5600 NM
435.8300 NM
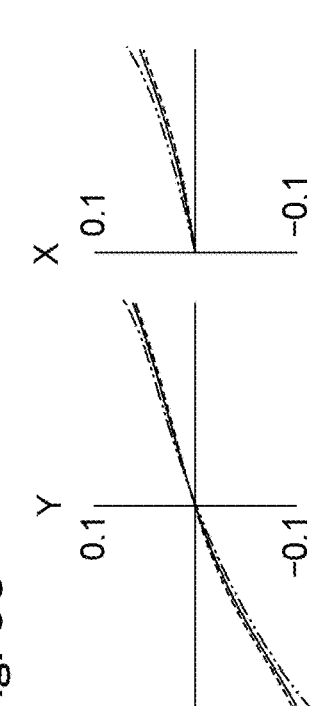
Fig. 8C
Fig. 8A
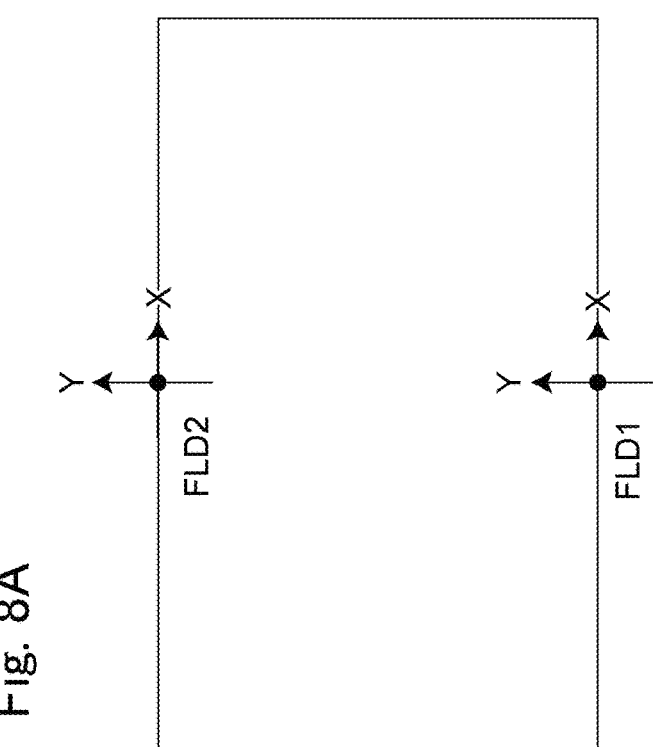

656.2700 NM
587.5600 NM
435.8300 NM

FLD1

FLD2

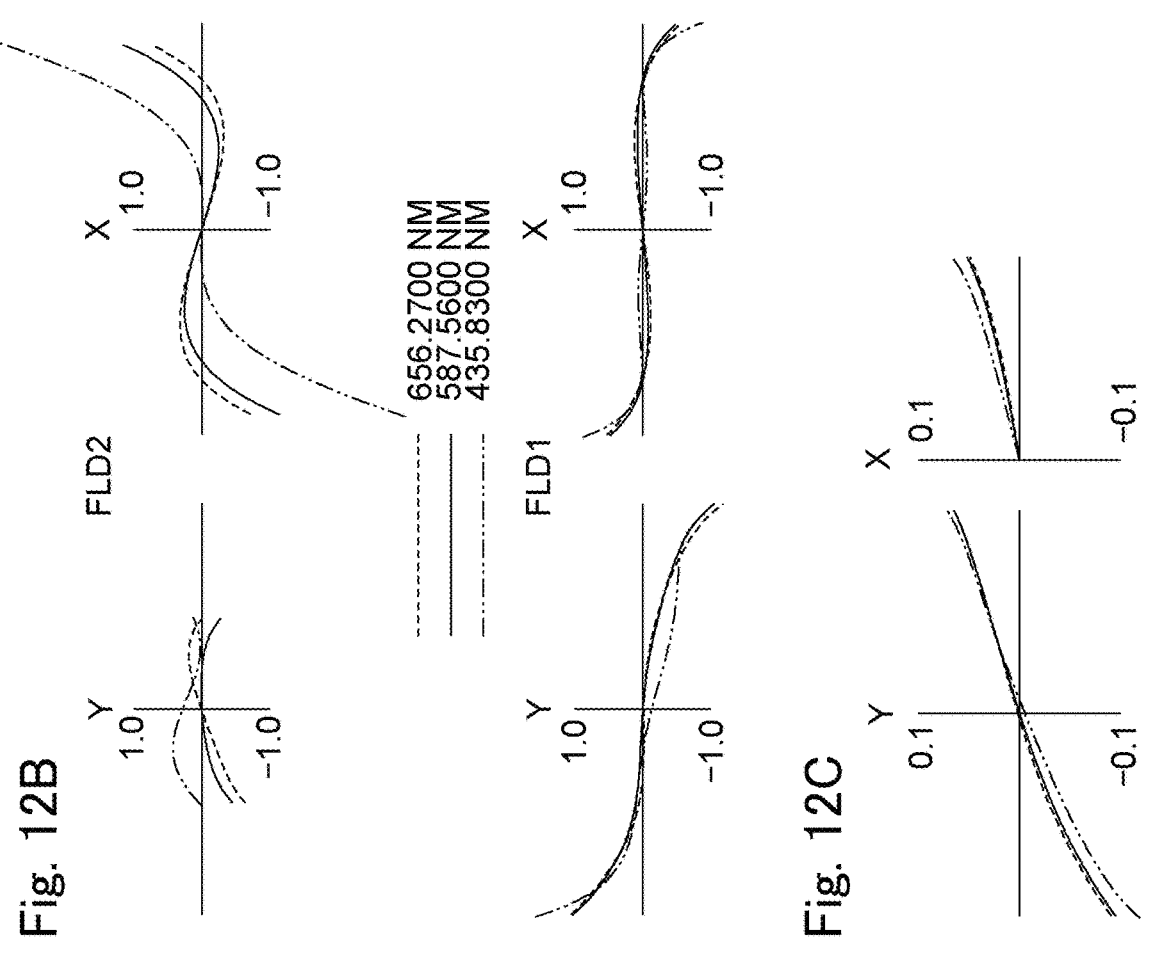
Fig. 12B
Fig. 12C
656.2700 NM
587.5600 NM
435.8300 NM
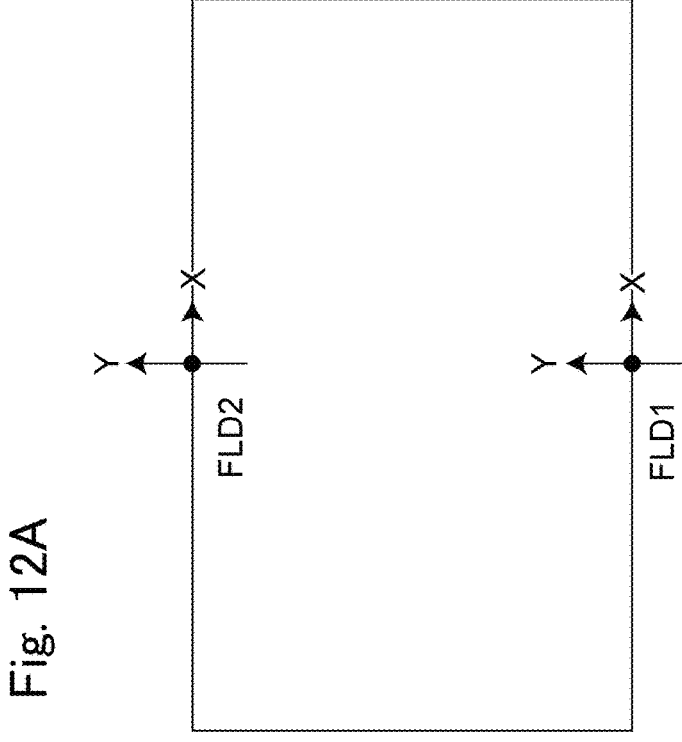
Fig. 12A 656.2700 NM
587.5600 NM
435.8300 NM

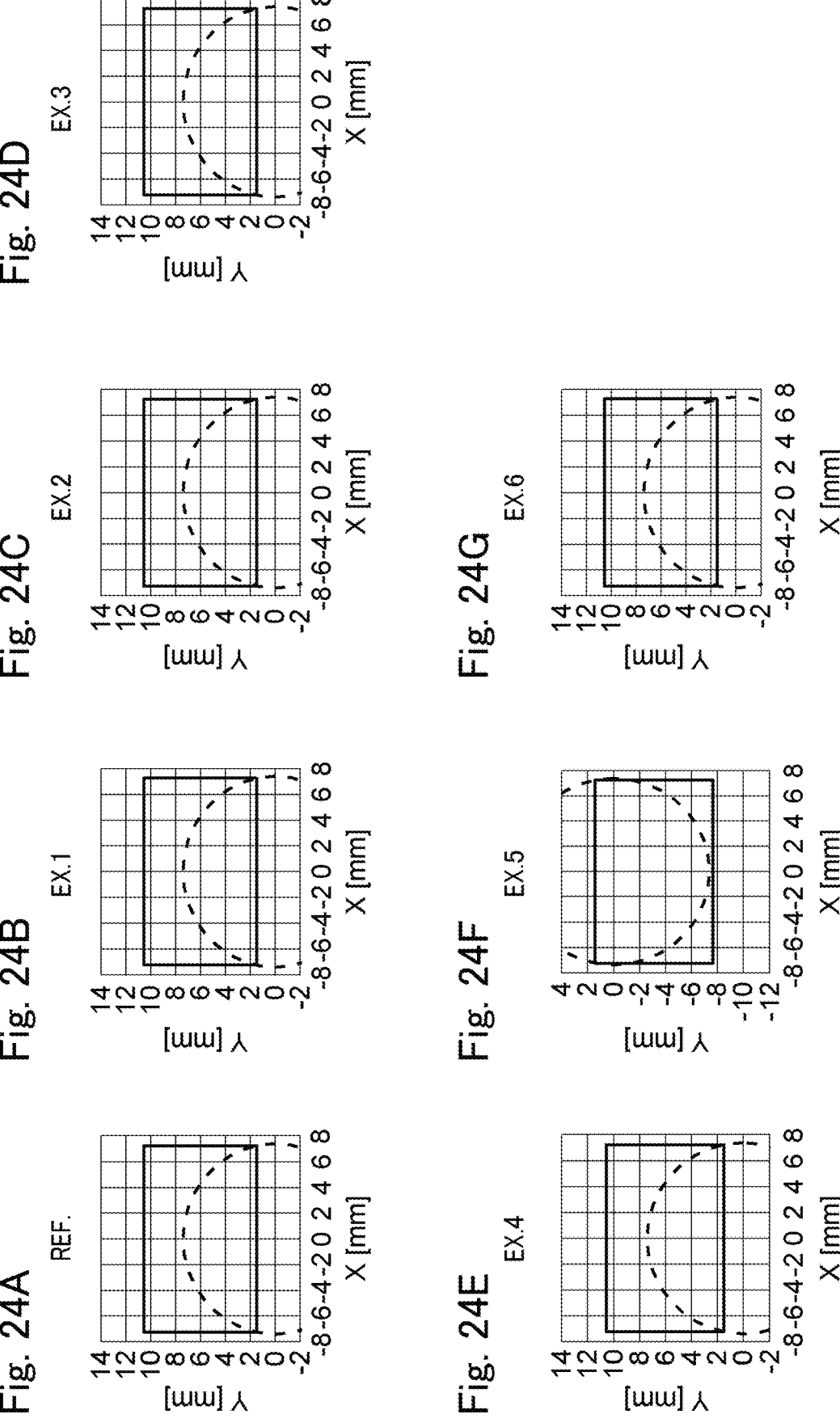

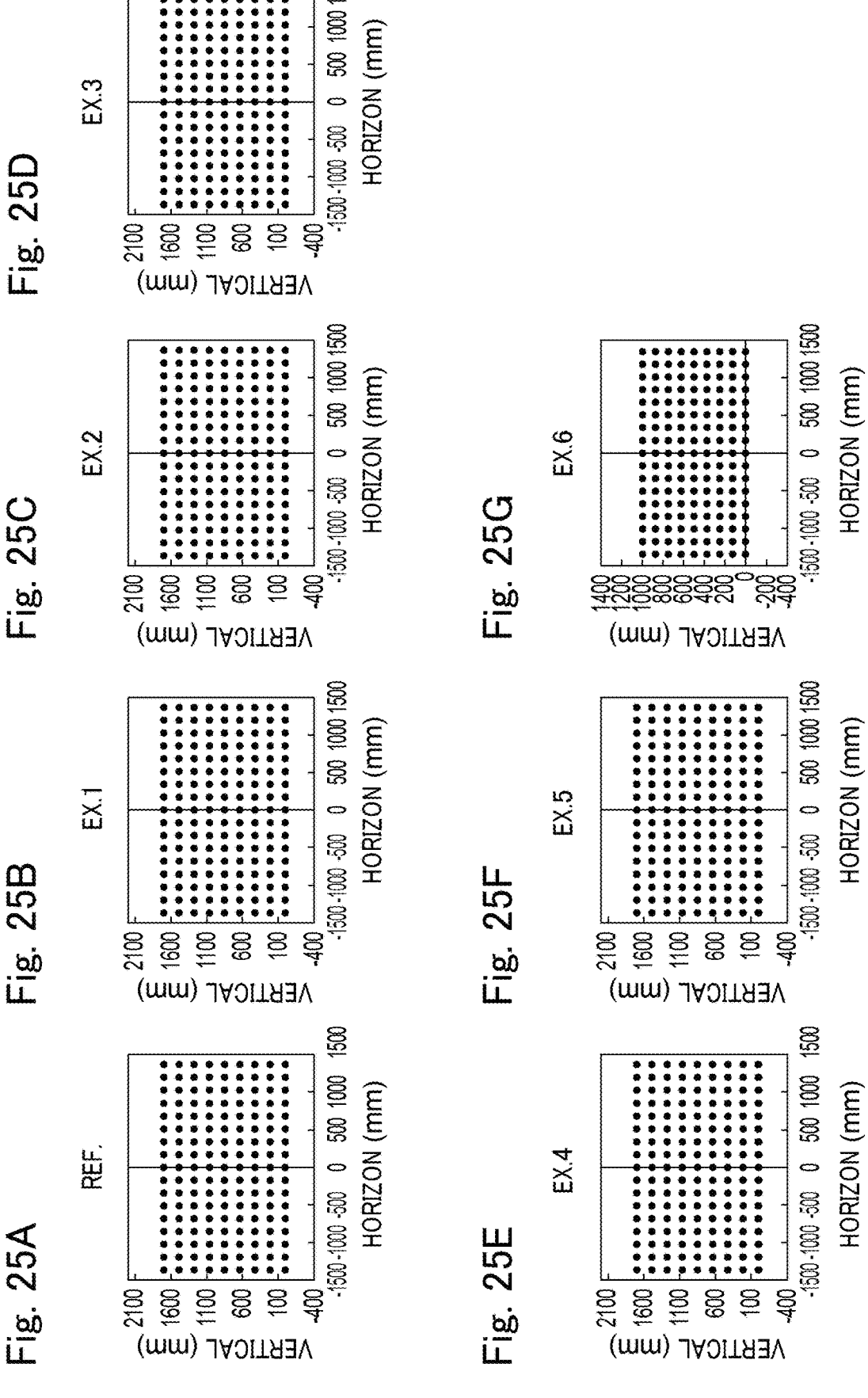

OPTICAL SYSTEM, IMAGE PROJECTION APPARATUS, AND IMAGING APPARATUS

CROSS-REFERENCE TO RELATED APPLICATIONS

This application is a continuation of International Patent Application No. PCT/JP2022/037159, filed on Oct. 4, 2022, which claims the benefit of Japanese Patent Application No. 2021-207312, filed on Dec. 21, 2021, the contents all of which are incorporated herein by reference.

TECHNICAL FIELD

The present disclosure relates to an optical system using a prism. The present disclosure also relates to an image projection apparatus and an imaging apparatus using such an optical system.

BACKGROUND

Patent Documents 1 to 4 disclose a projection optical system including a refractive and reflective optical element on which a transmission surface and a reflection surface are integrated, wherein any one of the transmission and reflection surfaces may be aspherical.

PATENT DOCUMENT

[Patent Document 1] JP 2019-133061 A
[Patent Document 2] JP 2020-020860 A
[Patent Document 3] JP 2020-024377 A
[Patent Document 4] JP 2020-042103 A

SUMMARY

The present disclosure provides an optical system which can realize projection or imaging with a shorter focal length and a larger-sized screen and can be reduced in size. The present disclosure also provides an image projection apparatus and an imaging apparatus using such an optical system.

One aspect of the present disclosure is directed to an optical system having a reduction conjugate point on a reduction side and a magnification conjugate point on a magnification side, and internally has an intermediate imaging position having a conjugate relationship with each of the reduction conjugate point and the magnification conjugate point. The optical system includes: a prism provided on the magnification side, the prism formed of a transparent medium; and a sub-optical system provided between the reduction conjugate point and the prism, the sub-optical system including a plurality of optical elements and an aperture stop. The prism includes a first transmission surface positioned on the reduction side, a second transmission surface positioned on the magnification side, and at least one reflection surface positioned on an optical path between the first transmission surface and the second transmission surface. The aperture stop is positioned between the reduction conjugate point and the intermediate imaging position. A first reflection surface closest to the first transmission surface on the optical path in the prism has a shape with a concave surface facing a direction into which a light ray made incident on the first reflection surface is reflected. The second transmission surface has a shape with a convex surface facing the magnification side. A part or the whole of an intermediate image formed at the intermediate imaging position is positioned inside a medium of the prism. The optical system satisfies the following Expression (1):

$$0.40 < (TN - ((NI - 1)/8))/PN^2 < 0.64 \tag{1}$$

where TN represents an average of d-line refractive indexes of positive lenses included in the sub-optical system, NI represents the number of intermediate images, and PN represents a d-line refractive index of the prism.

Another aspect of the present disclosure is directed to an optical system having a reduction conjugate point on a reduction side and a magnification conjugate point on a magnification side, and internally has an intermediate imaging position IM having a conjugate relationship with each of the reduction conjugate point and the magnification conjugate point. The optical system includes: a prism provided on the magnification side, the prism formed of a transparent medium; and a sub-optical system provided between the reduction conjugate point and the prism, the sub-optical system including a plurality of optical elements and an aperture stop. The prism includes a first transmission surface positioned on the reduction side, a second transmission surface positioned on the magnification side, and at least one reflection surface positioned on an optical path between the first transmission surface and the second transmission surface. The aperture stop is positioned between the reduction conjugate point and the intermediate imaging position. A first reflection surface closest to the first transmission surface on the optical path in the prism has a shape with a concave surface facing a direction into which a light ray made incident on the first reflection surface is reflected. The second transmission surface has a shape with a convex surface facing the magnification side. A part or the whole of an intermediate image formed at the intermediate imaging position is positioned inside a medium of the prism. The optical system satisfies the following Expression (2):

$$PN > 1.60 \tag{2}$$

where PN represents a d-line refractive index of the prism.

Further, an image projection apparatus according to another aspect of the present disclosure includes the above-described optical system and an image forming element that generates an image to be projected through the optical system onto a screen.

Still further, an imaging apparatus according to another aspect of the present disclosure includes the above-described optical system and an imaging element that receives an optical image formed by the optical system to convert the optical image into an electrical image signal.

In the optical system according to the present disclosure, projection or imaging with a shorter focal length and a larger-sized screen can be realized and can be reduced in size.

BRIEF DESCRIPTION OF THE DRAWINGS

FIG. 6A is an explanatory diagram showing a position FLD1 closest to the optical system and a position FLD2 farthest from the optical system among the magnification conjugate points in the optical system 1 according to Example 1, and FIG. 6B shows lateral aberration diagrams of the reference light ray at positions FLD1 and FLD2 in the optical system 1 according to Example 1, and FIG. 6C shows lateral aberration diagrams of the reference light ray at the intermediate imaging position IM in the optical system 1 according to Example 1.

FIG. 8A is an explanatory diagram showing a position FLD1 closest to the optical system and a position FLD2 farthest from the optical system among the magnification conjugate points in the optical system 1 according to Example 2, and FIG. 8B shows lateral aberration diagrams of the reference light ray at positions FLD1 and FLD2 in the optical system 1 according to Example 2, and FIG. 8C shows lateral aberration diagrams of the reference light ray at the intermediate imaging position IM in the optical system 1 according to Example 2.

FIG. 12A is an explanatory diagram showing a position FLD1 closest to the optical system and a position FLD2 farthest from the optical system among the magnification conjugate points in the optical system 1 according to Example 4. FIG. 12B shows lateral aberration diagrams of the reference light ray at positions FLD1 and FLD2 in the optical system 1 according to Example 4. FIG. 12C shows lateral aberration diagrams of the reference light ray at the intermediate imaging position IM in the optical system 1 according to Example 4.

FIGS. 24A to 24G are graphs showing the shapes of the rectangular region and the concentric circle at the reduction conjugate point in Numerical Reference and Numerical Examples 1 to 6.

FIGS. 25A to 25G are graphs showing the shape of distortion at the conjugate point on the magnification side due to the distortion of the optical system according to the Numerical Reference and Numerical Examples 1 to 6.

DETAILED DESCRIPTION

Hereinafter, embodiments are described in detail with reference to the drawings as appropriate. However, unnecessarily detailed descriptions may be omitted. For example, detailed descriptions of well-known items or redundant descriptions of substantially the same configurations may be omitted. This is to prevent the following description from being unnecessarily redundant and to facilitate understanding by those skilled in the art.

It should be noted that the applicant provides the accompanying drawings and the following description for those skilled in the art to fully understand the present disclosure, and it is not intended to limit the subject matter described in the claims thereby.

Each example of an optical system according to the present disclosure is described below. In each example, described is an example in which the optical system is used in a projector (an example of an image projection apparatus) that projects onto a screen image light of an original image SA obtained by spatially modulating incident light using an image forming element, such as liquid crystal or digital micromirror device (DMD), based on an image signal. In other words, the optical system according to the present disclosure can be used for magnifying the original image SA on the image forming element arranged on the reduction side to project the image onto the screen (not shown), which is arranged on an extension line on the magnification side. However, a projection surface is not limited to the screen. Examples of the projection surface includes walls, ceilings, floors, windows, etc. in houses, stores, or vehicles and airplanes used as means for transportation.

Further, the optical system according to the present disclosure can also be used for collecting light emitted from an object located on the extension line on the magnification side to form an optical image of the object on an imaging surface of an imaging element arranged on the reduction side.

First Embodiment

Hereinafter, an optical system according to a first embodiment of the present disclosure will be described with reference to FIGS. 1 to 26. First, an optical system 1 according to a reference example serving as a premise of the present disclosure will be described.

Reference Example

Figures 2A, 2B:
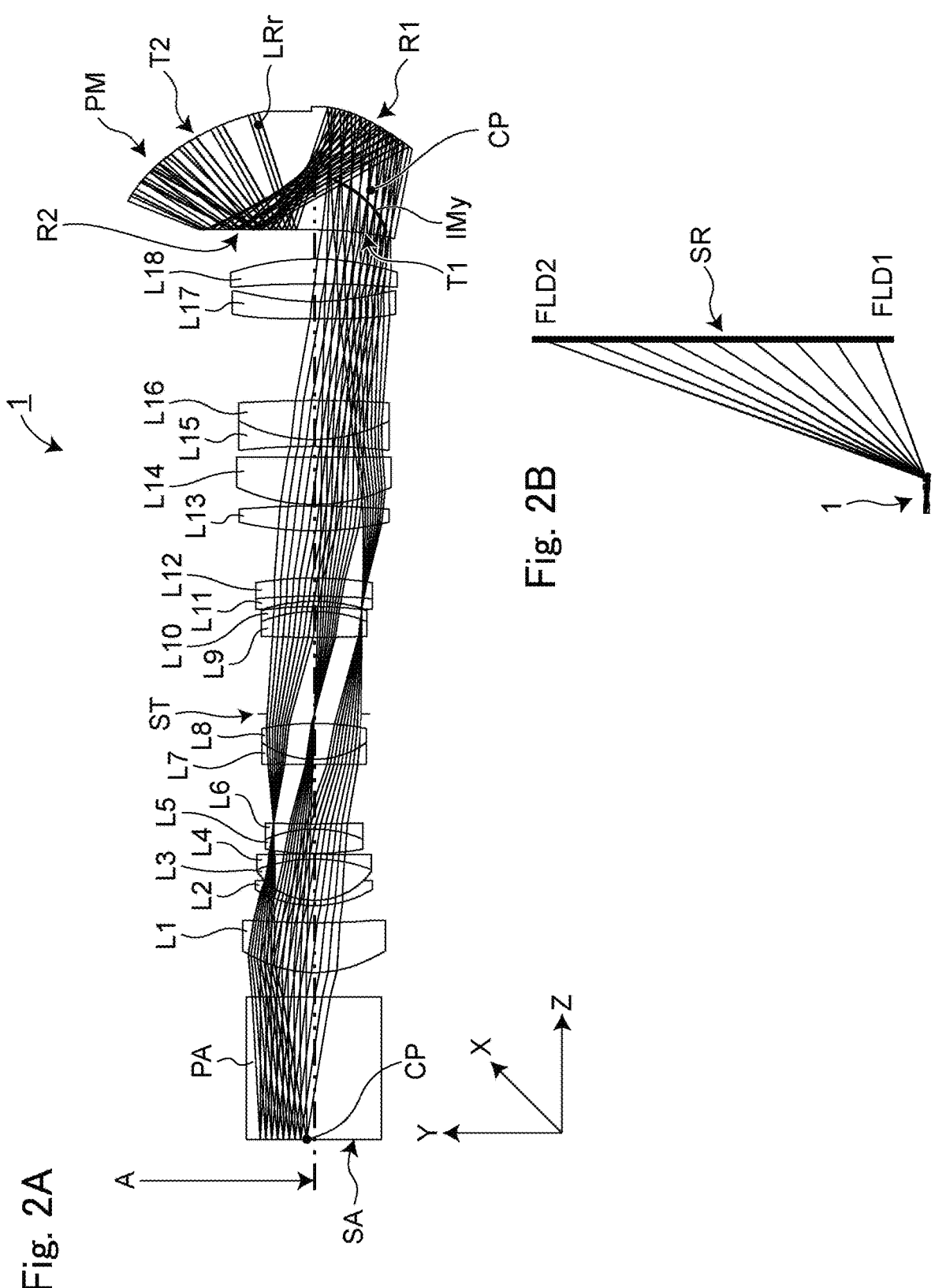
FIG. 2A is an arrangement diagram showing an optical system 1 according to a reference example.
FIG. 2B is an explanatory diagram showing the usage mode of the image projection apparatus using the optical system 1 according to the reference example.

FIG. 2A is an arrangement diagram showing an optical system 1 according to a reference example. The optical system 1 has a reduction conjugate point on the reduction side positioned on the left side of the figure and a magnification conjugate point on the magnification side positioned on the right side of the figure. The optical system 1 includes a prism PM provided on the magnification side and formed of a transparent medium, and a sub-optical system provided between the reduction conjugate point and the prism PM and having a plurality of optical elements L1 to L18 and an aperture stop ST.

The image region at the reduction conjugate point is defined as a rectangular region having a longitudinal direction (X-direction) and a lateral direction (Y-direction) and has an image forming relationship that is optically conjugate with an image region at the magnification conjugate point. A light ray travels along a normal direction (Z-direction) of this rectangular region. This rectangular region has an aspect ratio of, such as 3:2, 4:3, 16:9, 16:10, 256:135, etc., corresponding to an image display region of an image forming element in the case of an image projection apparatus, or to an imaging region of an imaging element in the case of an imaging apparatus.

In addition, an intermediate imaging position that is conjugate with both of the reduction conjugate point and the magnification conjugate point is positioned inside the optical system 1. This intermediate imaging position is shown as a Y-direction intermediate image IMy in FIG. 2A, but an X-direction intermediate image IMx is omitted in illustration.

The sub-optical system includes an optical element PA and lens elements L1 to L18 in order from the reduction side to the magnification side. The optical element PA represents different optical elements, such as a total internal reflection (TIR) prism, a prism for color separation and color composition, an optical filter, a flat-parallel glass plate, a crystal low-pass filter, or an infrared cut filter. The end surface on the reduction side of the optical element PA is provided with the reduction conjugate point, and the original image SA is located thereon (surface 1). It should be noted that regarding the surface number, refer to numerical examples described later.

The optical element PA has two parallel and flat transmission surfaces (surfaces 2 and 3). The lens element L1 has a positive meniscus shape with the convex surfaces facing the reduction side (surfaces 4 and 5). The lens element L2 has a negative meniscus shape with the convex surfaces facing the reduction side (surfaces 6 and 7). The lens element L3 has a biconvex shape (surfaces 7 and 8). The lens element L4 has a negative meniscus shape with the convex surfaces facing the magnification side (surfaces 8 and 9). The lens elements L2 to L4 are bonded to each other to constitute a compound lens. The lens element L5 has a biconvex shape (surfaces 10 and 11). The lens element L6 has a biconcave shape (surfaces 11 and 12). The lens elements L5 and L6 are bonded to each other to constitute a compound lens. The lens element L7 has a negative meniscus shape with the convex surfaces facing the reduction side (surfaces 13 and 14). The lens element L8 has a biconvex shape (surfaces 14 and 15). The lens elements L7 and L8 are bonded to each other to constitute a compound lens.

The aperture stop ST defines a range in which a light flux can pass through the optical system 1 and is positioned between the reduction conjugate point and the above-described intermediate imaging position. As an example, the aperture stop ST is positioned between the lens element L8 and the lens element L9 (surface 16).

The lens element L9 has a biconvex shape (surfaces 17 and 18). The lens element L10 has a negative meniscus shape with the convex surfaces facing the magnification side (surfaces 18 and 19). The lens elements L9 and L10 are bonded to each other to constitute a compound lens. The lens element L11 has a negative meniscus shape with the convex surfaces facing the magnification side (surfaces 20 and 21). The lens element L12 has a positive meniscus shape with the convex surfaces facing the magnification side (surfaces 21 and 22). The lens elements L11 and L12 are bonded to each other to constitute a compound lens. The lens element L13 has a biconvex shape (surfaces 23 and 24). The lens element L14 has a biconvex shape (surfaces 25 and 26). The lens element L15 has a biconcave shape (surfaces 27 and 28). The lens element L16 has a biconvex shape (surfaces 28 and 29). The lens elements L15 and L16 are bonded to each other to constitute a compound lens. The lens element L17 has a negative meniscus shape with the convex surfaces facing the reduction side (surfaces 30 and 31). The lens element L18 has a positive meniscus shape with the convex surfaces facing the magnification side (surfaces 32 and 33).

The prism PM can be formed of a transparent medium, for example, glass, synthetic resin, or the like. The prism PM has a first transmission surface T1 positioned on the reduction side, a second transmission surface T2 positioned on the magnification side, and two of a first reflection surface R1 and a second reflection surface R2 positioned on the optical path between the first transmission surface T1 and the second transmission surface T2. The first transmission surface T1 has a free-form surface shape with the concave surface facing the reduction side (surface 34). The first reflection surface R1 has a free-form surface shape with the concave surface facing a direction into which a light ray made incident on the first reflection surface R1 is reflected (surface 35). The second reflection surface R2 has a planar shape (surface 36). The second transmission surface T2 has a free-form surface shape with the convex surface facing the magnification side (surface 37).

FIG. 2B is an explanatory diagram showing the usage mode of the image projection apparatus using the optical system 1 according to the reference example. The image projection apparatus including the optical system 1 is horizontally located on a support table such as a table or on a floor. The screen SR is installed vertically above at a position spaced away from the support table by a relatively short horizontal distance, for example, 0.7 m. The light generated from the optical system 1 is projected forward and obliquely upward to achieve the projection of a short focal length and a large screen. Therefore, a space in which people can move can be ensured in front of the screen SR, and a degree of freedom in the installation of the image projection apparatus can be increased.

Figures 3A, 3B:
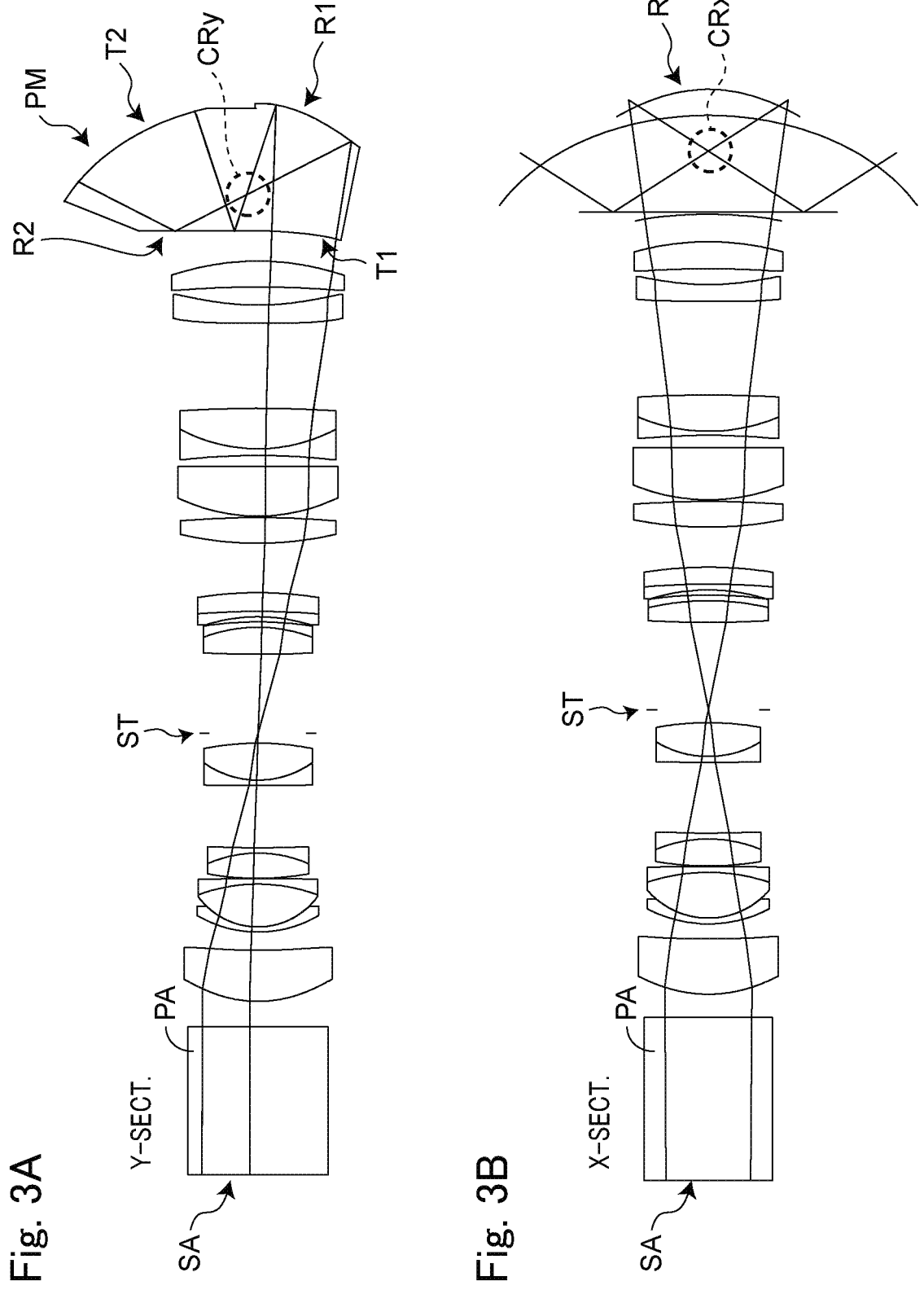
FIG. 3A is a Y cross-sectional view showing an optical path through which a principal ray passes in the optical system 1 according to the reference example.
FIG. 3B is an X cross-sectional view when the optical system 1 is viewed from above.

FIG. 3A is a Y cross-sectional view showing an optical path through which a principal ray passes in the optical system 1 according to the reference example, and FIG. 3B is an X cross-sectional view when the optical system 1 is viewed from above. The principal ray is defined as "a light ray passing through the center of the aperture stop or a light ray passing through midpoint from both end portions of the aperture stop in any cross-section". For the sake of clarity, FIG. 3A shows a principal ray passing through the center in the X-direction of the original image SA and passing through the lowermost portion in the Y-direction (normalized height Y=0.0 at the reduction conjugate point), and a principal ray passing through the center in the X-direction of the original image SA and passing through the uppermost portion in the Y-direction (normalized height Y=1.0 at the reduction conjugate point). Both of the principal rays pass through the sub-optical system, and then through the transmission surface T1 into the inside of the prism PM, and subsequently reflected by the reflection surface R1, and then intersect with each other in a region CRy indicated by a dash line circle before reaching the reflection surface R2.

For the sake of clarity, FIG. 3B shows a principal ray passing through a left-end portion in the X-direction of the original image SA and a principal ray passing through a right-end portion in the X-direction of the original image SA. Both of the principal rays pass through the sub-optical system, and then through the transmission surface T1 into the inside of the prism PM, and subsequently reflected by the reflection surface R1, and intersect with each other in a region CRx indicated by a dash line circle before reaching the reflection surface R2.

The curvature shape of the free-form surface of the reflection surface R1 is designed so that, as shown in FIG. 3A, when viewed from a direction perpendicular to the Y cross-section, some of the plurality of principal rays passing through the reduction conjugate point intersect with each other on the optical path between the reflection surface R1 and the transmission surface T2 and so that, as shown in FIG. 3B, when viewed from a direction perpendicular to the X cross-section, some of the plurality of principal rays passing through the reduction conjugate point intersect with each other on the optical path between the reflection surface R1 and the transmission surface T2. With such a configuration, the sub-optical system can be reduced in size using a small prism, and projection or imaging of a short focal length and a large screen can be performed.

Figures 4A, 4B, 4C:
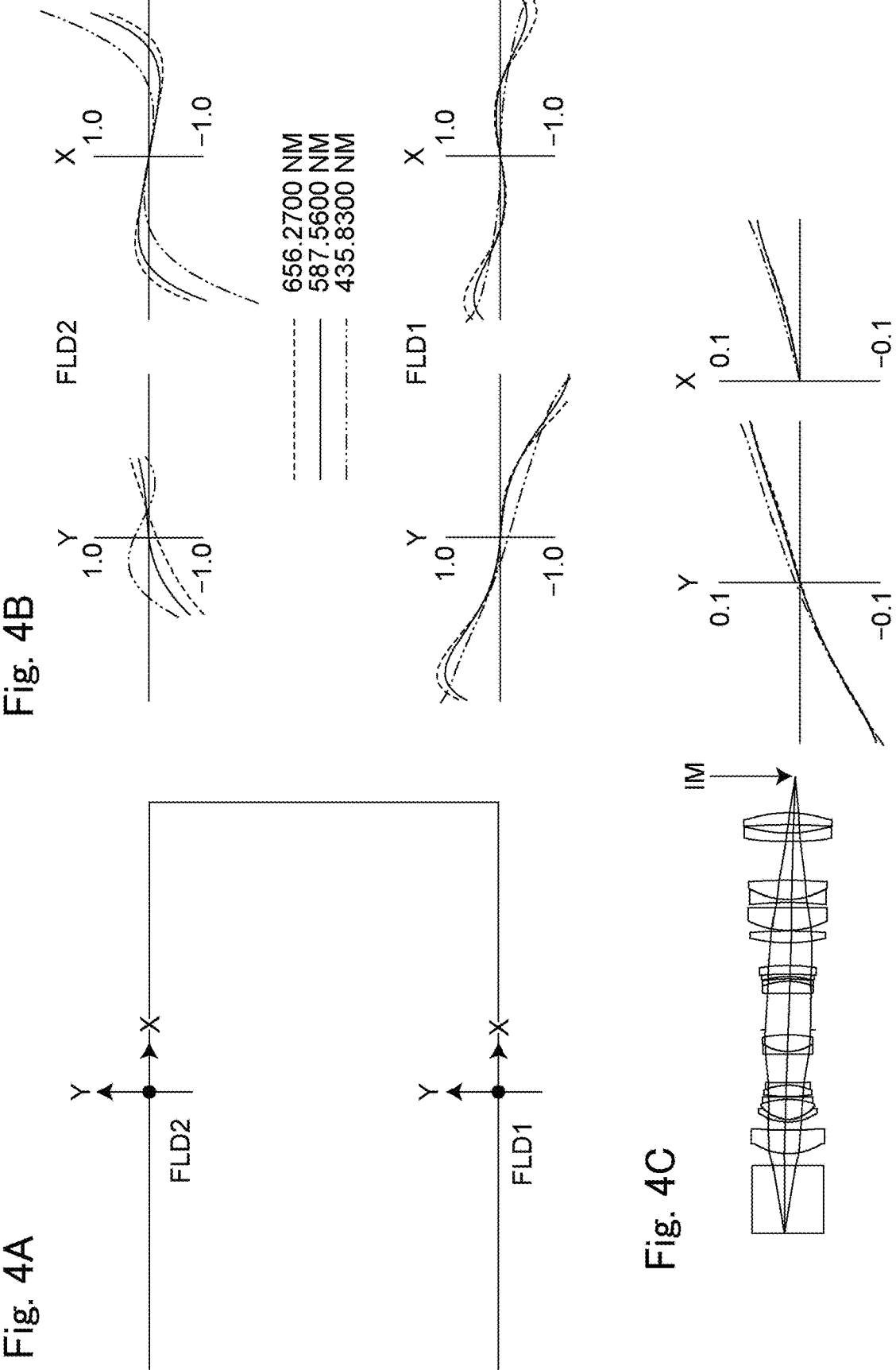
FIG. 4A is an explanatory diagram showing a position FLD1 closest to the optical system and a position FLD2 farthest from the optical system among the magnification conjugate points in the optical system 1 according to the reference example.
FIG. 4B shows lateral aberration diagrams of the reference light ray at positions FLD1 and FLD2 in the optical system 1 according to the reference example.
FIG. 4C shows a lateral aberration diagram of the reference light ray at the intermediate imaging position IM in the optical system 1 according to the reference example.

FIG. 4A is an explanatory diagram showing a position FLD1 closest to the optical system and a position FLD2 farthest from the optical system among the magnification conjugate points in the optical system 1 according to the reference example. FIG. 4B shows lateral aberration diagrams of the reference light ray at positions FLD1 and FLD2 in the optical system 1 according to the reference example. FIG. 4C shows a lateral aberration diagram of the reference light ray at the intermediate imaging position IM conjugate with the reduction conjugate point of the sub-optical system in the optical system 1 according to the reference example. It should be noted that FIG. 4C shows an imaging position in the air. In the diagrams the solid line indicates a wavelength of 587.5600 nm, the dash line indicates a wavelength of 656.2700 nm, and the dash-dot line indicates a wavelength of 435.8300 nm. From these graphs, it can be seen that the chromatic aberration is appropriately corrected at the magnification conjugate point and the intermediate imaging position.

It should be noted that the definitions of the positions FLD1 and FLD2 and the reference light ray will be described below with reference to FIG. 22.

Example 1 and Example 2

Figures 5A, 5B:
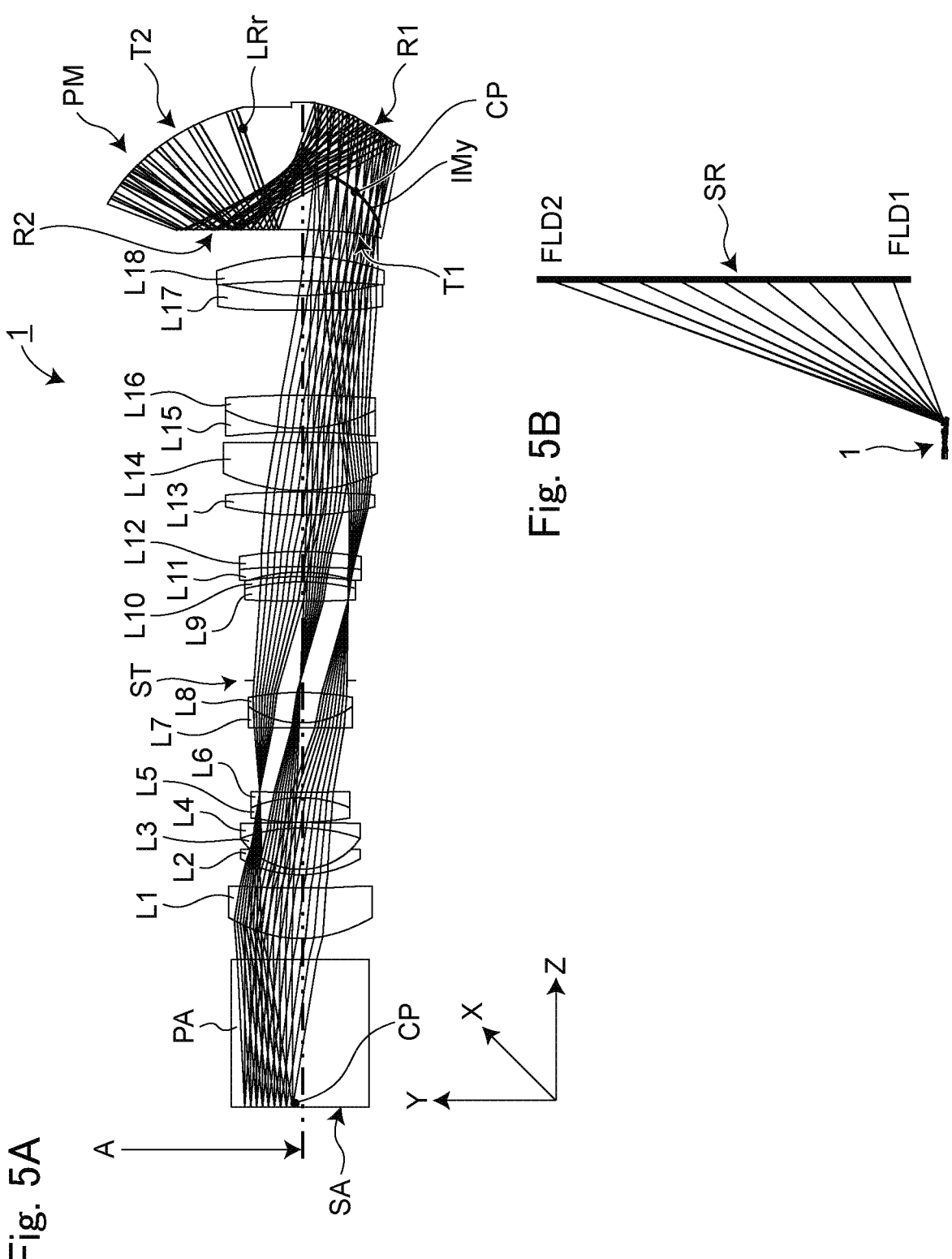
FIG. 5A is an arrangement diagram showing an optical system 1 according to Example 1.
FIG. 5B is an explanatory diagram showing the usage mode of the image projection apparatus using the optical system 1 according to Example 1.
Figures 7A, 7B:
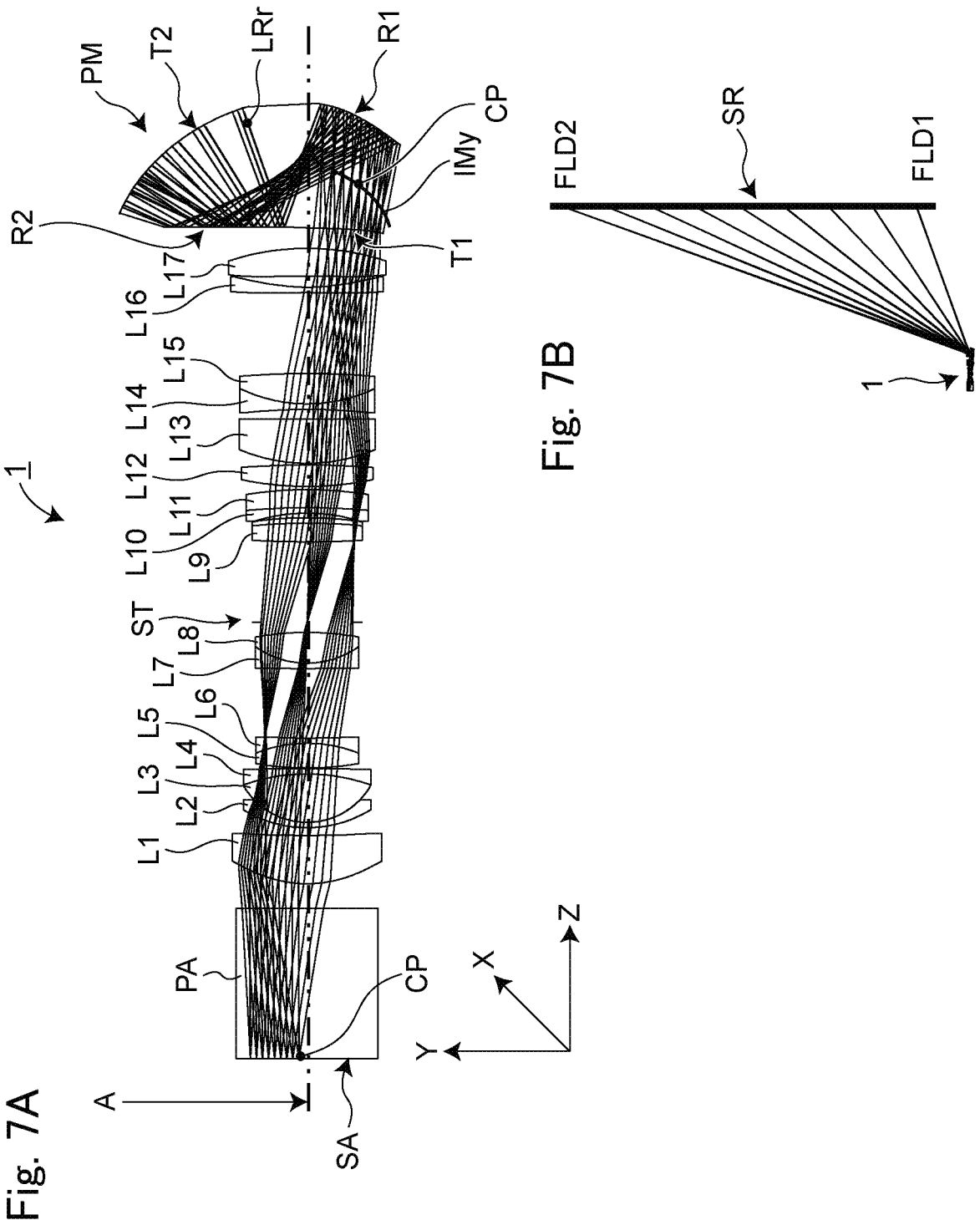
FIG. 7A is an arrangement diagram showing an optical system 1 according to Example 2.
FIG. 7B is an explanatory diagram showing the usage mode of the image projection apparatus using the optical system 1 according to Example 2.

FIG. 5A is an arrangement diagram showing an optical system 1 according to Example 1. FIG. 7A is an arrangement diagram showing an optical system 1 according to Example 2. These optical systems 1 have a configuration similar to that of the reference example, but hereinafter, a description overlapping with the reference example may be omitted.

The intermediate imaging position that is conjugate with both of the reduction conjugate point and the magnification conjugate point is shown as a Y-direction intermediate image IMy in the figure. The illustration of the X-direction intermediate image IMx is omitted.

The optical element PA has two parallel and flat transmission surfaces (surfaces 2 and 3). The lens element L1 has a positive meniscus shape with the convex surfaces facing the reduction side (surfaces 4 and 5). The lens element L2 has a negative meniscus shape with the convex surfaces facing the reduction side (surfaces 6 and 7). The lens element L3 has a biconvex shape (surfaces 7 and 8). The lens element L4 has a negative meniscus shape with the convex surfaces facing the magnification side (surfaces 8 and 9). The lens elements L2 to L4 are bonded to each other to constitute a compound lens. The lens element L5 has a biconvex shape (surfaces 10 and 11). The lens element L6 has a biconcave shape (surfaces 11 and 12). The lens elements L5 and L6 are bonded to each other to constitute a compound lens. The lens element L7 has a negative meniscus shape with the convex surfaces facing the reduction side (surfaces 13 and 14). The lens element L8 has a biconvex shape (surfaces 14 and 15). The lens elements L7 and L8 are bonded to each other to constitute a compound lens.

The aperture stop ST defines a range in which a light flux can pass through the optical system 1 and is positioned between the reduction conjugate point and the above-described intermediate imaging position. As an example, the aperture stop ST is positioned between the lens element L8 and the lens element L9 (surface 16).

The lens element L9 has a biconvex shape (surfaces 17 and 18). The lens element L10 has a negative meniscus shape with the convex surfaces facing the magnification side (surfaces 18 and 19). The lens elements L9 and L10 are bonded to each other to constitute a compound lens. The lens element L11 has a negative meniscus shape with the convex surfaces facing the magnification side (surfaces 20 and 21). The lens element L12 has a positive meniscus shape with the convex surfaces facing the magnification side (surfaces 21 and 22). The lens elements L11 and L12 are bonded to each other to constitute a compound lens. The lens element L13 has a biconvex shape (surfaces 23 and 24). The lens element L14 has a biconvex shape (surfaces 25 and 26). The lens element L15 has a biconcave shape (surfaces 27 and 28). The lens element L16 has a biconvex shape (surfaces 28 and 29). The lens elements L15 and L16 are bonded to each other to constitute a compound lens. The lens element L17 has a negative meniscus shape with the convex surfaces facing the reduction side (surfaces 30 and 31). The lens element L18 has a positive meniscus shape with the convex surfaces facing the magnification side (surfaces 32 and 33).

The prism PM can be formed of a transparent medium, for example, glass, synthetic resin, or the like. The prism PM has a first transmission surface T1 positioned on the reduction side, a second transmission surface T2 positioned on the magnification side, and two of a first reflection surface R1 and a second reflection surface R2 positioned on the optical path between the first transmission surface T1 and the second transmission surface T2. The first transmission surface T1 has a free-form surface shape with the concave surface facing the reduction side (surface 34). The first reflection surface R1 has a free-form surface shape with the concave surface facing a direction into which a light ray made incident on the first reflection surface R1 is reflected (surface 35). The second reflection surface R2 has a planar shape (surface 36). The second transmission surface T2 has a free-form surface shape with the convex surface facing the magnification side (surface 37).

Since the prism PM is integrated with the first transmission surface T1, the second transmission surface T2, the first reflection surface R1, and the second reflection surface R2, assembly adjustment between optical components can be reduced, and the number of optical components can also be reduced, so that the cost can be suppressed. In addition, the optical surfaces having the power of the prism PM, for example, the first transmission surface T1, the second transmission surface T2, and the first reflection surface R1 do not have rotationally symmetric axes, that is, are formed as free-form surfaces having different curvatures in the X-axis and the Y-axis. By using a free-form surface capable of defining curvatures different in the X-axis and the Y-axis for the optical surface of the prism, the degree of freedom for correcting distortion is satisfactorily increased, so that the effect of shortening the entire length of the first sub-optical system can also be expected. In addition, effects that the weight of the head portion of the optical system 1 can be reduced, the center of gravity of the optical system can be arranged in a well-balanced manner, and the configuration of the coupling portion that holds the lens barrel of the optical system in the casing of the optical system can be simplified.

FIG. 5B is an explanatory diagram showing the usage mode of the image projection apparatus using the optical system 1 according to Example 1. FIG. 7B is an explanatory diagram showing the usage mode of the image projection apparatus using the optical system 1 according to Example 2. The image projection apparatus including the optical system 1 is horizontally located on a support table such as a table or on a floor. The screen SR is installed vertically above at a position spaced away from the support table by a relatively short horizontal distance, for example, 0.7 m. The light generated from the optical system 1 is projected forward and obliquely upward to achieve the projection of a short focal length and a large screen. Therefore, a space in which people can move can be ensured in front of the screen SR, and a degree of freedom in the installation of the image projection apparatus can be increased.

FIGS. 6A and 8A are explanatory diagrams showing a position FLD1 closest to the optical system and a position FLD2 farthest from the optical system among the magnification conjugate points in the optical system 1 according to Examples 1 and 2. FIGS. 6B and 8B show lateral aberration diagrams of the reference light ray at positions FLD1 and FLD2 in the optical system 1 according to Examples 1 and 2. FIGS. 6C and 8C show lateral aberration diagrams of the reference light ray at the intermediate imaging position IM conjugate with the reduction conjugate point of the sub-optical system in the optical system 1 according to Examples 1 and 2. It should be noted that FIGS. 6C and 8C show an imaging position in the air. In the diagram the solid line indicates a wavelength of 587.5600 nm, the dash line indicates a wavelength of 656.2700 nm, and the dash-dot line indicates a wavelength of 435.8300 nm. From these graphs, it can be seen that the chromatic aberration is appropriately corrected at the magnification conjugate point and the intermediate imaging position.

Example 3

Figures 9A, 9B:
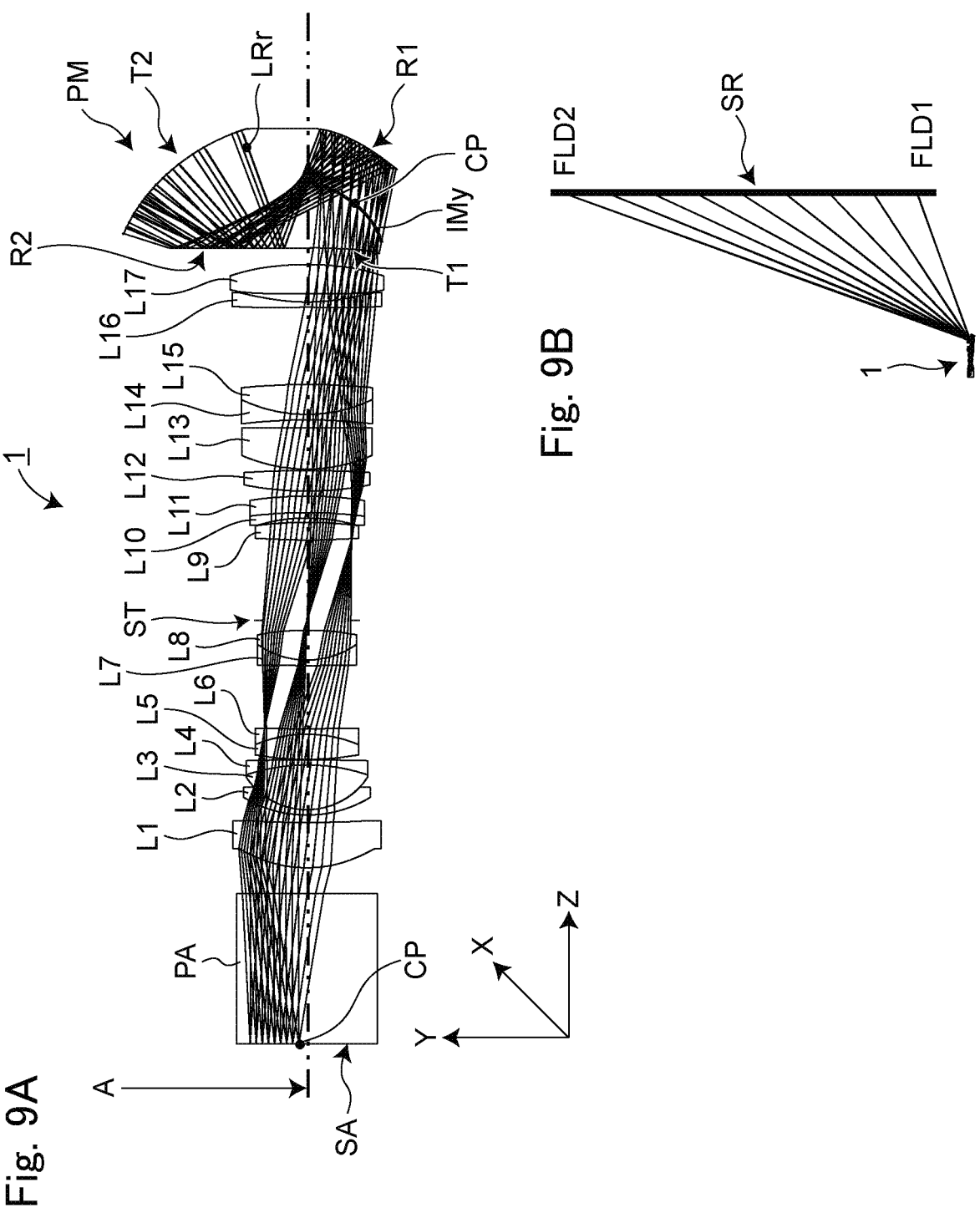
FIG. 9A is an arrangement diagram showing an optical system 1 according to Example 3.
FIG. 9B is an explanatory diagram showing the usage mode of the image projection apparatus using the optical system 1 according to Example 3.

FIG. 9A is an arrangement diagram showing an optical system 1 according to Example 3. The optical system 1 has a configuration similar to that of the reference example and Examples 1 and 2 but hereinafter, a description overlapping with the reference example and Examples 1 and 2 may be omitted.

The intermediate imaging position that is conjugate with both of the reduction conjugate point and the magnification conjugate point is shown as a Y-direction intermediate image IMy in the figure. The illustration of the X-direction intermediate image IMx is omitted.

The optical element PA has two parallel and flat transmission surfaces that (surfaces 2 and 3). The lens element L1 has a positive meniscus shape with the convex surfaces facing the reduction side (surfaces 4 and 5). The lens element L2 has a negative meniscus shape with the convex surfaces facing the reduction side (surfaces 6 and 7). The lens element L3 has a biconvex shape (surfaces 7 and 8). The lens element L4 has a negative meniscus shape with the convex surfaces facing the magnification side (surfaces 8 and 9). The lens elements L2 to L4 are bonded to each other to constitute a compound lens. The lens element L5 has a biconvex shape (surfaces 10 and 11). The lens element L6 has a biconcave shape (surfaces 11 and 12). The lens elements L5 and L6 are bonded to each other to constitute a compound lens. The lens element L7 has a negative meniscus shape with the convex surfaces facing the reduction side (surfaces 13 and 14). The lens element L8 has a biconvex shape (surfaces 14 and 15). The lens elements L7 and L8 are bonded to each other to constitute a compound lens.

The aperture stop ST defines a range in which a light flux can pass through the optical system 1 and is positioned between the reduction conjugate point and the above-described intermediate imaging position. As an example, the aperture stop ST is positioned between the lens element L8 and the lens element L9 (surface 16).

The lens element L9 has a biconvex shape (surfaces 17 and 18). The lens element L10 has a negative meniscus shape with the convex surfaces facing the magnification side (surfaces 19 and 20). The lens element L11 has a positive meniscus shape with the convex surfaces facing the magnification side (surfaces 20 and 21). The lens elements L10 and L11 are bonded to each other to constitute a compound lens. The lens element L12 has a biconvex shape (surfaces 22 and 23). The lens element L13 has a biconvex shape (surfaces 24 and 25). The lens element L14 has a biconcave shape (surfaces 26 and 27). The lens element L15 has a biconvex shape (surfaces 27 and 28). The lens elements L14 and L15 are bonded to each other to constitute a compound lens. The lens element L16 has a negative meniscus shape with the convex surfaces facing the reduction side (surfaces 29 and 30). The lens element L17 has a positive meniscus shape with the convex surfaces facing the magnification side (surfaces 31 and 32).

The prism PM can be formed of a transparent medium, for example, glass, synthetic resin, or the like. The prism PM has a first transmission surface T1 positioned on the reduction side, a second transmission surface T2 positioned on the magnification side, and two of a first reflection surface R1 and a second reflection surface R2 positioned on the optical path between the first transmission surface T1 and the second transmission surface T2. The first transmission surface T1 has a free-form surface shape with the concave surface facing the reduction side (surface 33). The first reflection surface R1 has a free-form surface shape with the concave surface facing a direction into which a light ray made incident on the first reflection surface R1 is reflected (surface 34). The second reflection surface R2 has a planar shape (surface 35). The second transmission surface T2 has a free-form surface shape with the convex surface facing the magnification side (surface 36).

FIG. 9B is an explanatory diagram showing the usage mode of the image projection apparatus using the optical system 1 according to Example 3. The image projection apparatus including the optical system 1 is horizontally located on a support table such as a table or on a floor. The screen SR is installed vertically above at a position spaced away from the support table by a relatively short horizontal distance, for example, 0.7 m. The light generated from the optical system 1 is projected forward and obliquely upward to achieve the projection of a short focal length and a large screen. Therefore, a space in which people can move can be ensured in front of the screen SR, and a degree of freedom in the installation of the image projection apparatus can be increased.

Figures 10A, 10B, 10C:
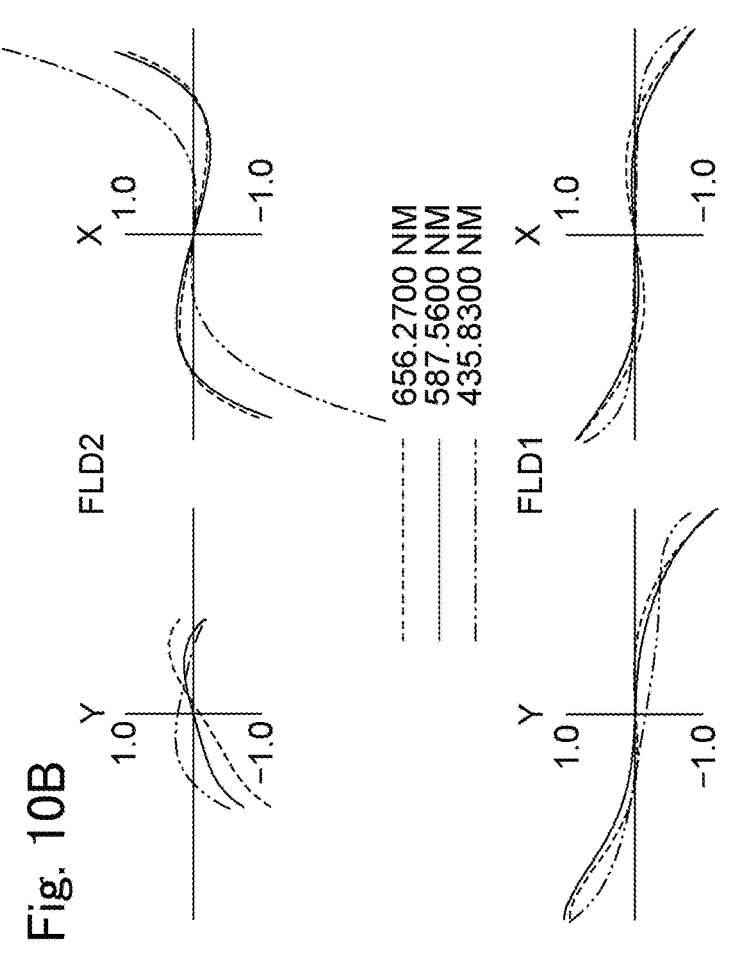
FIG. 10A is an explanatory diagram showing a position FLD1 closest to the optical system and a position FLD2 farthest from the optical system among the magnification conjugate points in the optical system 1 according to Example 3.
FIG. 10B shows lateral aberration diagrams of the reference light ray at positions FLD1 and FLD2 in the optical system 1 according to Example 3.
FIG. 10C shows lateral aberration diagrams of the reference light ray at the intermediate imaging position IM in the optical system 1 according to Example 3.

FIG. 10A is an explanatory diagram showing a position FLD1 closest to the optical system and a position FLD2 farthest from the optical system among the magnification conjugate points in the optical system 1 according to Example 3. FIG. 10B shows lateral aberration diagrams of the reference light ray at positions FLD1 and FLD2 in the optical system 1 according to Example 3. FIG. 10C shows a lateral aberration diagram of the reference light ray at the intermediate imaging position IM conjugate with the reduction conjugate point of the sub-optical system in the optical system 1 according to Example 3. It should be noted that FIG. 10C shows an imaging position in the air. In the diagram the solid line indicates a wavelength of 587.5600 nm, the dash line indicates a wavelength of 656.2700 nm, and the dash-dot line indicates a wavelength of 435.8300 nm. From these graphs, it can be seen that the chromatic aberration is appropriately corrected at the magnification conjugate point and the intermediate imaging position.

Example 4

Figures 11A, 11B:
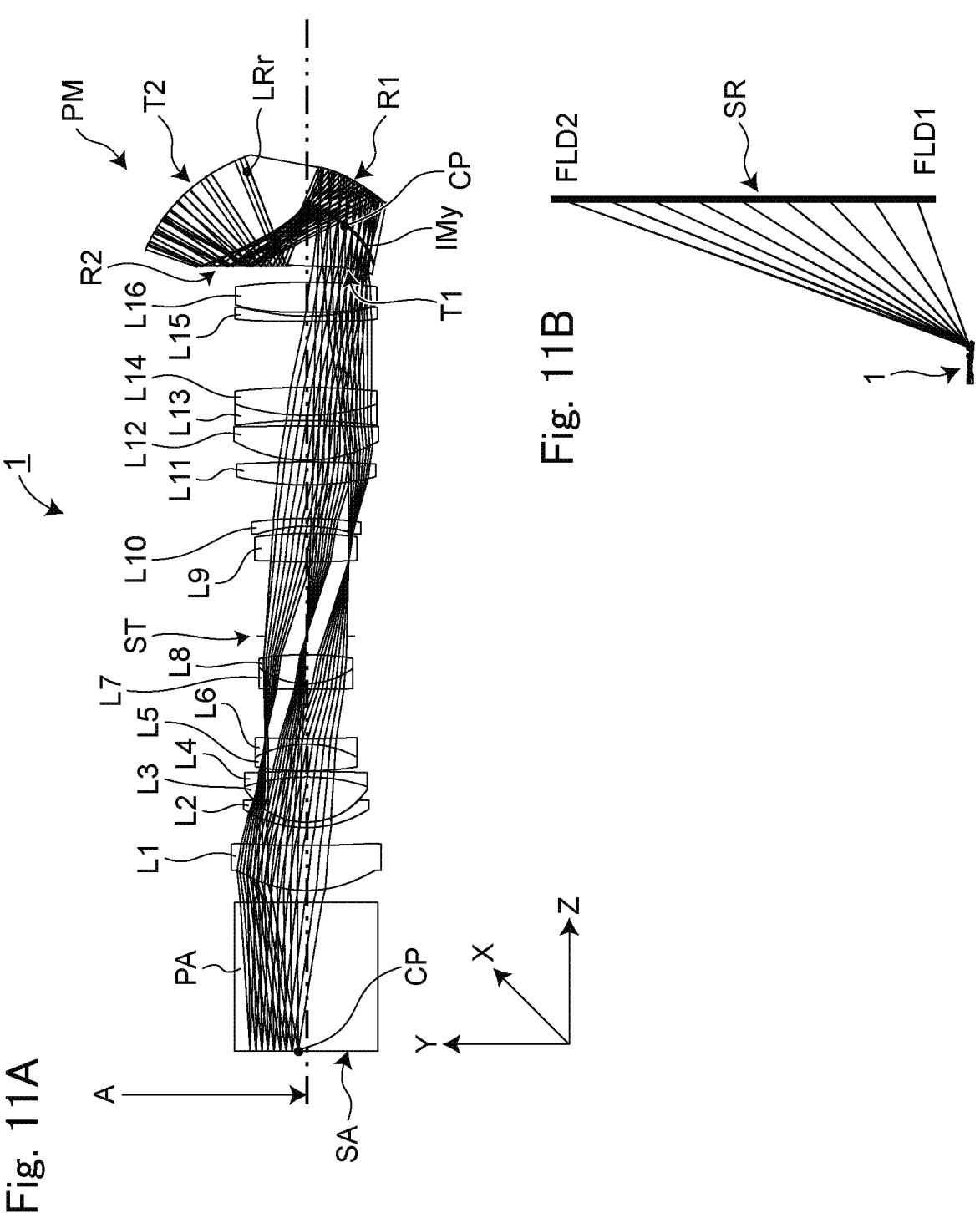
FIG. 11A is an arrangement diagram showing an optical system 1 according to Example 4.
FIG. 11B is an explanatory diagram showing the usage mode of the image projection apparatus using the optical system 1 according to Example 4.

FIG. 11A is an arrangement diagram showing an optical system 1 according to Example 4. The optical system 1 has a configuration similar to that of the reference example and Examples 1 to 3 but hereinafter, a description overlapping with the reference example and Examples 1 to 3 may be omitted.

The intermediate imaging position that is conjugate with both of the reduction conjugate point and the magnification conjugate point is shown as a Y-direction intermediate image IMy in the figure. The illustration of the X-direction intermediate image IMx is omitted.

The optical element PA has two parallel and flat transmission surfaces (surfaces 2 and 3). The lens element L1 has a positive meniscus shape with the convex surfaces facing the reduction side (surfaces 4 and 5). The lens element L2 has a negative meniscus shape with the convex surfaces facing the reduction side (surfaces 6 and 7). The lens element L3 has a biconvex shape (surfaces 7 and 8). The lens element L4 has a negative meniscus shape with the convex surfaces facing the magnification side (surfaces 8 and 9).

The lens elements L2 to L4 are bonded to each other to constitute a compound lens. The lens element L5 has a biconvex shape (surfaces 10 and 11). The lens element L6 has a biconcave shape (surfaces 11 and 12). The lens elements L5 and L6 are bonded to each other to constitute a compound lens. The lens element L7 has a negative meniscus shape with the convex surfaces facing the reduction side (surfaces 13 and 14). The lens element L8 has a biconvex shape (surfaces 14 and 15). The lens elements L7 and L8 are bonded to each other to constitute a compound lens.

The aperture stop ST defines a range in which a light flux can pass through the optical system 1 and is positioned between the reduction conjugate point and the above-described intermediate imaging position. As an example, the aperture stop ST is positioned between the lens element L8 and the lens element L9 (surface 16).

The lens element L9 has a biconvex shape (surfaces 17 and 18). The lens element L10 has a negative meniscus shape with the convex surfaces facing the magnification side (surfaces 19 and 20). The lens element L11 has a biconvex shape (surfaces 21 and 22). The lens element L12 has a biconvex shape (surfaces 23 and 24). The lens element L13 has a biconcave shape (surfaces 25 and 26). The lens element L14 has a biconvex shape (surfaces 26 and 27). The lens elements L13 and L14 are bonded to each other to constitute a compound lens. The lens element L15 has a negative meniscus shape with the convex surfaces facing the reduction side (surfaces 28 and 29). The lens element L16 has a positive meniscus shape with the convex surfaces facing the magnification side (surfaces 30 and 31).

The prism PM can be formed of a transparent medium, for example, glass, synthetic resin, or the like. The prism PM has a first transmission surface T1 positioned on the reduction side, a second transmission surface T2 positioned on the magnification side, and two of a first reflection surface R1 and a second reflection surface R2 positioned on the optical path between the first transmission surface T1 and the second transmission surface T2. The first transmission surface T1 has a free-form surface shape with the concave surface facing the reduction side (surface 32). The first reflection surface R1 has a free-form surface shape with the concave surface facing a direction into which a light ray made incident on the first reflection surface R1 is reflected (surface 33). The second reflection surface R2 has a planar shape (surface 34). The second transmission surface T2 has a free-form surface shape with the convex surface facing the magnification side (surface 35).

FIG. 11B is an explanatory diagram showing the usage mode of the image projection apparatus using the optical system 1 according to Example 4. The image projection apparatus including the optical system 1 is horizontally located on a support table such as a table or on a floor. The screen SR is installed vertically above at a position spaced away from the support table by a relatively short horizontal distance, for example, 0.7 m. The light generated from the optical system 1 is projected forward and obliquely upward to achieve the projection of a short focal length and a large screen. Therefore, a space in which people can move can be ensured in front of the screen SR, and a degree of freedom in the installation of the image projection apparatus can be increased.

FIG. 12A is an explanatory diagram showing a position FLD1 closest to the optical system and a position FLD2 farthest from the optical system among the magnification conjugate points in the optical system 1 according to Example 4. FIG. 12B shows lateral aberration diagrams of the reference light ray at positions FLD1 and FLD2 in the optical system 1 according to Example 4. FIG. 12C shows a lateral aberration diagram of the reference light ray at the intermediate imaging position IM conjugate with the reduction conjugate point of the sub-optical system in the optical system 1 according to Example 4. It should be noted that FIG. 12C shows an imaging position in the air. In the diagram the solid line indicates a wavelength of 587.5600 nm, the dash line indicates a wavelength of 656.2700 nm, and the dash-dot line indicates a wavelength of 435.8300 nm. From these graphs, it can be seen that the chromatic aberration is appropriately corrected at the magnification conjugate point and the intermediate imaging position.

Example 5

Figures 13A, 13B:
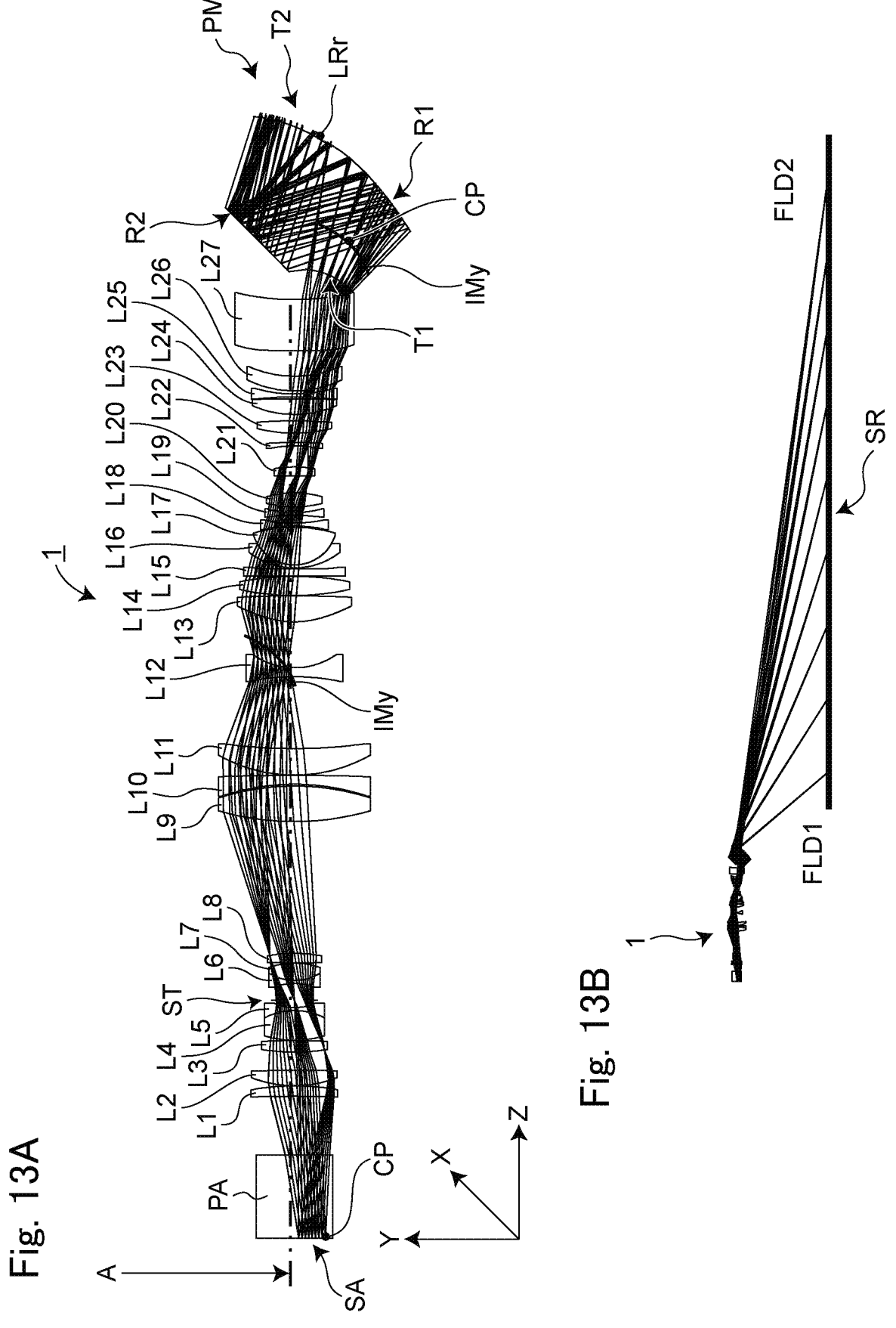
FIG. 13A is an arrangement diagram showing an optical system 1 according to Example 5.
FIG. 13B is an explanatory diagram showing the usage mode of the image projection apparatus using the optical system 1 according to Example 5.

FIG. 13A is an arrangement diagram showing an optical system 1 according to Example 5. The optical system 1 has a configuration similar to that of the reference example and Examples 1 to 4 but hereinafter, a description overlapping with the reference example and Examples 1 to 4 may be omitted.

In the present embodiment, there are two respective intermediate imaging positions that are conjugate with both of the reduction conjugate point and the magnification conjugate point, as shown as Y-direction intermediate images IMy in the figure. The illustration of the X-direction intermediate images IMx is omitted. The intermediate image IMy formed at the first intermediate imaging position intersects with the lens element L12 of the sub-optical system and is positioned between the lens element L11 and the lens element L13. A part or the whole of the intermediate image IMy formed at the second intermediate imaging position is positioned inside the medium of the prism PM. It should be noted that the first intermediate imaging position is not limited to a position between lens element L11 and lens element L12, and the projection distance can be further shortened by forming the first intermediate imaging position in the sub-optical system. Here, the number of times of intermediate imaging positions is defined as the number of conjugate points between the reduction conjugate point and the magnification conjugate point in a specific light ray, that is, for example, the number of times of intermediate imaging that the reference light ray OAr forms between the reduction conjugate point and the magnification conjugate point.

The optical element PA has two parallel and flat transmission surfaces (surfaces 2 and 3). The lens element L1 has a negative meniscus shape with the convex surfaces facing the magnification side (surfaces 4 and 5). The lens element L2 has a biconvex shape (surfaces 6 and 7). The lens element L3 has a biconvex shape (surfaces 8 and 9). The lens element L4 has a biconvex shape (surfaces 10 and 11). The lens element L5 has a biconcave shape (surfaces 11 and 12). The lens elements L4 and L5 are bonded to each other to constitute a compound lens.

The aperture stop ST defines a range in which a light flux can pass through the optical system 1, and is positioned between the reduction conjugate point and the above-described intermediate imaging position, preferably between the reduction conjugate point and the second intermediate imaging position. As an example, the aperture stop ST is positioned between the lens element L5 and the lens element L6 (surface 13). The lens element L6 has a biconcave shape (surfaces 14 and 15). The lens element L7 has a biconvex shape (surfaces 15 and 16). The lens elements L6 and L7 are bonded to each other to constitute a compound lens. The lens element L8 has a biconvex shape (surfaces 17 and 18). The lens element L9 has a biconvex shape (surfaces 19 and 20). The lens element L10 has a negative meniscus shape with the convex surfaces facing the magnification side (surfaces 21 and 22). The lens element L11 has a positive meniscus shape with the convex surfaces facing the reduction side (surfaces 23 and 24). The lens element L12 has a biconcave shape (surfaces 25 and 26). The lens element L13 has a biconvex shape (surfaces 27 and 28). The lens element L14 has a biconvex shape (surfaces 29 and 30). The lens element L15 has a positive meniscus shape with the convex surfaces facing the magnification side (surfaces 31 and 32). The lens element L16 has a negative meniscus shape with the convex surfaces facing the reduction side (surfaces 33 and 34). The lens element L17 has a biconcave shape (surfaces 34 and 35). The lens elements L16 and L17 are bonded to each other to constitute a compound lens. The lens element L18 has a biconvex shape (surfaces 36 and 37). The lens element L19 has a biconcave shape (surfaces 38 and 39). The lens element L20 has a biconvex shape (surfaces 40 and 41). The lens element L21 has a biconvex shape (surfaces 42 and 43). The lens element L22 has a negative meniscus shape with the convex surfaces facing the magnification side (surfaces 44 and 45). The lens element L23 has a biconvex shape (surfaces 46 and 47). The lens element L24 has a biconvex shape (surfaces 48 and 49). The lens element L25 has a biconcave shape (surfaces 50 and 51). The lens element L26 has a positive meniscus shape with the convex surfaces facing the reduction side (surfaces 52 and 53). The lens element L27 has a biconvex shape (surfaces 54 and 55).

The prism PM has a first transmission surface T1 positioned on the reduction side, a second transmission surface T2 positioned on the magnification side, and two of a first reflection surface R1 and a second reflection surface R2 positioned on the optical path between the first transmission surface T1 and the second transmission surface T2. The first transmission surface T1 has a free-form surface shape with the concave surface facing the reduction side (surface 56). The first reflection surface R1 has a free-form surface shape with the concave surface facing a direction into which a light ray made incident on the first reflection surface R1 is reflected (surface 57). The second reflection surface R2 has a planar shape (surface 58). The second transmission surface T2 has a free-form surface shape with the convex surface facing the magnification side (surface 59).

FIG. 13B is an explanatory diagram showing the usage mode of the image projection apparatus using the optical system 1 according to Example 5. The image projection apparatus including the optical system 1 is horizontally located on a support table such as a table or on a floor. The screen SR is installed horizontally forward at a position spaced away from the support table by a relatively short horizontal distance, for example, 0.2 m. The light generated from the optical system 1 is projected forward and obliquely downward to achieve the projection of a short focal length and a large screen. Therefore, a space in which people can move can be ensured in front of the screen SR, and a degree of freedom in the installation of the image projection apparatus can be increased. Furthermore, since the screen SR and the image projection apparatus can be arranged substantially in parallel, the projection of a short focal length and a large screen is achieved even in a place where an arrangement space between the screen SR and the image projection apparatus is narrow.

Figure 14A:
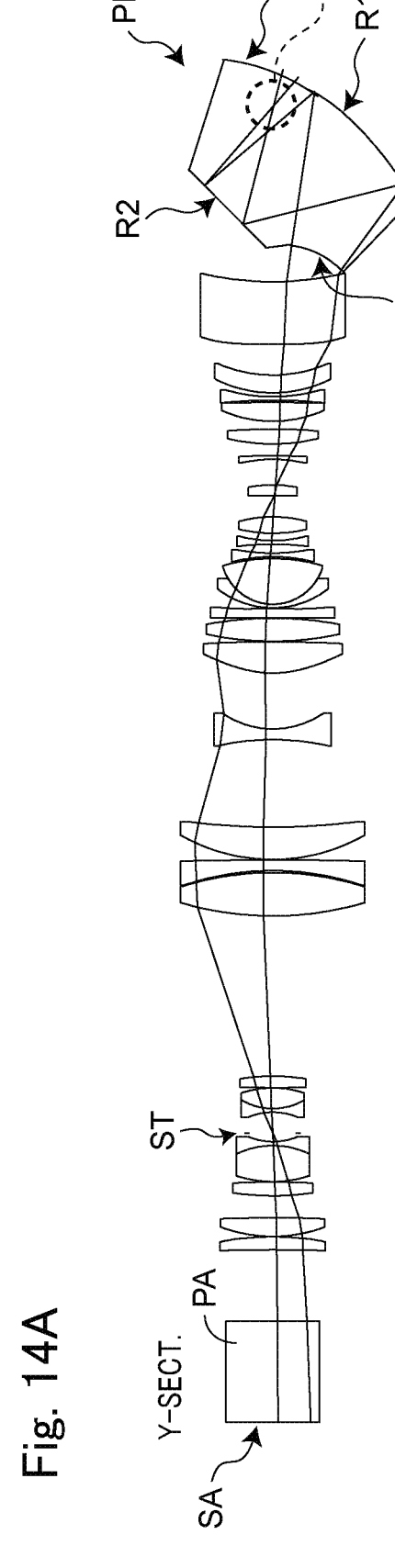
FIG. 14A is a Y cross-sectional view showing an optical path through which a principal ray passes in the optical system 1 according to Example 5.
Figure 14B:
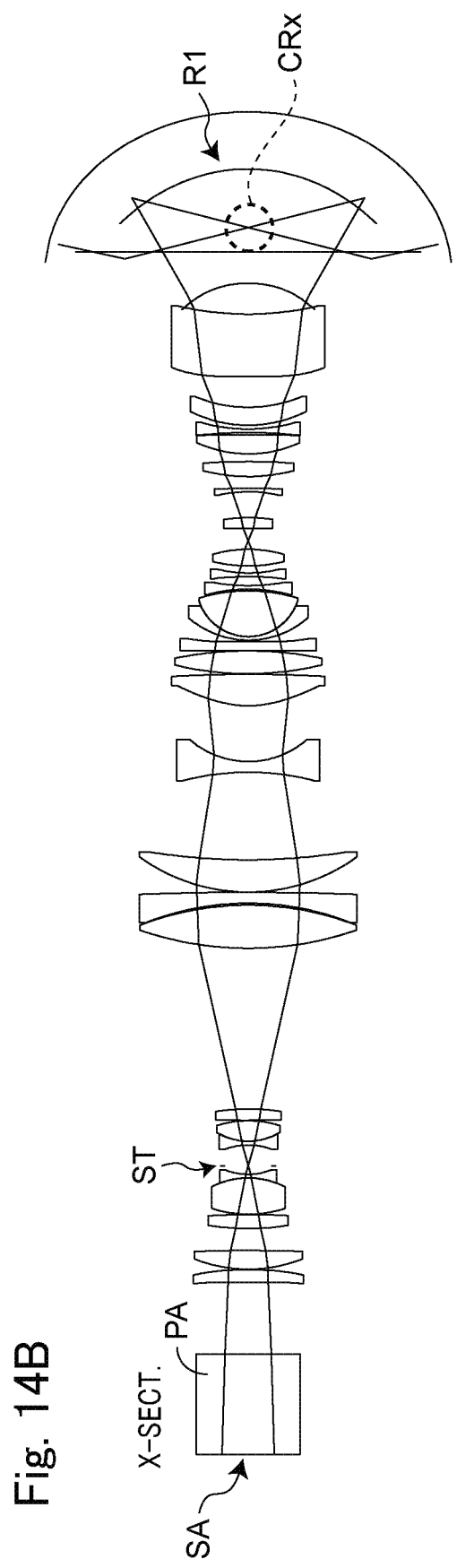
FIG. 14B is an X cross-sectional view when the optical system 1 is viewed from above.

FIG. 14A is a Y cross-sectional view showing an optical path through which a principal ray passes in the optical system 1 according to Example 5, and FIG. 14B is an X cross-sectional view when the optical system 1 is viewed from above. For the sake of clarity, FIG. 14A shows a principal ray passing through the center in the X-direction of the original image SA and passing through the lowermost portion in the Y-direction (normalized height Y=0.0 at the reduction conjugate point), and a principal ray passing through the center in the X-direction of the original image SA and passing through the uppermost portion in the Y-direction (normalized height Y=1.0 at the reduction conjugate point). Both of the principal rays pass through the sub-optical system, and then through the transmission surface T1 into the inside of the prism PM, and subsequently reflected by the reflection surface R1, and intersect with each other in a region CRy indicated by a dash line circle before reaching the reflection surface R2.

For the sake of clarity, FIG. 14B shows a principal ray passing through a left-end portion in the X-direction of the original image SA and a principal ray passing through a right-end portion in the X-direction of the original image SA. Both of the principal rays pass through the sub-optical system, and then through the transmission surface T1 into the inside of the prism PM, and subsequently reflected by the reflection surface R1, and intersect with each other in a region CRx indicated by a dash line circle before reaching the reflection surface R2.

The curvature shape of the free-form surface of the reflection surface R1 is designed so that, as shown in FIG. 14A, when viewed from a direction perpendicular to the Y cross-section, some of the plurality of principal rays passing through the reduction conjugate point intersect with each other on the optical path between the reflection surface R1 and the transmission surface T2 and so that, as shown in FIG. 14B when viewed from a direction perpendicular to the X cross-section, some of the plurality of principal rays passing through the reduction conjugate point intersect with each other on the optical path between the reflection surface R1 and the transmission surface T2. With such a configuration, the sub-optical system can be reduced in size using a small prism, and projection or imaging of a short focal length and a large screen can be performed.

Figures 15A, 15B, 15C:
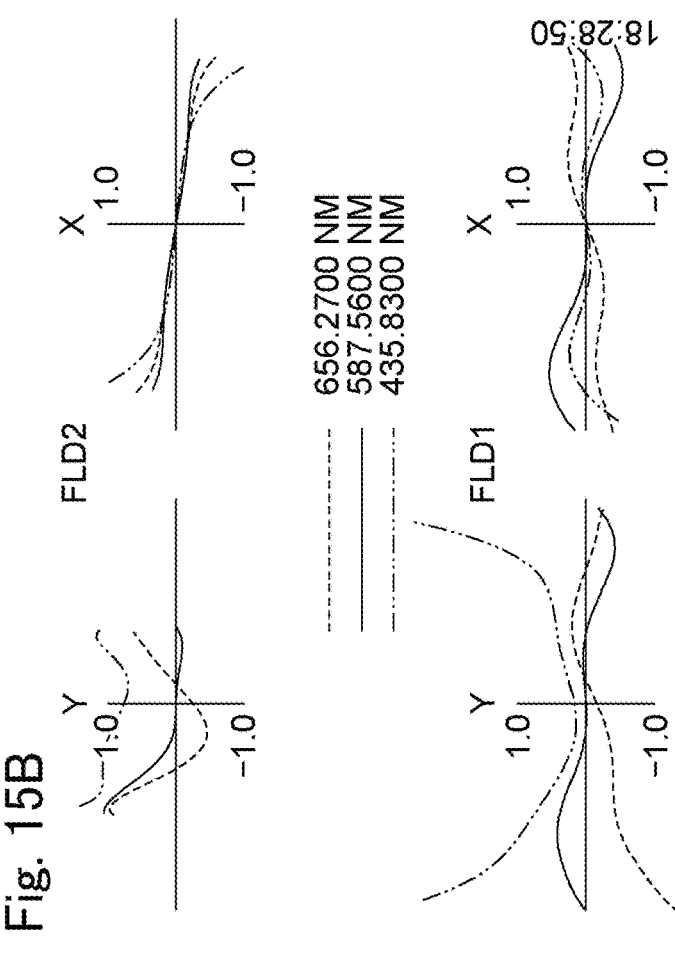
FIG. 15A is an explanatory diagram showing a position FLD1 closest to the optical system and a position FLD2 farthest from the optical system among the magnification conjugate points in the optical system 1 according to Example 5.
FIG. 15B shows lateral aberration diagrams of the reference light ray at positions FLD1 and FLD2 in the optical system 1 according to Example 5.
FIG. 15C shows lateral aberration diagrams of the reference light ray at the second intermediate imaging position IM in the optical system 1 according to Example 5.

FIG. 15A is an explanatory diagram showing a position FLD1 closest to the optical system and a position FLD2 farthest from the optical system among the magnification conjugate points in the optical system 1 according to Example 5. FIG. 15B shows lateral aberration diagrams of the reference light ray at positions FLD1 and FLD2 in the optical system 1 according to Example 5. FIG. 15C shows lateral aberration diagrams of the reference light ray at the second intermediate imaging position IM in the optical system 1 according to Example 5. It should be noted that FIG. 15C shows an imaging position in the air. In the diagrams the solid line indicates a wavelength of 587.5600 nm, the dash line indicates a wavelength of 656.2700 nm, and the dash-dot line indicates a wavelength of 435.8300 nm. From these graphs, it can be seen that the chromatic aberration is appropriately corrected at the magnification conjugate point and the intermediate imaging position.

Example 6

Figures 16A, 16B:
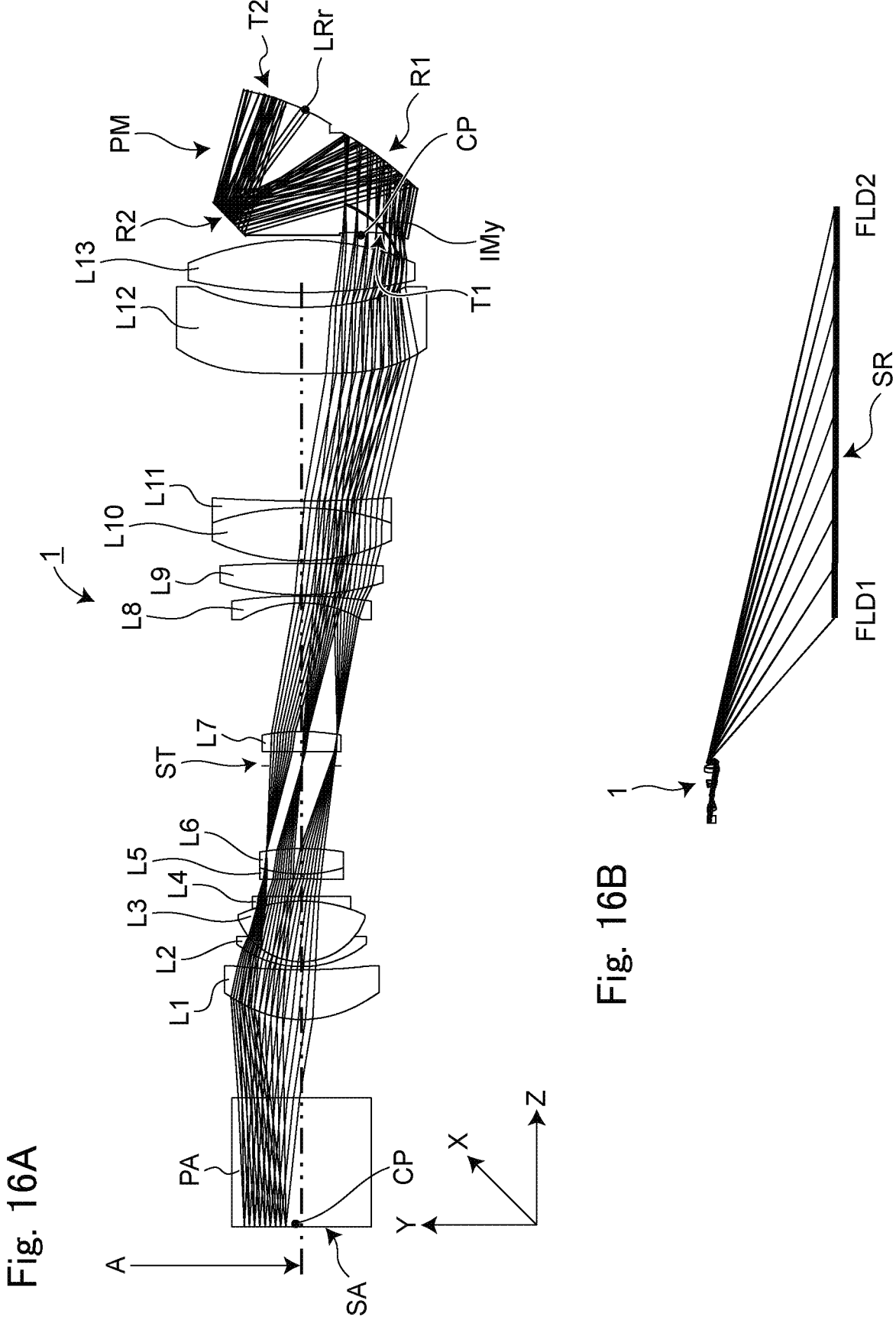
FIG. 16A is an arrangement diagram showing an optical system 1 according to Example 6.
FIG. 16B is an explanatory diagram showing the usage mode of the image projection apparatus using the optical system 1 according to Example 6.

FIG. 16A is an arrangement diagram showing an optical system 1 according to Example 6. The optical system 1 has a configuration similar to that of the reference example and Examples 1 to 5 but hereinafter, a description overlapping with the reference example and Examples 1 to 5 may be omitted.

The intermediate imaging position that is conjugate with both of the reduction conjugate point and the magnification conjugate point is shown as a Y-direction intermediate image IMy in the figure. The illustration of the X-direction intermediate image IMx is omitted. In Example 6, a part of the intermediate image IMy is formed between the first transmission surface T1 and the first reflection surface R1, and the remaining part of the intermediate image IMy is formed between the sub-optical system and the prism PM.

The optical element PA has two parallel and flat transmission surfaces (surfaces 2 and 3). The lens element L1 has a positive meniscus shape with the convex surfaces facing the reduction side (surfaces 4 and 5). The lens element L2 has a negative meniscus shape with the convex surfaces facing the reduction side (surfaces 6 and 7). The lens element L3 has a biconvex shape (surfaces 7 and 8). The lens element L4 has a negative meniscus shape with the convex surfaces facing the magnification side (surfaces 8 and 9). The lens elements L2 to L4 are bonded to each other to constitute a compound lens. The lens element L5 has a biconcave shape (surfaces 10 and 11). The lens element L6 has a biconvex shape (surfaces 11 and 12). The lens elements L5 and L6 are bonded to each other to constitute a compound lens.

The aperture stop ST defines a range in which a light flux can pass through the optical system 1 and is positioned between the reduction conjugate point and the above-described intermediate imaging position. As an example, the aperture stop ST is positioned between the lens element L6 and the lens element L7 (surface 13).

The lens element L7 has a biconvex shape (surfaces 14 and 15). The lens element L8 has a negative meniscus shape with the convex surfaces facing the magnification side (surfaces 16 and 17). The lens element L9 has a biconvex shape (surfaces 18 and 19). The lens element L10 has a biconvex shape (surfaces 20 and 21). The lens element L11 has a biconcave shape (surfaces 21 and 22). The lens elements L10 and L11 are bonded to each other to constitute a compound lens. The lens element L12 has a negative meniscus shape with the convex surfaces facing the reduction side (surfaces 23 and 24). The lens element L13 has a biconvex shape (surfaces 25 and 26).

The prism PM can be formed of a transparent medium, for example, glass, synthetic resin, or the like. The prism PM has a first transmission surface T1 positioned on the reduction side, a second transmission surface T2 positioned on the magnification side, and two of a first reflection surface R1 and a second reflection surface R2 positioned on the optical path between the first transmission surface T1 and the second transmission surface T2. The first transmission surface T1 has a free-form surface shape with the concave surface facing the reduction side (surface 27). The first reflection surface R1 has a free-form surface shape with a concave surface facing a direction into which a light ray made incident on the first reflection surface R1 is reflected (surface 28). The second reflection surface R2 has a planar shape (surface 29). The second transmission surface T2 has a free-form surface shape with the convex surface facing the magnification side (surface 30).

FIG. 16B is an explanatory diagram showing the usage mode of the image projection apparatus using the optical system 1 according to Example 6. The image projection apparatus including the optical system 1 is horizontally located on a support table such as a table or on a floor. The screen SR is installed horizontally forward at a position spaced away from the support table by a relatively short horizontal distance, for example, 0.2 m. The light generated from the optical system 1 is projected forward and obliquely downward to achieve the projection of a short focal length and a large screen. Therefore, a space in which people can move can be ensured in front of the screen SR, and a degree of freedom in the installation of the image projection apparatus can be increased. Furthermore, since the screen SR and the image projection apparatus can be arranged substantially in parallel, the projection of a short focal length and a large screen is achieved even in a place where an arrangement space between the screen SR and the image projection apparatus is narrow.

Figures 17A, 17B, 17C:
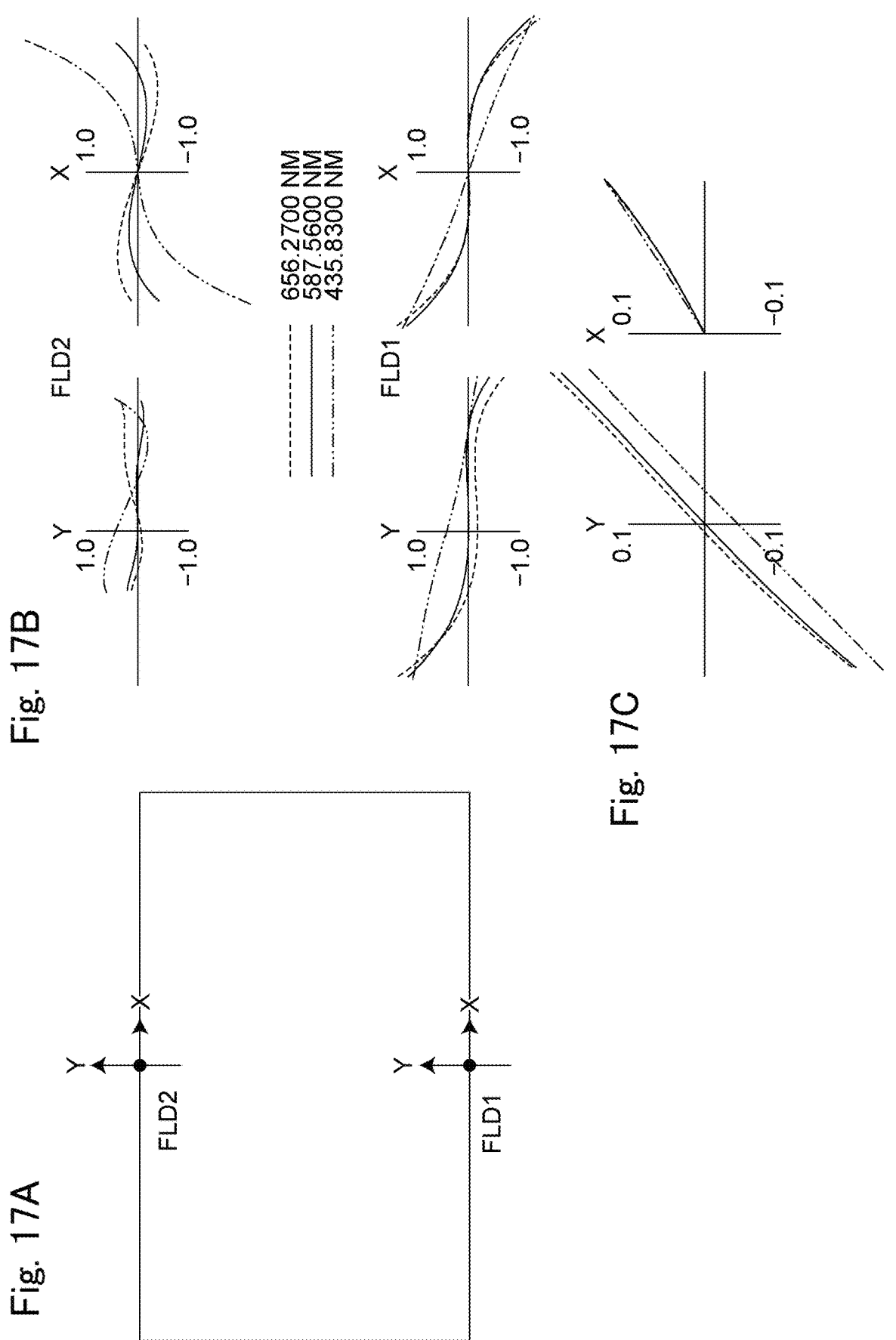
FIG. 17A is an explanatory diagram showing a position FLD1 closest to the optical system and a position FLD2 farthest from the optical system among the magnification conjugate points in the optical system 1 according to Example 6.
FIG. 17B shows lateral aberration diagrams of the reference light ray at positions FLD1 and FLD2 in the optical system 1 according to Example 6.
FIG. 17C shows lateral aberration diagrams of the reference light ray at the intermediate imaging position IM in the optical system 1 according to Example 6.

FIG. 17A is an explanatory diagram showing a position FLD1 closest to the optical system and a position FLD2 farthest from the optical system among the magnification conjugate points in the optical system 1 according to Example 6. FIG. 17B shows lateral aberration diagrams of the reference light ray at positions FLD1 and FLD2 in the optical system 1 according to Example 6. FIG. 17C shows a lateral aberration diagram of the reference light ray at the intermediate imaging position IM conjugate with the reduction conjugate point of the sub-optical system in the optical system 1 according to Example 6. It should be noted that FIG. 17C shows an imaging position in the air. In the diagrams the solid line indicates a wavelength of 587.5600 nm, the dash line indicates a wavelength of 656.2700 nm, and the dash-dot line indicates a wavelength of 435.8300 nm. From these graphs, it can be seen that the chromatic aberration is appropriately corrected at the magnification conjugate point and the intermediate imaging position.

Example 7

Figure 18A:
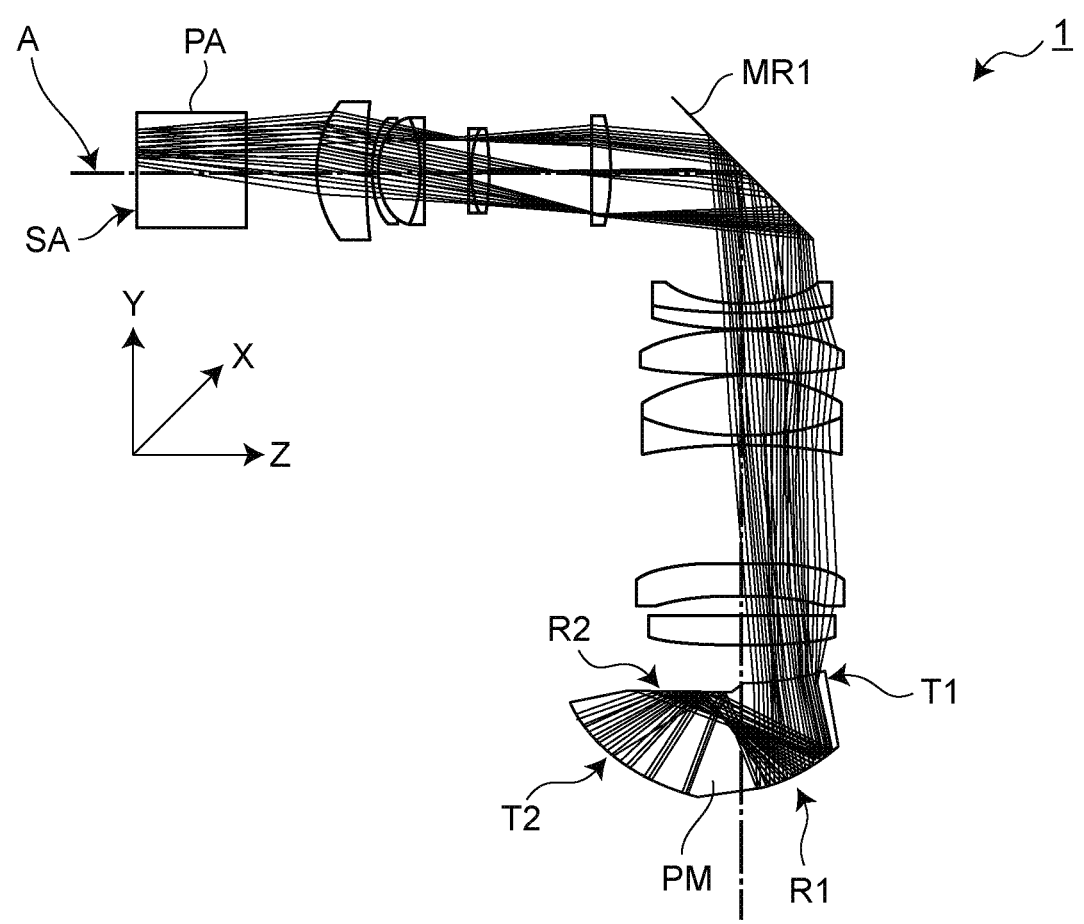
FIG. 18A is an arrangement diagram showing an optical system 1 according to Example 7.

FIG. 18A is an arrangement diagram showing an optical system 1 according to Example 7. The optical system 1 has an optical design similar to that of Examples 1 to 4, but the reference optical axis A is bent at a right angle in the YZ-plane with the plane mirror MR1 interposed between the lens elements.

Figure 18B:
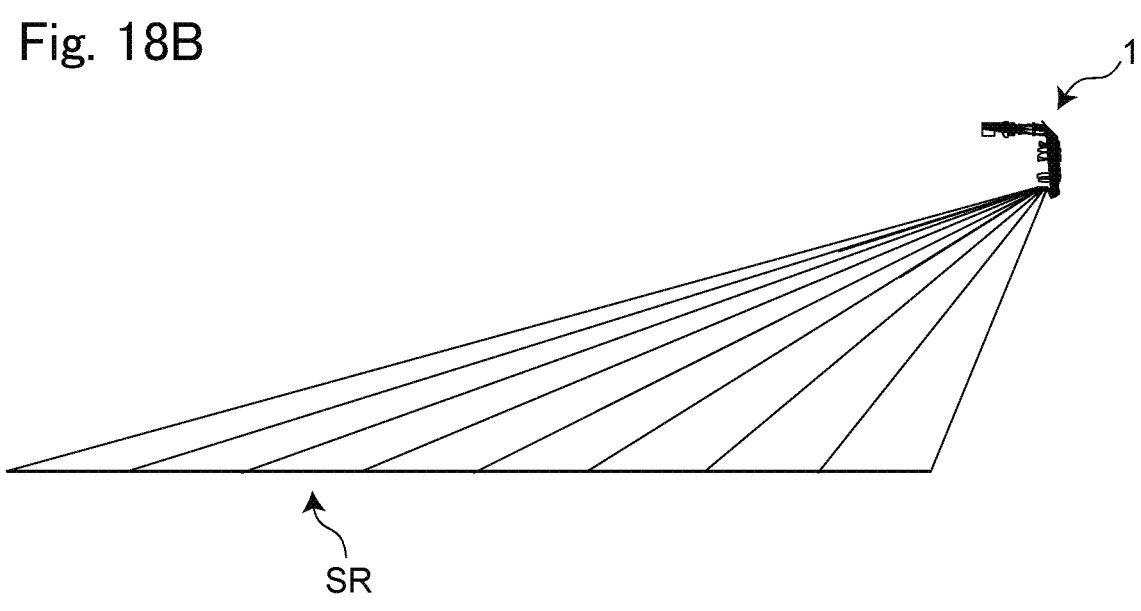
FIG. 18B is an explanatory diagram showing the usage mode of the image projection apparatus using the optical system 1 according to Example 7.

FIG. 18B is an explanatory diagram showing the usage mode of the image projection apparatus using the optical system 1 according to Example 7. The image projection apparatus including the optical system 1 is horizontally located on a support table such as a table or on a floor. The screen SR is installed parallel to the ZX-plane at a position spaced away from the support table by a relatively short horizontal distance, for example, 0.6 m. The light generated from the optical system 1 is projected in an oblique direction to achieve the projection of a short focal length and a large screen. Then, even in a place where the arrangement space between the screen SR and the image projection apparatus is narrow, the projection of a short focal length and a large screen is achieved by bending a part of the optical system 1.

Example 8

Figure 19A:
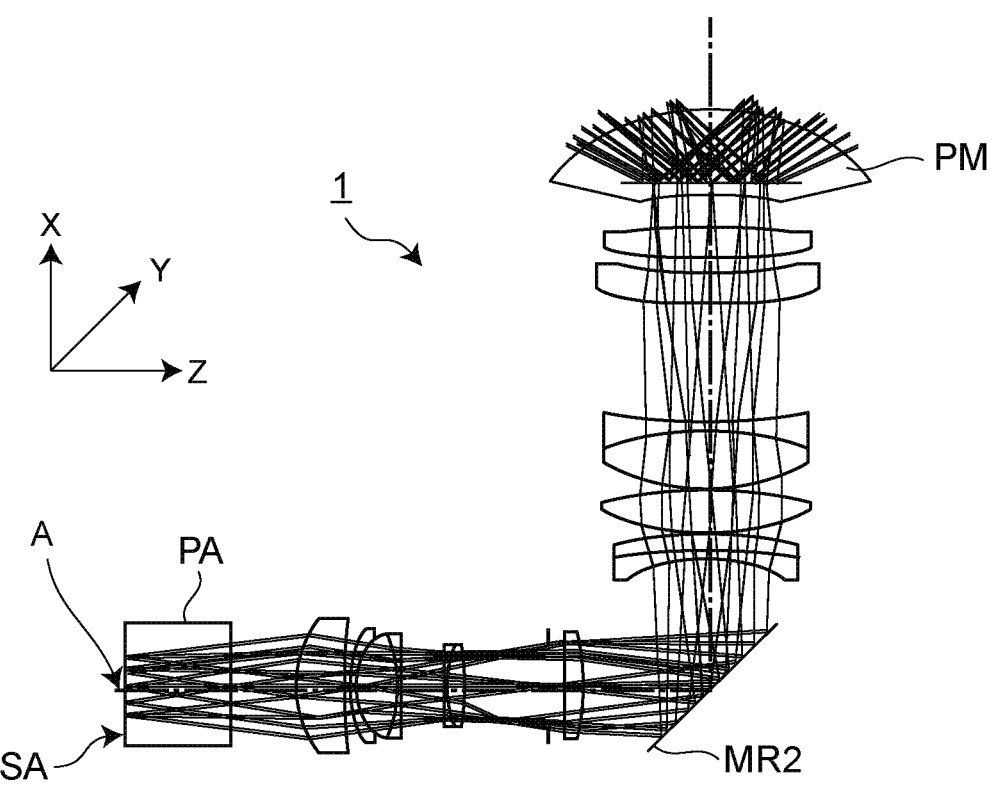
FIG. 19A is an arrangement diagram showing an optical system 1 according to Example 8.

FIG. 19A is an arrangement diagram showing an optical system 1 according to Example 8. The optical system 1 has an optical design similar to that of Examples 1 to 4, but the reference optical axis A is bent at a right angle in the ZX-plane with the plane mirror MR2 interposed between the lens elements.

Figure 19B:
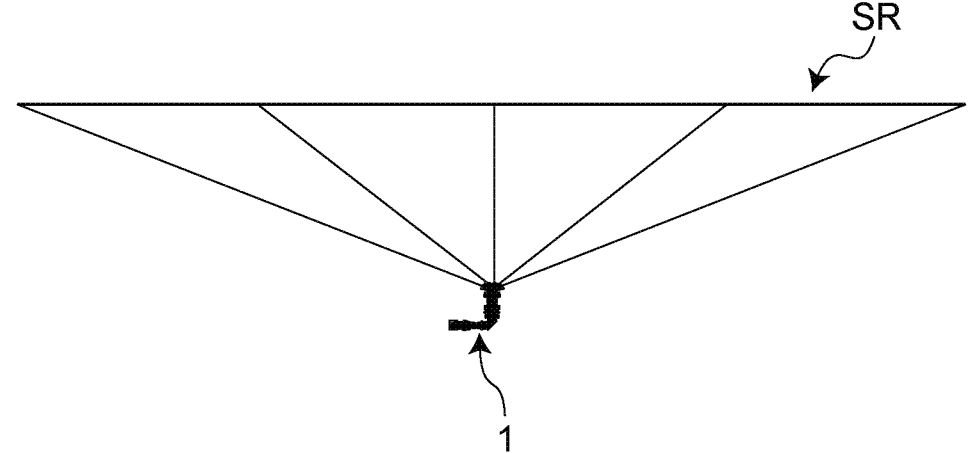
FIG. 19B is an explanatory diagram showing the usage mode of the image projection apparatus using the optical system 1 according to Example 18.

FIG. 19B is an explanatory diagram showing the usage mode of the image projection apparatus using the optical system 1 according to Example 18. The image projection apparatus including the optical system 1 is horizontally located on a support table such as a table or on a floor. The screen SR is installed parallel to the YZ-plane at a position spaced away from the support table by a relatively short horizontal distance, for example, 0.6 m. The light generated from the optical system 1 is projected in an oblique direction to achieve the projection of a short focal length and a large screen.

Example 9 and Example 10

Figures 20A, 20B:
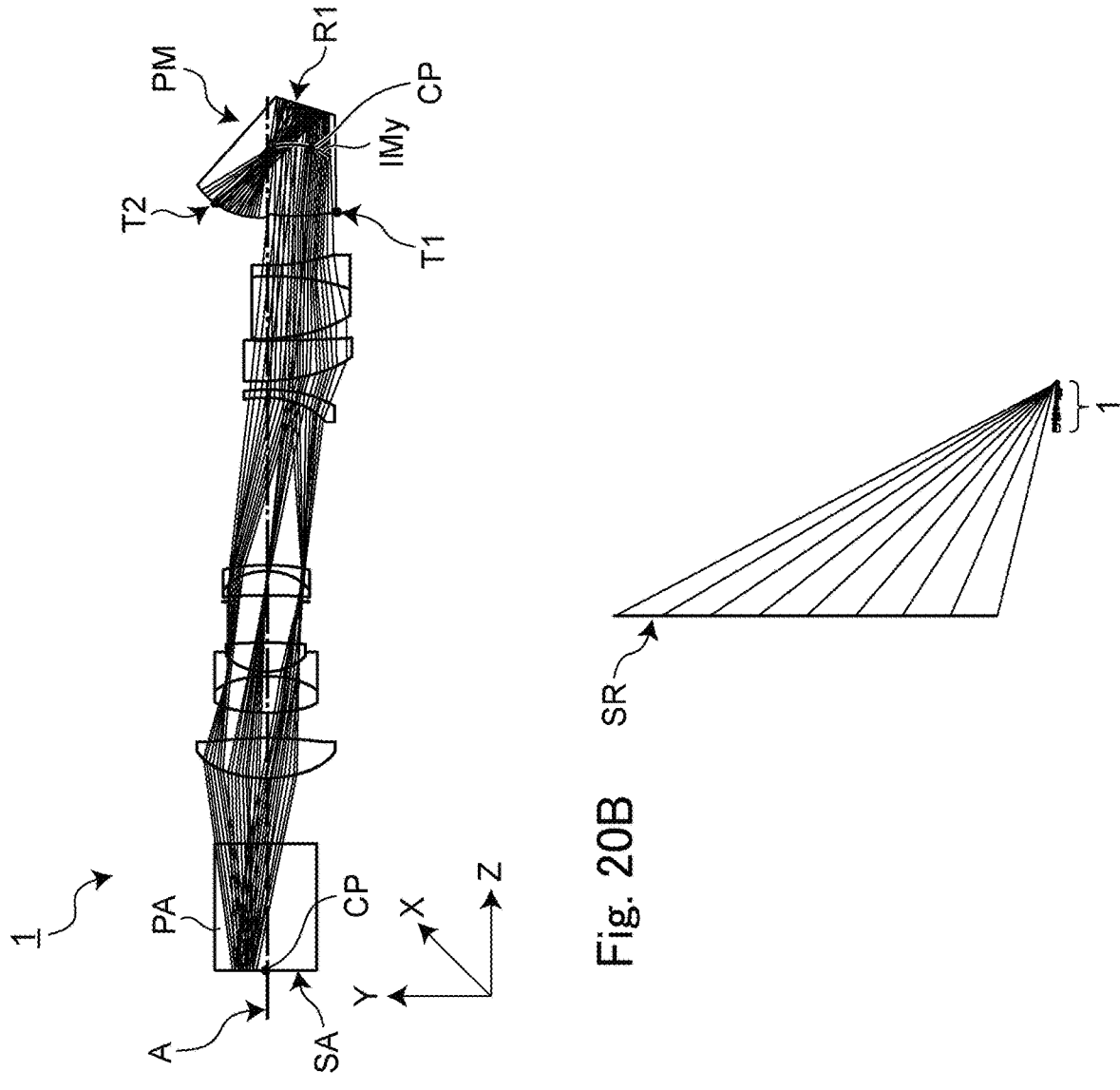
FIG. 20A is an arrangement diagram showing an optical system 1 according to Example 9.
FIG. 20B is an explanatory diagram showing the usage mode of the image projection apparatus using the optical system 1 according to Example 9.
Figures 21A, 21B:
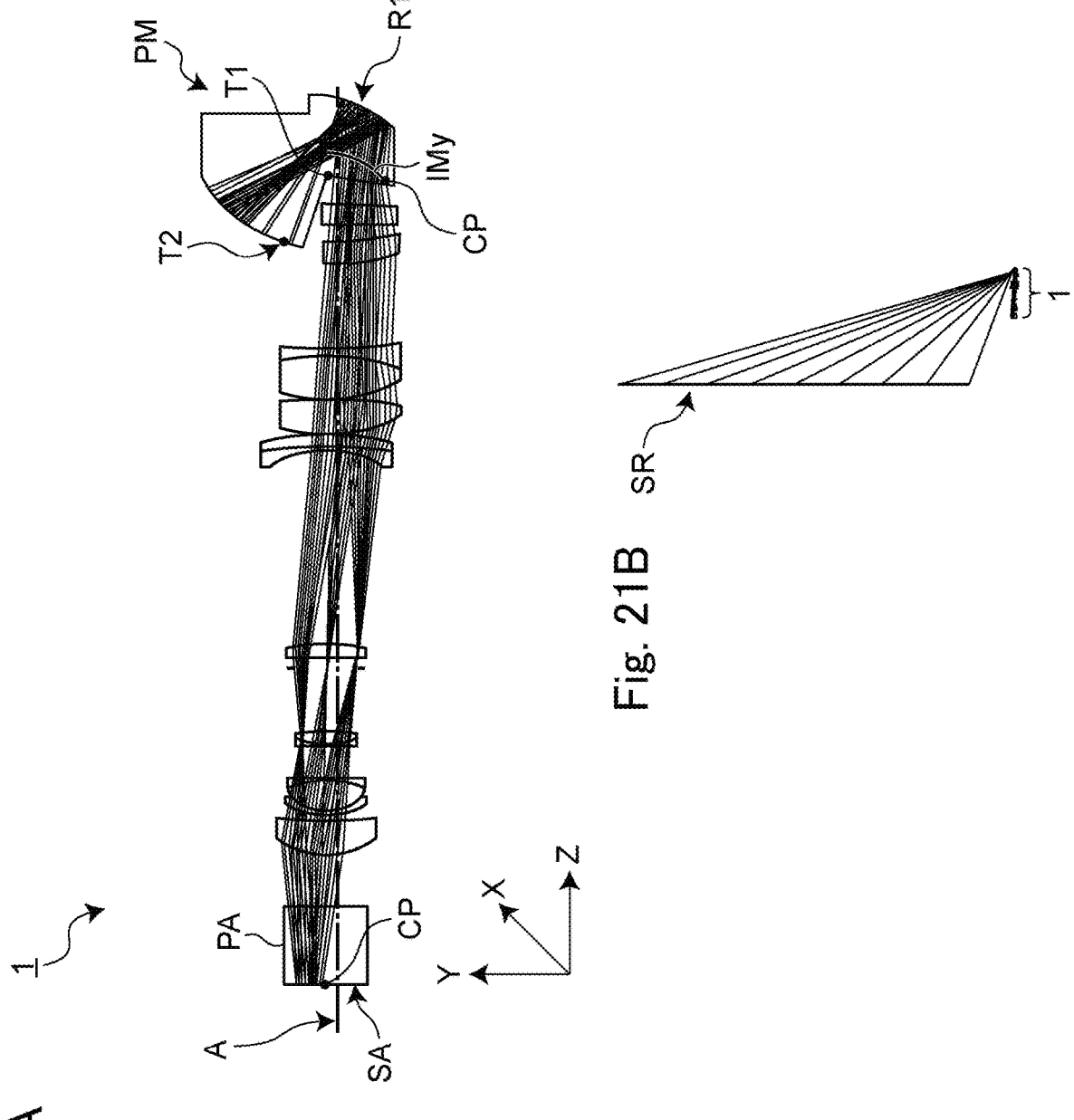
FIG. 21A is an arrangement diagram showing an optical system 1 according to Example 10.
FIG. 21B is an explanatory diagram showing the usage mode of the image projection apparatus using the optical system 1 according to Example 10.

FIG. 20A is an arrangement diagram showing an optical system 1 according to Example 9. FIG. 21A is an arrangement diagram showing an optical system 1 according to Example 10. These optical systems 1 have an optical design similar to that of Examples 1 to 4, but the prism PM has a first transmission surface T1 positioned on the reduction side, a second transmission surface T2 positioned on the magnification side, and one first reflection surface R1 positioned on the optical path between the first transmission surface T1 and the second transmission surface T2. The first transmission surface T1 has a free-form surface shape with the concave surface facing the reduction side. The first reflection surface R1 has a free-form surface shape with the concave surface facing a direction in which a light ray made incident on the first reflection surface R1 is reflected. The second transmission surface T2 has a free-form surface shape with the convex surface facing the magnification side.

FIG. 20B is an explanatory diagram showing the usage mode of the image projection apparatus using the optical system 1 according to Example 9. The image projection apparatus including the optical system 1 is horizontally located on a support table such as a table or on a floor. The screen SR is installed vertically above at a position spaced away from the support table rearward by a relatively short horizontal distance, for example, 0.8 m. The light generated from the optical system 1 is projected rearward and obliquely upward to achieve the projection of a short focal length and a large screen. Then, even in a place where the arrangement space between the screen SR and the image projection apparatus is narrow, the projection of a short focal length and a large screen is achieved by bending a part of the optical system 1.

FIG. 21B is an explanatory diagram showing the usage mode of the image projection apparatus using the optical system 1 according to Example 10. The image projection apparatus including the optical system 1 is horizontally located on a support table such as a table or on a floor. The screen SR is installed vertically above at a position spaced away from the support table rearward by a relatively short horizontal distance, for example, 0.6 m. The light generated from the optical system 1 is projected rearward and obliquely upward to achieve the projection of a short focal length and a large screen. Therefore, the projection of a short focal length and a large screen is achieved while the size in the height direction of the image projection apparatus is suppressed.

As described above, the sub-optical system included in Example 1 to 10 includes three or more convex lenses between the aperture stop and the reduction conjugate point and between the aperture stop and the intermediate imaging position. In this regard, when the image-forming element is located on the reduction conjugate point side, the light from the image-forming element is uniformly guided to the sub-optical system, and thus, an optical system on the reduction conjugate point side is desired to be a substantially telecentric optical system. In addition, also when light is guided from the sub-optical system to the prism PM, by forming an optical system on the magnification conjugate point side of the sub-optical system as a substantially telecentric optical system, there is an effect of suppressing the spread of the light ray made incident on the prism PM and reducing the size of the prism PM.

Furthermore, a positive lens may be arranged as an optical element having a power arranged closest to the reduction conjugate point side in the sub-optical system for suppressing the spread of the light ray on the reduction conjugate point side, thereby further enhancing the substantially telecentric effect.

The second reflection surface of the prism PM included in Examples 1 to 8 is not limited to a flat surface and may include a reflection surface having a curvature. By forming the reflection surface having a curvature, the degree of freedom in the direction of the magnification conjugate point is increased, and the shape accuracy of the reflection surface can be excellently maintained at the time of processing the prism PM. Furthermore, a planar reflecting mirror obtained by applying aluminum vapor deposition or the like to a glass substrate or the like made planar by polishing or the like is bonded from the outside of the second reflection surface of the prism PM, which can be substituted as the second reflection surface. In that case, high plane accuracy can be obtained as the second reflective surface, and the post-processing shape accuracy of the prism PM can be kept good. In the case of the reflection surface having a curvature, a convex surface or a concave surface may be directed in the direction into which a light ray is made incident on the second reflection surface. Furthermore, the optical surface of the second reflection surface may include a rotationally symmetric spherical surface or aspherical surface, or a rotationally asymmetric free-form surface.

Example 1 to 8 includes the second reflection surface, and the convex surfaces of the first reflection surface and the second transmission surface are both faced toward the magnification conjugate point side. With this configuration, it is possible to satisfactorily correct the distortion while further reducing the height of the prism PM. In this case, it is desirable that the normal line of the second reflection surface is directed toward the magnification conjugate point side.

The light flux distribution (footprint) on the optical surface arranged on the magnification side with respect to the intermediate imaging position in the prism PM is distributed so that the light flux size of the reference light ray OAr forming an image at the position closest to the optical system among the magnification conjugate points on the screen SR becomes the smallest. In this regard, the size of the light flux is increased in proportion to the distance between the light flux passing through the prism PM and the magnification side conjugate point, so that the image-forming magnification of each light flux is adjusted, and the distortion on the magnification side and the reduction side can be favorably maintained. Furthermore, by forming each light flux distribution on the optical surface arranged on the magnification side with respect to the intermediate imaging position in the prism PM into a substantially elliptical shape having a major axis in an azimuth projected in the XY-plane in the traveling direction of each light flux, it is possible to adjust the magnification in the X-direction and the Y-direction on the magnification conjugate point side of each light flux and to obtain an effect of satisfactorily correcting distortion.

The prism PM may have a configuration in which a reflection surface is formed on a part of a lens element or the like having an optical surface of a free-form surface shape, and at least one reflection surface may be positioned on an optical path between the first transmission surface and the second transmission surface, so that the same effect as that of the prism PM can be obtained.

The prism PM may have a configuration in which a reflection surface is formed on a part of a lens element or the like having an eccentric rotationally symmetric spherical or aspherical optical surface, and at least one reflection surface may be positioned on an optical path between the first transmission surface and the second transmission surface, so that the same effect as that of the prism PM can be obtained.

The prism PM may have a configuration in which a reflection surface is formed on a part of a lens element or the like having an optical surface of an eccentric free-form surface shape, and at least one reflection surface may be positioned on an optical path between the first transmission surface and the second transmission surface, so that the same effect as that of the prism PM can be obtained.

The prism PM may have a configuration in which the coordinate origin of each optical surface is arranged on the extension line of the reference optical axis A, so that the same effect as that of the prism PM can be obtained.

The prism PM has a positive power because an intermediate image is formed inside and has a magnification side conjugate point on the magnification side of the intermediate image. In addition, since the sub-optical system has a reduction side conjugate point on the reduction side of the intermediate image in the prism PM, the sub-optical system has a positive power. Since both of the prism PM and the sub-optical system have positive powers, it is possible to maintain reduction in size and high optical performance. Furthermore, since the prism PM has a positive power, some of the plurality of principal rays passing through the reduction conjugate point can intersect with each other on the optical path between the first reflection surface and the second transmission surface, thereby a high effect can be expected for distortion correction at the magnification side conjugate point or the reduction side conjugate point.

Next, conditions that can be satisfied by the optical system according to the present embodiment will be described below. Note that, although a plurality of conditions are defined for the optical system according to each example, all of the plurality of conditions may be satisfied or individual conditions may be satisfied, whereby corresponding effects can be obtained.

The optical system according to the present embodiment has a reduction conjugate point CP1 on a reduction side and a magnification conjugate point CP2 on a magnification side, and internally has an intermediate imaging position IM having a conjugate relationship with each of the reduction conjugate point CP1 and the magnification conjugate point CP2.

The optical system includes:
a prism PM provided on the magnification side, the prism PM formed of a transparent medium; and
a sub-optical system OS provided between the reduction conjugate point CP1 and the prism PM, the sub-optical system OS including a plurality of optical elements and an aperture stop ST.

The prism PM includes a first transmission surface T1 positioned on the reduction side, a second transmission surface T2 positioned on the magnification side, and at least one reflection surface (for example, two reflection surfaces R1 and R2) positioned on an optical path between the first transmission surface T1 and the second transmission surface T2.

The aperture stop ST is positioned between the reduction conjugate point CP1 and the intermediate imaging position IM.

A first reflection surface R1 closest to the first transmission surface T1 on the optical path in the prism PM has a shape with a concave surface facing a direction into which a light ray made incident on the first reflection surface R1 is reflected.

The second transmission surface T2 has a shape with a convex surface facing the magnification side.

A part or the whole of an intermediate image formed at the intermediate imaging position IM is positioned inside a medium of the prism PM.

The optical system may satisfy the following Expression (1)

$$0.40 < (TN - ((NI - 1)/8))/PN^2 < 0.64 \qquad (1)$$

where TN represents an average of d-line refractive indexes of positive lenses included in the sub-optical system, NI represents the number of intermediate images, and PN represents a d-line refractive index of the prism.

The optical system may satisfy the following Expression (1a).

$$0.44 < (TN - ((NI - 1)/8))/PN^2 < 0.63 \qquad (1a)$$

Figure 1:
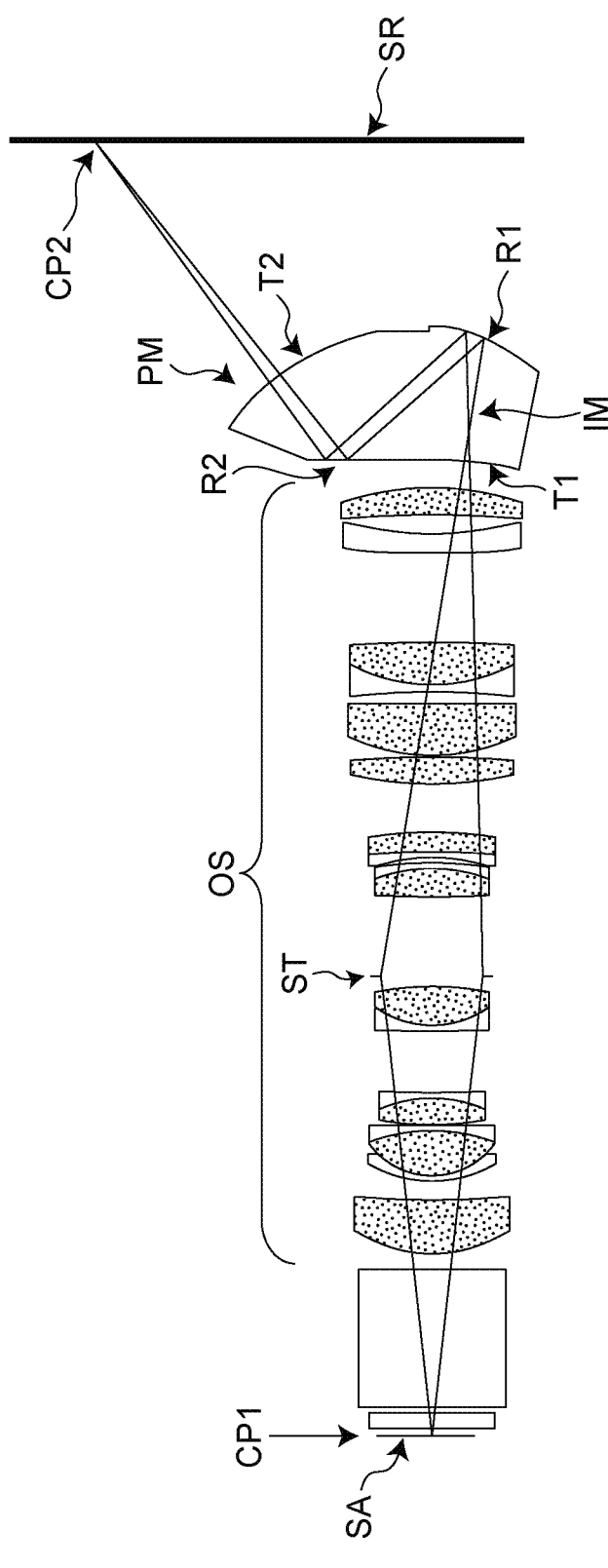
FIG. 1 is an overall configuration diagram of an optical system 1 according to the present embodiment.

FIG. 1 is an overall configuration diagram of an optical system 1 according to the present embodiment. The optical system 1 includes a sub-optical system OS and a prism PM. The sub-optical system OS includes a plurality of optical elements and an aperture stop ST. The sub-optical system OS generally includes a positive lens (indicated by a dot in the figure) having a positive optical power, a negative lens (dotless) having a negative optical power, and an optical element having zero optical power. The prism PM has a first transmission surface T1, a second transmission surface T2, and at least one reflection surface (for example, two reflection surfaces R1 and R2).

The reduction conjugate point CP1 on the reduction side, the magnification conjugate point CP2 on the magnification side, and the intermediate imaging position IM have a conjugate relationship with each other. For example, in a case of an image projection apparatus, an original image SA formed by an image-forming element, such as a liquid crystal or a DMD, is provided at the reduction conjugate point CP1, and a screen SR is provided at the magnification conjugate point CP2. For example, in a case of an imaging device, a solid-state imaging device is provided at the reduction conjugate point CP1, and an object positioned at the magnification conjugate point CP2 is imaged.

In the present embodiment, by focusing on specific parameters (TN, NI, and PN) and satisfying Expression (1) expressing these relationships, the distance from the reduction conjugate point CP1 to the magnification conjugate point CP2 can be shortened, the overall optical length from the reduction conjugate point CP1 to the prism PM can be reduced in size, and particularly the occurrence of chromatic aberration can be suppressed while the optical performance of the optical system is maintained. In addition, miniaturization of the prism PM can also be achieved by considering even the refractive index of the prism PM. If exceeding the upper limit value of Expression (1), the prism PM for correcting the field curvature of the intermediate image at the intermediate imaging position IM formed by the sub-optical system OS becomes larger, and the overall optical length becomes longer. In addition, when the overall optical length is not still changed, distortion occurs, and it is difficult to maintain good optical performance. If falling below the lower limit value of Expression (1), it is difficult to correct the lateral chromatic aberration, and high optical performance cannot be maintained.

The optical system according to the present embodiment has a reduction conjugate point CP1 on a reduction side and a magnification conjugate point CP2 on a magnification side, and internally has an intermediate imaging position IM having a conjugate relationship with each of the reduction conjugate point CP1 and the magnification conjugate point CP2.

The optical system includes:

a prism PM provided on the magnification side, the prism PM formed of a transparent medium; and a sub-optical system OS provided between the reduction conjugate point CP1 and the prism PM, the sub-optical system OS including a plurality of optical elements and an aperture stop ST.

The prism PM includes a first transmission surface T1 positioned on the reduction side, a second transmission surface T2 positioned on the magnification side, and at least one reflection surface (for example, two reflection surfaces R1 and R2) positioned on an optical path between the first transmission surface T1 and the second transmission surface T2.

The aperture stop ST is positioned between the reduction conjugate point CP1 and the intermediate imaging position IM.

A first reflection surface R1 closest to the first transmission surface T1 on the optical path in the prism PM has a shape with a concave surface facing a direction into which a light ray made incident on the first reflection surface R1 is reflected.

The second transmission surface T2 has a shape with a convex surface facing the magnification side.

A part or the whole of an intermediate image formed at the intermediate imaging position IM is positioned inside a medium of the prism PM.

The optical system may satisfy the following Expression (2):

$$PN > 1.60 \qquad (2)$$

According to such a configuration, miniaturization of the prism can be achieved by relatively increasing the refractive index of the prism PM. In addition, projection or imaging of a short focal length and a large screen can be performed. It should be noted that the upper limit of the d-line refractive index PN of the prism is preferably PN<2.00 so that the chromatic dispersion does not become too large. In addition, by setting PN<1.90 as the upper limit of the d-line refractive index PN of the prism, a further suppressing effect of chromatic dispersion can be expected.

Although the prism PM according to the embodiment of the present disclosure is configured to include a free-form surface having no rotationally symmetric axis, Conditional Expression (1) and Conditional Expression (2) can obtain a similar effect even when the prism PM is configured by an optical surface having a rotationally symmetric shape such as a spherical surface or an aspherical surface. In this case, the coordinate origin forming each optical surface of the rotationally symmetric shape constituting the prism PM may be eccentric to each other, or the coordinate origin of each optical surface constituting the prism PM may be arranged on the extension line of the reference optical axis A. However, when each optical surface of the prism PM is a rotationally asymmetric free-form surface or a coordinate origin forming each optical surface is eccentric, a further effect can be obtained.

In addition, by satisfying Conditional Expressions (1) and (2), the effect of miniaturizing the prism PM itself can also be obtained. When the refractive index of the prism PM is relatively increased by ΔNd in the optical system 1 having the prism PM with the refractive index of Nd', it is expected that the prism PM is miniaturized to maximally Nd'/(Nd'+ΔNd) times. For example, assume that the refractive index Nd' of the prism PM be set to 1.6 and ΔNd be set to 0.1, a miniaturizing effect of the prism PM by about 6% at the maximum can be expected while the optical performance and the projection distance is maintained.

In the optical system according to the present embodiment, the reduction conjugate point CP1 may have an image-forming relationship in a rectangular region having a longitudinal direction and a lateral direction; and a plane including a position where a principal ray passing through the center in the longitudinal direction of the rectangular region is reflected by the first reflection surface is defined as a Y cross-section, a cross-section perpendicular to the Y cross-section is defined as an X cross-section, and the curvature shape of the first reflection surface R1 may be set so that, when viewed from a direction perpendicular to the Y cross-section, some of a plurality of principal rays passing through the reduction conjugate point CP1 intersect with each other on an optical path between the first reflection surface R1 and the second transmission surface T2, and so that, when viewed from a direction perpendicular to the X cross-section, some of a plurality of principal rays passing through the reduction conjugate point CP1 intersect with each other on an optical path between the first reflection surface R1 and the second transmission surface T2.

According to such a configuration, concerning both the Y cross-section and the X cross-section, the plurality of principal rays intersect with each other on the optical path between the reflection surface R1 and the second transmission surface T2 of the prism PM. Therefore, the overall optical length can be shortened while the prism PM provided on the magnification side including the reflection surface is maintained in a small size. Furthermore, in the wide image-forming range of the magnification conjugate point CP2, the optical performance including the distortion can be excellently maintained, and the projection range can be enlarged. In addition, the distance between the magnification conjugate point CP2 and the optical system can be shortened.

The optical system according to the present embodiment may satisfy the following Expression (3):

$$0.05 < (LP/YI)/((|\theta a| + |\theta b|)/2) < 0.25 \qquad (3)$$

where LP represents an optical path length of a principal ray of a reference light ray OAr passing through the prism PM, YI represents a maximum image height in the Y-direction along the Y cross-section from the center of the rectangular region of the reduction conjugate point CP1, and θa, θb represent incident angles of two peripheral light rays LRa and LRb that form an image at the magnification conjugate point CP2 with reference to the principal ray of the reference light ray OAr.

The optical system according to the present embodiment may satisfy the following Expression (3a)

$$0.08 < (LP / YI) / ((|\theta a| + |\theta b|) / 2) < 0.21 \tag{3a}$$

Figure 22:
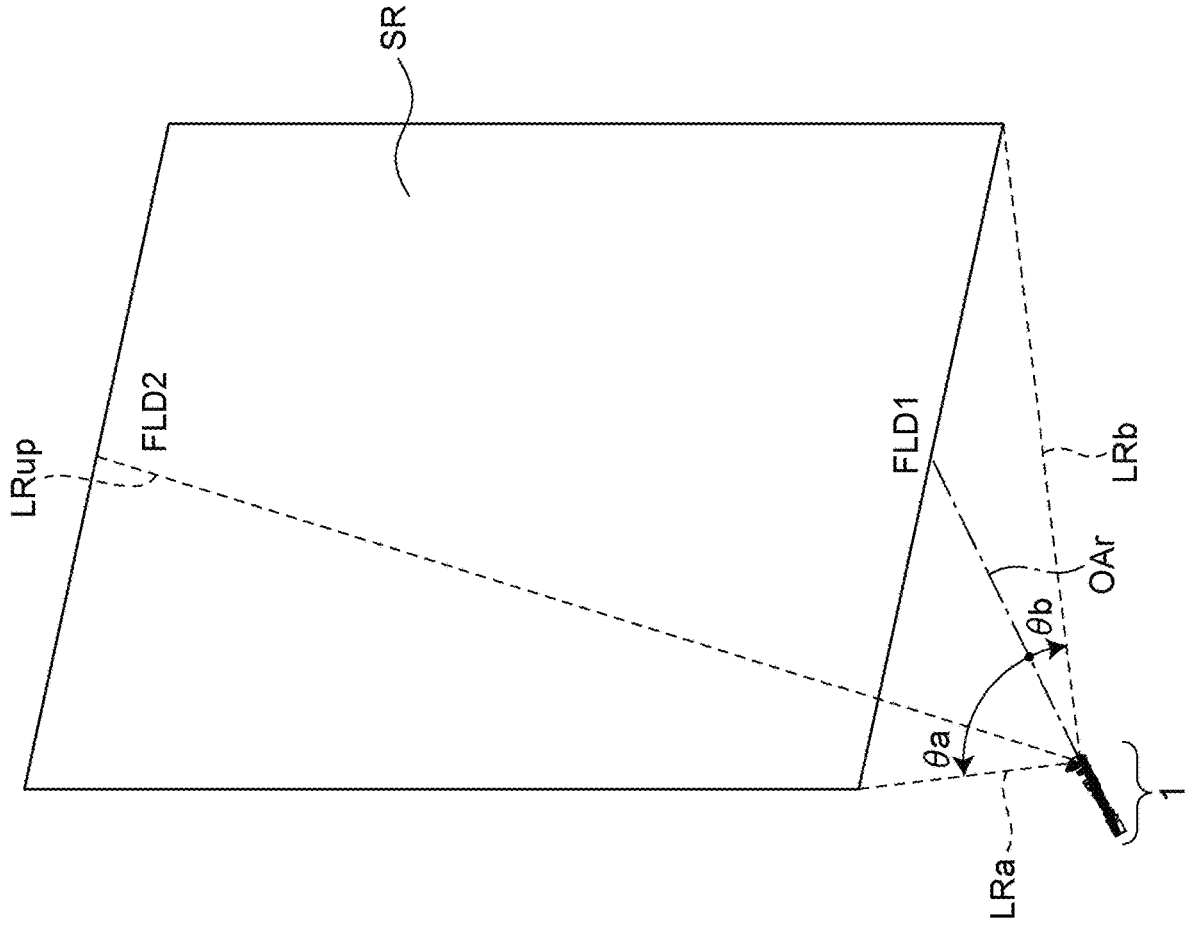
FIG. 22 is an explanatory diagram showing definitions of various light rays between the optical system 1 and an optical surface at the magnification conjugate point.

FIG. 22 is an explanatory diagram showing definitions of various light rays between the optical system 1 and an optical surface at the magnification conjugate point. The reference light ray OAr is defined as a light ray that forms an image at a position FLD1 closest to the optical system among the magnification conjugate points CP2 on the screen SR, that is, (X, Y)=(0, 0). The upper-end light ray LRup is defined as a light ray that forms an image at a position FLD2 farthest from the optical system among light rays having an image-forming relationship at X=0, that is, at (X, Y)=(0, YI) in the rectangular region of the reduction conjugate point CP1. The peripheral light rays LRa and LRb are defined as light rays that form an image at the end portion closest to the optical system among the magnification conjugate points CP2.

In the present embodiment, focusing on specific parameters (LP, YI, $\theta a$, $\theta b$) and satisfying Expression (3) expressing these relationships makes it possible to favorably maintain optical performance including distortion in a wide image-forming range of the magnification conjugate point CP2 and to expand the projection range. In addition, the distance between the magnification conjugate point CP2 and the optical system can be shortened. If exceeding the upper limit value of Expression (3), distortion is excessively corrected, and it is difficult to maintain good optical performance. If falling below the lower limit value of Expression (3), distortion or field curvature occurs, it is difficult to shorten the overall optical length, and the image forming range with good optical performance is narrowed at the magnification conjugate point CP2.

The optical system according to the present embodiment may satisfy the following Expression (4):

$$-0.0100 < Tp / YI < -0.0020 \tag{4}$$

where Tp represents a Petzval sum of the sub-optical system OS.

The optical system according to the present embodiment may satisfy the following Expression (4a):

$$-0.0090 < Tp / YI < -0.0030 \tag{4a}$$

In the present embodiment, focusing on specific parameters (Tp, YI) and satisfying Expression (4) expressing these relationships makes it possible to favorably maintain optical performance including distortion in a wide image-forming range of the magnification conjugate point CP2, and to expand the projection range. In addition, the distance between the magnification conjugate point CP2 and the optical system can be shortened. If exceeding the upper limit value of Expression (4) or falling below the lower limit value of Expression (4), field curvature occurs in the peripheral portion, and it is difficult to maintain good optical performance.

It should be noted that the Petzval sum Tp is expressed by the following Formula (Fa) where an optical element surface on the most reduction side of the sub-optical system OS is indexed as 1, each optical element surface is indexed as i, an optical element surface on the most magnification side is indexed as m, a refractive index on the reduction side of the optical element surface i is ni−1, and a refractive index on the magnification side thereof is ni.

[Mathematical Formula 1]

$$Tp = \sum_{i=1}^{m} \frac{1}{r_i} \left( \frac{1}{n_i} - \frac{1}{n_{i-1}} \right) \tag{Fa}$$

The optical system according to the present embodiment may satisfy the following Expression (5):

$$0.50 < XMM / YMM < 1.50 \tag{5}$$

where XMM represents an X-direction imaging magnification at the intermediate imaging position IM with respect to the reduction conjugate point CP1, and YMM represents a Y-direction imaging magnification at the intermediate imaging position IM with respect to the reduction conjugate point CP1.

The optical system according to the present embodiment may satisfy the following Expression (5a):

$$0.65 < XMM / YMM < 1.65 \tag{5a}$$

In the present embodiment, focusing on specific parameters (XMM, YMM) and satisfying Expression (5) expressing these relationships makes it possible to favorably maintain optical performance including distortion in a wide image-forming range of the magnification conjugate point CP2, and to expand the projection range. In addition, the distance between the magnification conjugate point CP2 and the optical system can be shortened. If exceeding the upper limit value of Expression (5) or falling below the lower limit value of Expression (5), astigmatism occurs at the magnification conjugate point CP2, and it is difficult to maintain good optical performance. It should be noted that XMM and YMM are conditional expressions at the intermediate imaging position in the air, but may be values converted in consideration of the refractive index of the prism PM.

The optical system according to the present embodiment may satisfy the following Expression (6):

$$45 < Tv < 65 \tag{6}$$

where Tv represents an average of Abbe numbers of positive lenses included in the sub-optical system OS.

The optical system according to the present embodiment may satisfy the following Expression (6a):

$$47.5 < Tv < 62.5 \tag{6a}$$

In the present embodiment, by focusing on a specific parameter (Tv) and satisfying Expression (6) expressing these relationships, the distance from the reduction conjugate point CP1 to the magnification conjugate point CP2 can be shortened, the overall optical length from the reduction conjugate point CP1 to the prism PM can be reduced in size, and particularly the occurrence of chromatic aberration can be suppressed while the optical performance of the optical system is maintained. In addition, miniaturization of the prism PM can also be achieved by considering even the Abbe number of the prism PM. If exceeding the upper limit value of Expression (6), the occurrence of chromatic aberration can be suppressed, but the overall optical length becomes longer. If falling below the lower limit value of Expression (6), the overall optical length can be shortened, but correction of chromatic aberration becomes difficult, and good optical performance cannot be obtained.

The optical system according to the present embodiment may satisfy the following Expression (7):

$$0.70 < (PN / TN) \times (Tv / Pv) < 1.90 \tag{7}$$

where Pv represents an Abbe number of the prism PM, and Tv represents an average of Abbe numbers of positive lenses included in the sub-optical system OS.

The optical system according to the present embodiment may satisfy the following Expression (7a):

$$0.80 < (PN / TN) \times (Tv / Pv) < 1.80 \tag{7a}$$

In the present embodiment, by focusing on specific parameters (Pv, Tv) and satisfying Expression (7) expressing these relationships, the overall optical length can be reduced in size, and particularly the occurrence of chromatic aberration can be suppressed while the optical performance of the optical system is maintained. In addition, miniaturization of the prism PM can also be achieved by considering even the Abbe number of the prism PM. If exceeding the upper limit value of Expression (7), the overall optical length can be shortened, but correction of chromatic aberration becomes difficult, and good optical performance cannot be obtained. If falling below the lower limit value of Expression (7), the occurrence of chromatic aberration can be suppressed, but the overall optical length becomes longer.

The optical system according to the present embodiment may satisfy the following Expression (8):

$$1.55 < TN < 1.75 \tag{8}$$

In the present embodiment, by focusing on a specific parameter (TN) and satisfying Expression (8), the overall optical length can be reduced in size, and particularly the occurrence of chromatic aberration can be suppressed while the optical performance of the optical system is maintained.

In addition, miniaturization of the prism PM can also be achieved. If exceeding the upper limit value of Expression (8), the overall optical length can be shortened, but correction of chromatic aberration becomes difficult, and good optical performance cannot be obtained. If falling below the lower limit value of Expression (8), the occurrence of chromatic aberration can be suppressed, but the overall optical length becomes longer.

The optical system according to the present embodiment may satisfy the following Expression (9):

$$35 < Pv < 65 \tag{9}$$

where Pv represents an Abbe number of the prism.

The optical system according to the present embodiment may satisfy the following Expression (9a):

$$37.5 < Pv < 62.5 \tag{9a}$$

In the present embodiment, by focusing on a specific parameter (Pv) and satisfying Expression (9), the overall optical length can be reduced in size, and particularly the occurrence of chromatic aberration can be suppressed while the optical performance of the optical system is maintained. In addition, miniaturization of the prism PM can also be achieved. If exceeding the upper limit value of Expression (9), the occurrence of chromatic aberration can be suppressed, but the overall optical length becomes longer. If falling below the lower limit value of Expression (9), the overall optical length can be shortened, but correction of chromatic aberration becomes difficult, and good optical performance cannot be obtained.

The optical system according to the present embodiment may satisfy the following Expression (10):

$$45 < Tv < 65 \tag{10}$$

where Tv represents an average of Abbe numbers of positive lenses included in the sub-optical system OS.

The optical system according to the present embodiment may satisfy the following Expression (10a):

$$47.5 < Tv < 62.5 \tag{10a}$$

In the present embodiment, by focusing on a specific parameter (Tv) and satisfying Expression (10), the overall optical length can be reduced in size, and particularly the occurrence of chromatic aberration can be suppressed while the optical performance of the optical system is maintained. In addition, miniaturization of the prism PM can also be achieved by considering even the Abbe number of the positive lens included in the sub-optical system OS. If exceeding the upper limit value of Expression (10), the occurrence of chromatic aberration can be suppressed, but the overall optical length becomes longer. If falling below the lower limit value of Expression (10), the overall optical length can be shortened, but correction of chromatic aberration becomes difficult, and good optical performance cannot be obtained.

In the optical system according to the present embodiment, at least any one of the first transmission surface T1, the second transmission surface T2, and the at least one reflection surface R1 or R2 of the prism PM may include a rotationally asymmetric surface.

According to such a configuration, the overall optical length can be shortened while the prism PM provided on the magnification side including a reflection surface is maintained in a small size. Furthermore, in the wide image-forming range of the magnification conjugate point CP2, the optical performance including the distortion can be excellently maintained, and the projection range can be enlarged. In addition, the distance between the magnification conjugate point CP2 and the optical system can be shortened.

In the optical system according to the present embodiment, the prism PM may be a prism main body integrally molded with a single refractive index material, or may include the prism main body and a coating.

According to such a configuration, the number of optical components can be reduced. In addition, since component accuracy can be secured by integral molding, position adjustment between a plurality of components becomes unnecessary, and manufacturing costs can be suppressed.

In the optical system according to the present embodiment, the intermediate image positioned inside the medium of the prism PM may be present only between the first transmission surface T1 and the first reflection surface R1 closest to the first transmission surface T1.

According to such a configuration, the overall optical length can be shortened while the prism PM disposed on the magnification side including a reflection surface is maintained in a small size. Furthermore, in the wide image-forming range of the magnification conjugate point CP2, the optical performance including the distortion can be excellently maintained, and the projection range can be enlarged. In addition, the distance between the magnification conjugate point CP2 and the optical system can be shortened.

In the optical system according to the present embodiment, the sub-optical system OS may include a plurality of rotationally symmetric lens elements. When an axis passing through at least two centers of the rotationally symmetric lens elements is defined as a reference optical axis A, at least one optical surface among an optical surface group consisting of the first transmission surface T1, the second transmission surface T2, and the at least one reflection surface R1 or R2 of the prism PM may be formed so that in a plane perpendicular to the reference optical axis A, a maximum angle θmax and a minimum angle θmin of an angle at which a principal ray of light rays having an image-forming relationship on a concentric circle centered on an intersection of the reference optical axis A and a reduction conjugate point of the rectangular region intersects with a normal line of a plane at a position where the principal ray is made incident on the optical surface satisfy the following Expression (11):

$$0.014° < |\theta max| - |\theta min| < 45.000° \tag{11}$$

According to such a configuration, the overall optical length can be shortened while the prism PM provided on the magnification side including a reflection surface is maintained in a small size. Furthermore, in the wide image-forming range of the magnification conjugate point CP2, the optical performance including the distortion can be excellently maintained, and the projection range can be enlarged.

In addition, the distance between the magnification conjugate point CP2 and the optical system can be shortened. If exceeding the upper limit value of Expression (11), since the light ray is made incident on the reflection surface at an acute angle, the light flux area becomes larger and the influence of the shape accuracy of the optical surface becomes larger. If falling below the lower limit value of Expression (11), the optical surface different in curvatures in the X-direction and the Y-direction perpendicular to the reference optical axis A cannot be utilized, it becomes difficult to shorten the overall optical length, and the image-forming range with good optical performance is narrowed at the magnification conjugate point CP2.

In the optical system according to the present embodiment, the sub-optical system OS may include a plurality of rotationally symmetric lens elements. When an axis passing through at least two centers of the rotationally symmetric lens elements is defined as a reference optical axis A, and when a principal ray of a light ray has an image forming relationship on a concentric circle centered on an intersection of the reference optical axis A and a reduction conjugate point of the rectangular region in a plane perpendicular to the reference optical axis A, a maximum optical path length difference ΔLmax of an optical path through which the principal ray passes through the inside of the prism PM may satisfy the following Expression (12) using a radius r of the concentric circle:

$$0.001 < \Delta Lmax/r < 0.100 \tag{12}$$

According to such a configuration, the overall optical length can be shortened while the prism PM provided on the magnification side including a reflection surface is maintained in a small size. Furthermore, in the wide image-forming range of the magnification conjugate point CP2, the optical performance including the distortion can be excellently maintained, and the projection range can be enlarged. In addition, the distance between the magnification conjugate point CP2 and the optical system can be shortened. If exceeding the upper limit value of Expression (12), distortion is excessively corrected, and it is difficult to maintain good optical performance. If falling below the lower limit value of Expression (12), the optical surface different in curvatures in the X-direction and the Y-direction perpendicular to the reference optical axis A cannot be utilized, it becomes difficult to shorten the overall optical length, and the image-forming range with good optical performance is narrowed at the magnification conjugate point CP2.

In the optical system according to the present embodiment, the maximum optical path length Lmax of the optical path through which the principal ray passes through the inside of the prism PM may satisfy the following Expression (13) using the radius r of the concentric circle:

$$2 < Lmax/r < 30 \tag{13}$$

According to such a configuration, the overall optical length can be shortened while the prism PM disposed on the magnification side including a reflection surface is maintained in a small size. Furthermore, in the wide image-forming range of the magnification conjugate point CP2, the optical performance including the distortion can be excellently maintained, and the projection range can be enlarged.

In addition, the distance between the magnification conjugate point CP2 and the optical system can be shortened. If exceeding the upper limit value of Expression (13), it is difficult to reduce the size of the optical system arranged on the magnification side. In particular, when the effective diameter of the second transmission surface T2 increases, the molding time increases, leading to an increase in cost. If falling below the lower limit value of Expression (13), it becomes difficult to form an optical surface necessary for favorably maintaining optical performance including distortion.

In the optical system according to the present embodiment, a planar portion perpendicular to the reference optical axis A may be provided in a part of the outer peripheral portion of the prism PM.

Figures 23A, 23B:
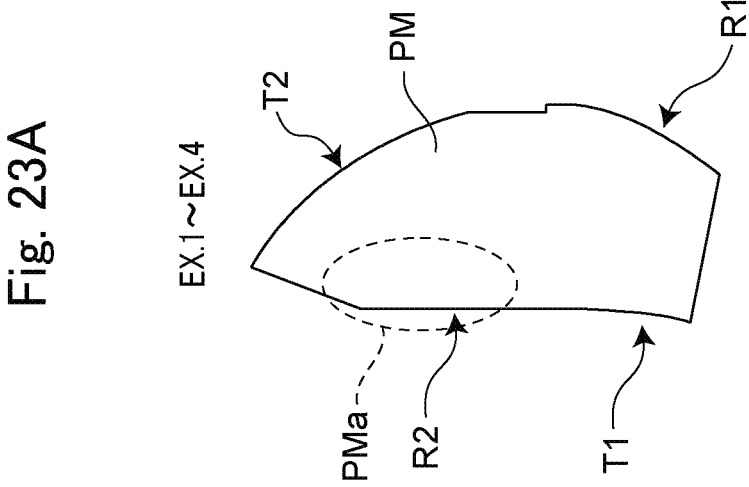
FIG. 23A is a cross-sectional view in the Y-direction showing various examples of the stepped structure of the prism PM according to Examples 1 to 4.
FIG. 23B is a cross-sectional view in the Y-direction showing various examples of the stepped structure of the prism PM according to Example 5.

FIG. 23A is a cross-sectional view in the Y-direction showing various examples of the stepped structure of the prism PM according to Examples 1 to 4. FIG. 23B is a cross-sectional view in the Y-direction showing various examples of the stepped structure of the prism PM according to Example 5. Various lens elements and various prisms constituting the optical system 1 are generally attached inside a lens barrel (not shown) using an adhesive, a metal fitting, or the like. At that time, a highly accurate attachment structure is required to faithfully reproduce various dimensions of the optical design.

For example, an end surface PMa serving as an attachment reference is provided on a part of the outer peripheral portion of the prism PM. The end surface PMa can be formed to be a planar portion perpendicular to the reference optical axis A. On the other hand, the lens barrel is provided with a planar portion corresponding to the shape of the end surface PMa. At the time of attachment, by fitting the end surface PMa of the prism PM to the planar portion of the lens barrel, the prism PM can be fixed to the lens barrel with high accuracy and stability. Furthermore, by disposing the end face PMa at a position facing the sub-optical system side, the end face PMa can be more accurately and stably fixed to the lens barrel.

A protective film made of a dielectric, glass, polymer, or the like may be applied to the second transmission surface T2 of the prism PM according to Examples 1 to 10. According to such a configuration, the second transmission surface T2 exposed to the outside can be protected from scratches and dirt. In addition, in order to protect the second transmission surface T2 of the prism PM, a transparent cover may be provided closer to the magnification side than the second transmission surface T2. The transparent cover may be formed of a surface having an optical power or a surface having no optical power.

The optical system according to the present embodiment has a reduction conjugate point on the reduction side and a magnification conjugate point on the magnification side and internally has one intermediate imaging position, the intermediate imaging position having a conjugate relationship with each of the reduction conjugate point and the magnification conjugate point, and may satisfy the following Expression (14):

$$0.80 < TN/PN < 1.01 \tag{14}$$

In the present embodiment, by focusing on specific parameters (TN, PN) and satisfying Expression (14) expressing these relationships, the distance from the reduction conjugate point CP1 to the magnification conjugate point CP2 can be shortened, the overall optical length from the reduction conjugate point CP1 to the prism PM can be reduced in size, and particularly the occurrence of chromatic aberration can be suppressed while the optical performance of the optical system is maintained. In addition, miniaturization of the prism PM can also be achieved by considering even the refractive index of the prism PM. If exceeding the upper limit value of Expression (14), the prism PM for correcting the field curvature of the intermediate image at the intermediate imaging position IM formed by the sub-optical system OS becomes larger, and the overall optical length becomes longer. In addition, when the overall optical length is maintained, distortion occurs, and it is difficult to maintain good optical performance. If falling below the lower limit value of Expression (14), it is difficult to correct the lateral chromatic aberration, and high optical performance cannot be maintained.

The optical system according to the present embodiment may satisfy the following Expression (14a):

$$0.83 < TN/PN < 1.01 \tag{14a}$$

Hereinafter, numerical examples of the optical system according to Reference and Examples 1 to 6 are described. In each of the numerical examples, in the table, the unit of length is all "mm", and the unit of angle of view is all "°" (degree). Further, in each of the numerical examples, radius of curvature (ROC), surface interval, Nd (refractive index for d line), νd (Abbe number for d line), N550 (refractive index at a wavelength of 550 nm), eccentricity data (displacements X, Y, Z of a prism surface with respect to the previous surface and normal directions a, B, y of the prism surface with respect to the previous surface in the optical system) are listed. Furthermore, in each of the numerical examples, the aspherical (ASP) shape is defined by the following formula (Fb), where for the aspherical coefficient, only non-zero coefficients are shown other than conic constant.

[Mathematical Formula 2]

$$z = \frac{cr^2}{1 + \sqrt{1 - (1+k)c^2 r^2}} + Ar^4 + Br^6 + Cr^8 + Dr^{10} + Er^{12} + Fr^{14} + Gr^{16} + Hr^{18} \tag{Fb}$$

where, Z is a sag height of a surface as measured in parallel to z-axis, r is a distance in the radial direction ($=\sqrt{(x^2+y^2)}$), c is a vertex curvature, k is a conic constant, and A to H are 4th to 18th order aspherical coefficients.

A free-form surface (FFS) shape is defined by the following formulas (Fc) and (Fd) using a local Cartesian coordinate system (x, y, z) with the vertex thereof as origin point.

[Mathematical Formula 3]

$$z = \frac{cr^2}{1 + \sqrt{1 - (1+k)c^2 r^2}} + \sum_{j=2}^{137} C_j x^m y^n \tag{Fc}$$

-continued

[Mathematical Formula 4]

$$j = \frac{(m+n)^2 + m + 3n}{2} + 1 \qquad \text{(Fd)}$$

where, Z is a sag height of a surface as measured in parallel to z-axis, r is a distance in the radial direction ($=\sqrt{(x^2+y^2)}$), c is a vertex curvature, k is a conic constant, and Cj is a coefficient of a monomial $X^m y^n$. Further, in the following data table, member of ith-order of x and jth-order of y, showing a free-form surface coefficient in the polynomial formula, is expressed by the shorthand notation "X**i*Y**i". For example, a notation "X*2*Y" shows a free-form surface coefficient of a member of 2nd-order of x and 1st-order of y in the polynomial formula.

Numerical Reference

Regarding the optical system of Numerical Reference (corresponding to Reference), Table 1 shows lens data, Table 2 shows aspherical surface shape data of the lenses, and Table 3 shows free-form surface shape data of the prism.

TABLE 1

| | SURF. | | | | SURFACE | MATERIAL | |
|---|---|---|---|---|---|---|---|
| | NO. | | | ROC | INTERVAL | Nd | vd |
| REDUC. SIDE (IMG. FORM. ELEMENT) | 1 | | | | 0.000 | | |
| PA | 2 | | | ∞ (infinity) | 28.000 | 1.51680 | 64.20 |
| | 3 | | | ∞ | 4.844 | | |
| L1 | 4 | ASPHERE | | 23.640 | 9.740 | 1.68894 | 31.31 |
| | 5 | ASPHERE | | 190.368 | 3.380 | | |
| L2 | 6 | | | 22.533 | 1.000 | 2.00069 | 25.46 |
| L3 | 7 | | | 13.987 | 8.097 | 1.49700 | 81.61 |
| L4 | 8 | | | −32.414 | 1.000 | 2.00330 | 28.27 |
| | 9 | | | −871.075 | 0.100 | | |
| L5 | 10 | | | 53.436 | 4.782 | 1.59522 | 67.73 |
| L6 | 11 | | | −23.713 | 1.000 | 1.72151 | 29.28 |
| | 12 | | | 177.242 | 11.804 | | |
| L7 | 13 | | | 712.719 | 1.000 | 1.73800 | 32.33 |
| L8 | 14 | | | 17.617 | 7.016 | 1.75520 | 27.58 |
| | 15 | | | −52.949 | 1.870 | | |
| STOP ST | 16 | | | ∞ | 15.000 | | |
| L9 | 17 | | | 214.618 | 5.090 | 1.74000 | 28.24 |
| L10 | 18 | | | −28.588 | 1.000 | 1.73800 | 32.33 |
| | 19 | | | −71.754 | 1.000 | | |
| L11 | 20 | | | −32.967 | 1.000 | 1.73400 | 51.51 |
| L12 | 21 | | | −135.386 | 3.544 | 1.73627 | 31.99 |
| | 22 | | | −72.561 | 9.401 | | |
| L13 | 23 | | | 66.013 | 4.828 | 1.45650 | 90.27 |
| | 24 | | | −180.780 | 0.303 | | |
| L14 | 25 | | | 35.235 | 9.321 | 1.48749 | 70.40 |
| | 26 | | | −91204.413 | 2.124 | | |
| L15 | 27 | | | −129.629 | 1.310 | 1.75520 | 27.58 |
| L16 | 28 | | | 31.324 | 7.657 | 1.48746 | 70.03 |
| | 29 | | | −215.620 | 16.121 | | |
| L17 | 30 | ASPHERE | | 1330.689 | 3.401 | 1.74077 | 27.71 |
| | 31 | ASPHERE | | 47.717 | 3.446 | | |
| L18 | 32 | ASPHERE | | −227.053 | 4.899 | 1.56500 | 52.96 |
| | 33 | ASPHERE | | −48.989 | 5.713 | | |
| T1 | 34 | FREE-FORM | | 20.657 | −29.017 | 1.53996 | 59.46 |
| R1 | 35 | FREE-FORM | REF. SURF. | −69.791 | −11.280 | 1.53996 | 59.46 |
| R2 | 36 | | REF. SURF. | ∞ | 15.413 | 1.53996 | 59.46 |
| T1 | 37 | FREE-FORM | | −41.832 | 683.549 | | |
| MAG. SIDE (SCREEN) | 38 | | | | | | |

| | ECCENTRICITY DATA | | | | | |
|---|---|---|---|---|---|---|
| SURF. NO. | X | Y | Z | α | β | γ |
| 1 | 0.000 | −1.500 | 0.000 | 0.000 | 0.000 | 0.000 |
| 2 | 0.000 | 0.000 | 0.000 | 0.000 | 0.000 | 0.000 |
| 3 | 0.000 | 0.000 | 0.000 | 0.000 | 0.000 | 0.000 |
| 4 | 0.000 | 0.000 | 0.000 | 0.000 | 0.000 | 0.000 |
| 5 | 0.000 | 0.000 | 0.000 | 0.000 | 0.000 | 0.000 |
| 6 | 0.000 | 0.000 | 0.000 | 0.000 | 0.000 | 0.000 |
| 7 | 0.000 | 0.000 | 0.000 | 0.000 | 0.000 | 0.000 |

TABLE 1-continued

| | | | | | | |
|---|---|---|---|---|---|---|
| | Lens data | | | | | |
| 8 | 0.000 | 0.000 | 0.000 | 0.000 | 0.000 | 0.000 |
| 9 | 0.000 | 0.000 | 0.000 | 0.000 | 0.000 | 0.000 |
| 10 | 0.000 | 0.000 | 0.000 | 0.000 | 0.000 | 0.000 |
| 11 | 0.000 | 0.000 | 0.000 | 0.000 | 0.000 | 0.000 |
| 12 | 0.000 | 0.000 | 0.000 | 0.000 | 0.000 | 0.000 |
| 13 | 0.000 | 0.000 | 0.000 | 0.000 | 0.000 | 0.000 |
| 14 | 0.000 | 0.000 | 0.000 | 0.000 | 0.000 | 0.000 |
| 15 | 0.000 | 0.000 | 0.000 | 0.000 | 0.000 | 0.000 |
| 16 | 0.000 | 0.000 | 0.000 | 0.000 | 0.000 | 0.000 |
| 17 | 0.000 | 0.000 | 0.000 | 0.000 | 0.000 | 0.000 |
| 18 | 0.000 | 0.000 | 0.000 | 0.000 | 0.000 | 0.000 |
| 19 | 0.000 | 0.000 | 0.000 | 0.000 | 0.000 | 0.000 |
| 20 | 0.000 | 0.000 | 0.000 | 0.000 | 0.000 | 0.000 |
| 21 | 0.000 | 0.000 | 0.000 | 0.000 | 0.000 | 0.000 |
| 22 | 0.000 | 0.000 | 0.000 | 0.000 | 0.000 | 0.000 |
| 23 | 0.000 | 0.000 | 0.000 | 0.000 | 0.000 | 0.000 |
| 24 | 0.000 | 0.000 | 0.000 | 0.000 | 0.000 | 0.000 |
| 25 | 0.000 | 0.000 | 0.000 | 0.000 | 0.000 | 0.000 |
| 26 | 0.000 | 0.000 | 0.000 | 0.000 | 0.000 | 0.000 |
| 27 | 0.000 | 0.000 | 0.000 | 0.000 | 0.000 | 0.000 |
| 28 | 0.000 | 0.000 | 0.000 | 0.000 | 0.000 | 0.000 |
| 29 | 0.000 | 0.000 | 0.000 | 0.000 | 0.000 | 0.000 |
| 30 | 0.000 | 0.000 | 0.000 | 0.000 | 0.000 | 0.000 |
| 31 | 0.000 | 0.000 | 0.000 | 0.000 | 0.000 | 0.000 |
| 32 | 0.000 | 0.000 | 0.000 | 0.000 | 0.000 | 0.000 |
| 33 | 0.000 | 0.000 | 0.000 | 0.000 | 0.000 | 0.000 |
| 34 | 0.000 | 0.000 | 0.000 | 0.000 | 0.000 | 0.000 |
| 35 | 0.000 | −77.924 | 0.000 | −24.186 | 0.000 | 0.000 |
| 36 | 0.000 | 95.857 | 0.000 | 24.186 | 0.000 | 0.000 |
| 37 | 0.000 | 13.461 | 0.000 | 36.207 | 0.000 | 0.000 |
| 38 | 0.000 | 0.000 | 0.000 | 0.000 | 0.000 | 0.000 |

| IMAGE DISPLAY SIZE | |
|---|---|
| X | 14.516 |
| Y | 9.072 |
| Fno | 2.000 |

TABLE 2

| | | | Aspherical (ASP) shape | | | |
|---|---|---|---|---|---|---|
| SURF. NO. | 4 | 5 | 30 | 31 | 32 | 33 |
| Y-ROC | 23.640 | 190.368 | 1330.689 | 47.717 | −227.053 | −48.989 |
| CONIC CONST. | −4.3444E−01 | 0.0000E+00 | 0.0000E+00 | −1.2412E+01 | 0.0000E+00 | 0.0000E+00 |
| 4th | 1.6112E−06 | 1.1282E−05 | 1.5164E−05 | 1.8620E−06 | −3.7565E−06 | 2.6850E−06 |
| 6th | −2.3038E−08 | −2.8071E−08 | −1.4803E−08 | −5.4549E−09 | 5.0202E−09 | −2.8883E−09 |
| 8th | 2.1718E−12 | −1.2550E−10 | 1.6813E−11 | −6.2680E−13 | 1.0935E−11 | −1.4598E−11 |
| 10th | −1.9671E−13 | 4.0745E−15 | −9.7800E−15 | 2.2122E−15 | 1.4521E−14 | −1.8921E−14 |
| 12th | −5.7900E−16 | −8.2255E−16 | −1.7306E−18 | 5.0329E−18 | 3.8419E−17 | 1.2833E−16 |
| 14th | 6.7958E−19 | −6.0953E−18 | −4.9402E−21 | 3.1670E−20 | 1.9922E−19 | 7.1957E−19 |
| 16th | −8.4165E−21 | 2.4615E−20 | 4.2862E−23 | 3.7710E−23 | 6.3075E−22 | 0.0000E+00 |
| 18th | 0.0000E+00 | 0.0000E+00 | 0.0000E+00 | 0.0000E+00 | 0.0000E+00 | 0.0000E+00 |

TABLE 3

TABLE 3-continued

| | Free-form surface (FFS) shape | | |
|---|---|---|---|
| SURFACE NO. | 34 | 35 | 37 |
| Y-ROC | 20.657 | −69.791 | −41.832 |
| CONIC CONST. | 0.0000E+00 | −5.9100E−01 | 0.0000E+00 |
| X | 0.0000E+00 | 0.0000E+00 | 0.0000E+00 |
| Y | 0.0000E+00 | 0.0000E+00 | 0.0000E+00 |
| X**2 | −3.6626E−02 | −5.0201E−03 | 1.2863E−03 |
| X * Y | 0.0000E+00 | 0.0000E+00 | 0.0000E+00 |
| Y**2 | −3.0920E−02 | 1.6039E−02 | −1.7459E−04 |
| X**3 | 0.0000E+00 | 0.0000E+00 | 0.0000E+00 |
| X**2 * Y | −4.2450E−04 | 6.8899E−05 | −4.4965E−05 |
| X Y**2 | 0.0000E+00 | 0.0000E+00 | 0.0000E+00 |
| Y**3 | 2.4043E−04 | −1.9912E−04 | −1.0149E−04 |
| X**4 | 6.6819E−05 | 2.9481E−06 | 9.7365E−08 |

| | Free-form surface (FFS) shape | | |
|---|---|---|---|
| SURFACE NO. | 34 | 35 | 37 |
| X**3 * Y | 0.0000E+00 | 0.0000E+00 | 0.0000E+00 |
| X**2 * Y**2 | −1.0623E−05 | −2.9717E−06 | −1.9800E−06 |
| X * Y**3 | 0.0000E+00 | 0.0000E+00 | 0.0000E+00 |
| Y**4 | 2.5470E−05 | 3.3086E−06 | −2.0452E−06 |
| X**5 | 0.0000E+00 | 0.0000E+00 | 0.0000E+00 |
| X**4 * Y | 1.5893E−06 | 1.4899E−08 | −3.6058E−08 |
| X**3 * Y**2 | 0.0000E+00 | 0.0000E+00 | 0.0000E+00 |
| X**2 * Y**3 | −3.8229E−06 | 4.8387E−08 | 1.6714E−09 |

TABLE 3-continued

Free-form surface (FFS) shape

| SURFACE NO. | 34 | 35 | 37 |
|---|---|---|---|
| X * Y**4 | 0.0000E+00 | 0.0000E+00 | 0.0000E+00 |
| Y**5 | 4.5992E−07 | −2.1674E−08 | −2.4963E−08 |
| X**6 | −4.6399E−07 | 1.6463E−09 | −1.2232E−10 |
| X**5 * Y | 0.0000E+00 | 0.0000E+00 | 0.0000E+00 |
| X**4 * Y**2 | −9.2111E−07 | 1.6257E−09 | −1.3971E−09 |
| X**3 * Y**3 | 0.0000E+00 | 0.0000E+00 | 0.0000E+00 |
| X**2 * Y**4 | −2.7920E−07 | 2.2345E−10 | −5.4383E−10 |
| X * Y**5 | 0.0000E+00 | 0.0000E+00 | 0.0000E+00 |
| Y**6 | −9.0818E−08 | −1.6979E−11 | 1.6172E−09 |
| X**7 | 0.0000E+00 | 0.0000E+00 | 0.0000E+00 |
| X**6 * Y | −4.2568E−08 | 1.5367E−10 | −3.4499E−11 |
| X**5 * Y**2 | 0.0000E+00 | 0.0000E+00 | 0.0000E+00 |
| X**4 * Y**3 | −4.5711E−08 | −7.5739E−11 | −1.4602E−10 |
| X**3 * Y**4 | 0.0000E+00 | 0.0000E+00 | 0.0000E+00 |
| X**2 * Y**5 | 1.6981E−08 | 1.2229E−12 | 0.0000E+00 |
| X * Y**6 | 0.0000E+00 | 0.0000E+00 | 0.0000E+00 |
| Y**7 | 2.5658E−09 | 5.9538E−13 | 0.0000E+00 |
| X**8 | 2.2488E−10 | −6.7324E−11 | 0.0000E+00 |
| X**7 * Y | 0.0000E+00 | 0.0000E+00 | 0.0000E+00 |
| X**6 * Y**2 | −3.9123E−09 | 6.3458E−13 | 0.0000E+00 |
| X**5 * Y**3 | 0.0000E+00 | 0.0000E+00 | 0.0000E+00 |
| X**4 * Y**4 | −1.2725E−09 | 8.6923E−13 | 0.0000E+00 |
| X**3 * Y**5 | 0.0000E+00 | 0.0000E+00 | 0.0000E+00 |
| X**2 * Y**6 | 3.5468E−10 | −3.6717E−13 | 0.0000E+00 |
| X * Y**7 | 0.0000E+00 | 0.0000E+00 | 0.0000E+00 |
| Y**8 | 1.0048E−10 | 1.2089E−15 | 0.0000E+00 |
| X**9 | 0.0000E+00 | 0.0000E+00 | 0.0000E+00 |
| X**8 * Y | 1.2395E−11 | 4.0534E−13 | 0.0000E+00 |

TABLE 3-continued

Free-form surface (FFS) shape

| SURFACE NO. | 34 | 35 | 37 |
|---|---|---|---|
| X**7 * Y**2 | 0.0000E+00 | 0.0000E+00 | 0.0000E+00 |
| X**6 * Y**3 | −2.9867E−10 | 9.6537E−15 | 0.0000E+00 |
| X**5 * Y**4 | 0.0000E+00 | 0.0000E+00 | 0.0000E+00 |
| X**4 * Y**5 | 9.8080E−11 | −9.3238E−15 | 0.0000E+00 |
| X**3 * Y**6 | 0.0000E+00 | 0.0000E+00 | 0.0000E+00 |
| X**2 * Y**7 | −3.2970E−11 | 4.3837E−15 | 0.0000E+00 |
| X * Y**8 | 0.0000E+00 | 0.0000E+00 | 0.0000E+00 |
| Y**9 | −5.9066E−12 | −2.1302E−17 | 0.0000E+00 |
| X**10 | 1.4990E−12 | −7.2556E−14 | 0.0000E+00 |
| X**9 * Y | 0.0000E+00 | 0.0000E+00 | 0.0000E+00 |
| X**8 * Y**2 | 3.4946E−14 | 1.4180E−14 | 0.0000E+00 |
| X**7 * Y**3 | 0.0000E+00 | 0.0000E+00 | 0.0000E+00 |
| X**6 * Y**4 | −6.8970E−12 | −9.9018E−16 | 0.0000E+00 |
| X**5 * Y**5 | 0.0000E+00 | 0.0000E+00 | 0.0000E+00 |
| X**4 * Y**6 | 3.0759E−12 | 9.7078E−17 | 0.0000E+00 |
| X**3 * Y**7 | 0.0000E+00 | 0.0000E+00 | 0.0000E+00 |
| X**2 * Y**8 | −1.5496E−12 | −1.4889E−17 | 0.0000E+00 |
| X * Y**9 | 0.0000E+00 | 0.0000E+00 | 0.0000E+00 |
| Y**10 | −3.2717E−13 | 4.4697E−20 | 0.0000E+00 |

Numerical Example 1

Regarding the optical system of Numerical Example (corresponding to Example 1), Table 4 shows lens data, Table 5 shows aspherical surface shape data of the lenses, and Table 6 shows free-form surface shape data of the prism.

TABLE 4

Lens data

| | SURF. NO. | | ROC | SURFACE INTERVAL | MATERIAL Nd | MATERIAL vd |
|---|---|---|---|---|---|---|
| REDUC. SIDE (IMG. FORM. ELEMENT) | 1 | | | 0.000 | | |
| PA | 2 | | ∞ (infinity) | 28.000 | 1.51680 | 64.20 |
| | 3 | | ∞ | 3.986 | | |
| L1 | 4 | ASPHERE | 23.429 | 9.532 | 1.68894 | 31.31 |
| | 5 | ASPHERE | 233.836 | 2.542 | | |
| L2 | 6 | | 22.548 | 1.000 | 2.00069 | 25.46 |
| L3 | 7 | | 13.809 | 7.836 | 1.49700 | 81.61 |
| L4 | 8 | | −33.430 | 1.000 | 2.00330 | 28.27 |
| | 9 | | −595.097 | 0.100 | | |
| L5 | 10 | | 53.187 | 4.651 | 1.59522 | 67.73 |
| L6 | 11 | | −23.565 | 1.000 | 1.72151 | 29.28 |
| | 12 | | 187.882 | 12.170 | | |
| L7 | 13 | | 652.312 | 1.000 | 1.73800 | 32.33 |
| L8 | 14 | | 17.149 | 5.768 | 1.75520 | 27.58 |
| | 15 | | −52.316 | 2.251 | | |
| STOP ST | 16 | | ∞ | 15.000 | | |
| L9 | 17 | | 193.701 | 3.685 | 1.74000 | 28.24 |
| L10 | 18 | | −45.874 | 1.000 | 1.73800 | 32.33 |
| | 19 | | −69.815 | 0.859 | | |
| L11 | 20 | | −32.491 | 1.000 | 1.73400 | 51.51 |
| L12 | 21 | | −130.459 | 2.895 | 1.73627 | 31.99 |
| | 22 | | −71.616 | 6.887 | | |
| L13 | 23 | | 63.992 | 4.392 | 1.45650 | 90.27 |
| | 24 | | −178.632 | 0.300 | | |
| L14 | 25 | | 34.078 | 8.993 | 1.48749 | 70.40 |
| | 26 | | −13596.886 | 2.059 | | |
| L15 | 27 | | −123.658 | 0.720 | 1.75520 | 27.58 |
| L16 | 28 | | 31.028 | 6.241 | 1.48746 | 70.03 |
| | 29 | | −190.060 | 16.079 | | |
| L17 | 30 | ASPHERE | 3300.578 | 2.845 | 1.74077 | 27.71 |
| | 31 | ASPHERE | 44.202 | 2.724 | | |
| L18 | 32 | ASPHERE | −159.391 | 4.634 | 1.56500 | 52.96 |
| | 33 | ASPHERE | −47.411 | 5.083 | | |

TABLE 4-continued

| | | | | Lens data | | | |
|---|---|---|---|---|---|---|---|
| T1 | 34 | FREE-FORM | | 20.536 | −30.277 | 1.60311 | 60.69 |
| R1 | 35 | FREE-FORM | REF. SURF. | −69.880 | −10.694 | 1.60311 | 60.69 |
| R2 | 36 | | REF. SURF. | ∞ | 15.557 | 1.60311 | 60.69 |
| T1 | 37 | FREE-FORM | | −40.986 | 683.383 | | |
| MAG. SIDE (SCREEN) | 38 | | | | | | |

| | | | ECCENTRICITY DATA | | | |
|---|---|---|---|---|---|---|
| SURF. NO. | X | Y | Z | α | β | γ |
| 1 | 0.000 | −1.500 | 0.000 | 0.000 | 0.000 | 0.000 |
| 2 | 0.000 | 0.000 | 0.000 | 0.000 | 0.000 | 0.000 |
| 3 | 0.000 | 0.000 | 0.000 | 0.000 | 0.000 | 0.000 |
| 4 | 0.000 | 0.000 | 0.000 | 0.000 | 0.000 | 0.000 |
| 5 | 0.000 | 0.000 | 0.000 | 0.000 | 0.000 | 0.000 |
| 6 | 0.000 | 0.000 | 0.000 | 0.000 | 0.000 | 0.000 |
| 7 | 0.000 | 0.000 | 0.000 | 0.000 | 0.000 | 0.000 |
| 8 | 0.000 | 0.000 | 0.000 | 0.000 | 0.000 | 0.000 |
| 9 | 0.000 | 0.000 | 0.000 | 0.000 | 0.000 | 0.000 |
| 10 | 0.000 | 0.000 | 0.000 | 0.000 | 0.000 | 0.000 |
| 11 | 0.000 | 0.000 | 0.000 | 0.000 | 0.000 | 0.000 |
| 12 | 0.000 | 0.000 | 0.000 | 0.000 | 0.000 | 0.000 |
| 13 | 0.000 | 0.000 | 0.000 | 0.000 | 0.000 | 0.000 |
| 14 | 0.000 | 0.000 | 0.000 | 0.000 | 0.000 | 0.000 |
| 15 | 0.000 | 0.000 | 0.000 | 0.000 | 0.000 | 0.000 |
| 16 | 0.000 | 0.000 | 0.000 | 0.000 | 0.000 | 0.000 |
| 17 | 0.000 | 0.000 | 0.000 | 0.000 | 0.000 | 0.000 |
| 18 | 0.000 | 0.000 | 0.000 | 0.000 | 0.000 | 0.000 |
| 19 | 0.000 | 0.000 | 0.000 | 0.000 | 0.000 | 0.000 |
| 20 | 0.000 | 0.000 | 0.000 | 0.000 | 0.000 | 0.000 |
| 21 | 0.000 | 0.000 | 0.000 | 0.000 | 0.000 | 0.000 |
| 22 | 0.000 | 0.000 | 0.000 | 0.000 | 0.000 | 0.000 |
| 23 | 0.000 | 0.000 | 0.000 | 0.000 | 0.000 | 0.000 |
| 24 | 0.000 | 0.000 | 0.000 | 0.000 | 0.000 | 0.000 |
| 25 | 0.000 | 0.000 | 0.000 | 0.000 | 0.000 | 0.000 |
| 26 | 0.000 | 0.000 | 0.000 | 0.000 | 0.000 | 0.000 |
| 27 | 0.000 | 0.000 | 0.000 | 0.000 | 0.000 | 0.000 |
| 28 | 0.000 | 0.000 | 0.000 | 0.000 | 0.000 | 0.000 |
| 29 | 0.000 | 0.000 | 0.000 | 0.000 | 0.000 | 0.000 |
| 30 | 0.000 | 0.000 | 0.000 | 0.000 | 0.000 | 0.000 |
| 31 | 0.000 | 0.000 | 0.000 | 0.000 | 0.000 | 0.000 |
| 32 | 0.000 | 0.000 | 0.000 | 0.000 | 0.000 | 0.000 |
| 33 | 0.000 | 0.000 | 0.000 | 0.000 | 0.000 | 0.000 |
| 34 | 0.000 | 0.000 | 0.000 | 0.000 | 0.000 | 0.000 |
| 35 | 0.000 | −77.838 | 0.000 | −24.599 | 0.000 | 0.000 |
| 36 | 0.000 | 95.993 | 0.000 | 24.599 | 0.000 | 0.000 |
| 37 | 0.000 | 13.338 | 0.000 | 37.208 | 0.000 | 0.000 |
| 38 | 0.000 | 0.000 | 0.000 | 0.000 | 0.000 | 0.000 |

| IMAGE DISPLAY SIZE | |
|---|---|
| X | 14.516 |
| Y | 9.072 |
| Fno | 2.000 |

TABLE 5

| | | | Aspherical (ASP) shape | | | |
|---|---|---|---|---|---|---|
| SURF. NO. | 4 | 5 | 30 | 31 | 32 | 33 |
| Y-ROC | 23.429 | 233.836 | 3300.578 | 44.202 | −159.391 | −47.411 |
| CONIC CONST. | −4.2956E−01 | 0.0000E+00 | 0.0000E+00 | −1.2412E+01 | 0.0000E+00 | 0.0000E+00 |
| 4th | 1.8057E−06 | 1.2454E−05 | 1.5164E−05 | 1.8620E−06 | −2.1382E−06 | 1.1988E−06 |
| 6th | −2.5431E−08 | −3.1318E−08 | −1.4803E−08 | −5.4549E−09 | 9.1860E−09 | −6.3093E−09 |
| 8th | −1.2434E−11 | −1.5061E−10 | 1.6813E−11 | −6.2680E−13 | 1.3578E−11 | −1.9175E−11 |
| 10th | −2.3668E−13 | −1.0124E−13 | −9.7800E−15 | 2.2122E−15 | −1.3152E−15 | −1.3317E−14 |
| 12th | −6.8695E−16 | −1.1432E−15 | −1.7306E−18 | 5.0329E−18 | −2.6288E−17 | 2.3430E−16 |

TABLE 5-continued

| | | | Aspherical (ASP) shape | | | |
|---|---|---|---|---|---|---|
| SURF. NO. | 4 | 5 | 30 | 31 | 32 | 33 |
| 14th | 3.2787E−20 | −6.6323E−18 | −4.9402E−21 | 3.1670E−20 | 1.3841E−19 | 1.0561E−18 |
| 16th | −1.2864E−20 | 3.1376E−20 | 4.2862E−23 | 3.7710E−23 | 2.2155E−21 | 0.0000E+00 |
| 18th | 0.0000E+00 | 0.0000E+00 | 0.0000E+00 | 0.0000E+00 | 0.0000E+00 | 0.0000E+00 |

TABLE 6

| | Free-form surface (FFS) shape | | |
|---|---|---|---|
| SURFACE NO. | 34 | 35 | 37 |
| Y-ROC | 20.536 | −69.880 | −40.986 |
| CONIC CONST. | 0.0000E+00 | −5.9100E−01 | 0.0000E+00 |
| X | 0.0000E+00 | 0.0000E+00 | 0.0000E+00 |
| Y | 0.0000E+00 | 0.0000E+00 | 0.0000E+00 |
| X**2 | −3.4796E−02 | −5.4004E−03 | 1.0133E−03 |
| X * Y | 0.0000E+00 | 0.0000E+00 | 0.0000E+00 |
| Y**2 | −3.0522E−02 | 1.6023E−02 | 8.5020E−05 |
| X**3 | 0.0000E+00 | 0.0000E+00 | 0.0000E+00 |
| X**2 * Y | −3.1653E−04 | 7.5233E−05 | −3.7256E−05 |
| X Y**2 | 0.0000E+00 | 0.0000E+00 | 0.0000E+00 |
| Y**3 | 2.2439E−04 | −1.9904E−04 | −8.3867E−05 |
| X**4 | 5.1993E−05 | 3.0278E−06 | 2.8350E−07 |
| X**3 * Y | 0.0000E+00 | 0.0000E+00 | 0.0000E+00 |
| X**2 * Y**2 | −1.2038E−05 | −2.9397E−06 | −2.1315E−06 |
| X * Y**3 | 0.0000E+00 | 0.0000E+00 | 0.0000E+00 |
| Y**4 | 2.8998E−05 | 3.3109E−06 | −2.2169E−06 |
| X**5 | 0.0000E+00 | 0.0000E+00 | 0.0000E+00 |
| X**4 * Y | 3.2902E−07 | 1.3482E−08 | −2.2871E−08 |
| X**3 * Y**2 | 0.0000E+00 | 0.0000E+00 | 0.0000E+00 |
| X**2 * Y**3 | −3.9716E−06 | 4.8228E−08 | −2.5767E−08 |
| X * Y**4 | 0.0000E+00 | 0.0000E+00 | 0.0000E+00 |
| Y**5 | 6.2631E−07 | −2.1643E−08 | −3.0249E−08 |
| X**6 | −5.0956E−07 | 1.4407E−09 | −2.0853E−10 |
| X**5 * Y | 0.0000E+00 | 0.0000E+00 | 0.0000E+00 |
| X**4 * Y**2 | −9.4371E−07 | 1.5874E−09 | −1.1272E−09 |
| X**3 * Y**3 | 0.0000E+00 | 0.0000E+00 | 0.0000E+00 |
| X**2 * Y**4 | −3.1377E−07 | 2.1766E−10 | −4.6997E−10 |
| X * Y**5 | 0.0000E+00 | 0.0000E+00 | 0.0000E+00 |
| Y**6 | −1.1249E−07 | −1.6692E−11 | 1.7185E−09 |
| X**7 | 0.0000E+00 | 0.0000E+00 | 0.0000E+00 |
| X**6 * Y | −3.5123E−08 | 1.5417E−10 | −4.6412E−11 |
| X**5 * Y**2 | 0.0000E+00 | 0.0000E+00 | 0.0000E+00 |
| X**4 * Y**3 | −4.7616E−08 | −7.6281E−11 | −1.2335E−10 |
| X**3 * Y**4 | 0.0000E+00 | 0.0000E+00 | 0.0000E+00 |
| X**2 * Y**5 | 2.2263E−08 | 1.2362E−12 | 0.0000E+00 |
| X * Y**6 | 0.0000E+00 | 0.0000E+00 | 0.0000E+00 |
| Y**7 | 3.4875E−09 | 5.9716E−13 | 0.0000E+00 |
| X**8 | 1.1478E−09 | −6.6514E−11 | 0.0000E+00 |

TABLE 6-continued

| | Free-form surface (FFS) shape | | |
|---|---|---|---|
| SURFACE NO. | 34 | 35 | 37 |
| X**7 * Y | 0.0000E+00 | 0.0000E+00 | 0.0000E+00 |
| X**6 * Y**2 | −4.8994E−09 | 6.5414E−13 | 0.0000E+00 |
| X**5 * Y**3 | 0.0000E+00 | 0.0000E+00 | 0.0000E+00 |
| X**4 * Y**4 | −1.0056E−09 | 8.6244E−13 | 0.0000E+00 |
| X**3 * Y**5 | 0.0000E+00 | 0.0000E+00 | 0.0000E+00 |
| X**2 * Y**6 | 9.5861E−11 | −3.6688E−13 | 0.0000E+00 |
| X * Y**7 | 0.0000E+00 | 0.0000E+00 | 0.0000E+00 |
| Y**8 | 9.2334E−11 | 1.2127E−15 | 0.0000E+00 |
| X**9 | 0.0000E+00 | 0.0000E+00 | 0.0000E+00 |
| X**8 * Y | −1.1953E−11 | 5.1114E−13 | 0.0000E+00 |
| X**7 * Y**2 | 0.0000E+00 | 0.0000E+00 | 0.0000E+00 |
| X**6 * Y**3 | −2.6123E−10 | 9.3105E−15 | 0.0000E+00 |
| X**5 * Y**4 | 0.0000E+00 | 0.0000E+00 | 0.0000E+00 |
| X**4 * Y**5 | 9.2584E−11 | −9.3727E−15 | 0.0000E+00 |
| X**3 * Y**6 | 0.0000E+00 | 0.0000E+00 | 0.0000E+00 |
| X**2 * Y**7 | −3.5550E−11 | 4.3815E−15 | 0.0000E+00 |
| X * Y**8 | 0.0000E+00 | 0.0000E+00 | 0.0000E+00 |
| Y**9 | −8.3440E−12 | −2.1383E−17 | 0.0000E+00 |
| X**10 | −1.5327E−12 | −1.1986E−13 | 0.0000E+00 |
| X**9 * Y | 0.0000E+00 | 0.0000E+00 | 0.0000E+00 |
| X**8 * Y**2 | 3.0961E−12 | 1.5885E−14 | 0.0000E+00 |
| X**7 * Y**3 | 0.0000E+00 | 0.0000E+00 | 0.0000E+00 |
| X**6 * Y**4 | −2.0536E−12 | −1.0066E−15 | 0.0000E+00 |
| X**5 * Y**5 | 0.0000E+00 | 0.0000E+00 | 0.0000E+00 |
| X**4 * Y**6 | 3.3855E−12 | 9.7955E−17 | 0.0000E+00 |
| X**3 * Y**7 | 0.0000E+00 | 0.0000E+00 | 0.0000E+00 |
| X**2 * Y**8 | 3.2588E−13 | −1.4971E−17 | 0.0000E+00 |
| X * Y**9 | 0.0000E+00 | 0.0000E+00 | 0.0000E+00 |
| Y**10 | −1.9104E−13 | 4.3552E−20 | 0.0000E+00 |

Numerical Example 2

Regarding the optical system of Numerical Example 2 (corresponding to Example 1), Table 7 shows lens data, Table 8 shows aspherical surface shape data of the lenses, and Table 9 shows free-form surface shape data of the prism.

TABLE 7

| | | | | Lens data | | | |
|---|---|---|---|---|---|---|---|
| | SURF. NO. | | | ROC | SURFACE INTERVAL | MATERIAL Nd | vd |
| REDUC. SIDE (IMG. FORM. ELEMENT) | 1 | | | | 0.000 | | |
| PA | 2 | | | ∞ (infinity) | 28.000 | 1.51680 | 64.20 |
| | 3 | | | ∞ | 4.522 | | |
| L1 | 4 | ASPHERE | | 23.162 | 8.992 | 1.68894 | 31.31 |
| | 5 | ASPHERE | | 314.515 | 1.446 | | |
| L2 | 6 | | | 22.616 | 1.000 | 2.00069 | 25.46 |
| L3 | 7 | | | 13.642 | 9.000 | 1.49700 | 81.61 |
| L4 | 8 | | | −35.426 | 1.000 | 2.00330 | 28.27 |
| | 9 | | | −478.341 | 0.100 | | |
| L5 | 10 | | | 56.414 | 4.622 | 1.59522 | 67.73 |
| L6 | 11 | | | −25.392 | 1.000 | 1.72151 | 29.28 |
| | 12 | | | 185.963 | 12.929 | | |

TABLE 7-continued

| | | | | Lens data | | | | |
|---|---|---|---|---|---|---|---|---|
| L7 | 13 | | | 636.999 | 1.000 | 1.73800 | 32.33 | |
| L8 | 14 | | | 16.576 | 5.702 | 1.75520 | 27.58 | |
| | 15 | | | −52.430 | 1.876 | | | |
| STOP ST | 16 | | | ∞ | 15.000 | | | |
| L9 | 17 | | | 172.149 | 3.489 | 1.74000 | 28.24 | |
| L10 | 18 | | | −97.915 | 1.000 | 1.73800 | 32.33 | |
| | 19 | | | −68.369 | 0.882 | | | |
| L11 | 20 | | | −31.946 | 1.000 | 1.73400 | 51.51 | |
| L12 | 21 | | | −129.261 | 3.333 | 1.73627 | 31.99 | |
| | 22 | | | −71.153 | 0.614 | | | |
| L13 | 23 | | | 60.702 | 3.971 | 1.45650 | 90.27 | |
| | 24 | | | −176.011 | 0.323 | | | |
| L14 | 25 | | | 32.034 | 8.315 | 1.48749 | 70.40 | |
| | 26 | | | −4001.649 | 1.746 | | | |
| L15 | 27 | | | −108.973 | 1.000 | 1.75520 | 27.58 | |
| L16 | 28 | | | 28.751 | 5.672 | 1.48746 | 70.03 | |
| | 29 | | | −151.996 | 15.084 | | | |
| L17 | 30 | ASPHERE | | −290.279 | 1.000 | 1.74077 | 27.71 | |
| | 31 | ASPHERE | | 38.064 | 2.023 | | | |
| L18 | 32 | ASPHERE | | −313.142 | 5.166 | 1.56500 | 52.96 | |
| | 33 | ASPHERE | | −50.150 | 3.812 | | | |
| T1 | 34 | FREE-FORM | | 20.155 | −33.072 | 1.67790 | 55.52 | |
| R1 | 35 | FREE-FORM | REF. SURF. | −69.880 | −7.399 | 1.67790 | 55.52 | |
| R2 | 36 | | REF. SURF. | ∞ | 15.210 | 1.67790 | 55.52 | |
| T1 | 37 | FREE-FORM | | −38.025 | 682.649 | | | |
| MAG. SIDE (SCREEN) | 38 | | | | | | | |

| | ECCENTRICITY DATA | | | | | |
|---|---|---|---|---|---|---|
| SURF. NO. | X | Y | Z | α | β | γ |
| 1 | 0.000 | −1.500 | 0.000 | 0.000 | 0.000 | 0.000 |
| 2 | 0.000 | 0.000 | 0.000 | 0.000 | 0.000 | 0.000 |
| 3 | 0.000 | 0.000 | 0.000 | 0.000 | 0.000 | 0.000 |
| 4 | 0.000 | 0.000 | 0.000 | 0.000 | 0.000 | 0.000 |
| 5 | 0.000 | 0.000 | 0.000 | 0.000 | 0.000 | 0.000 |
| 6 | 0.000 | 0.000 | 0.000 | 0.000 | 0.000 | 0.000 |
| 7 | 0.000 | 0.000 | 0.000 | 0.000 | 0.000 | 0.000 |
| 8 | 0.000 | 0.000 | 0.000 | 0.000 | 0.000 | 0.000 |
| 9 | 0.000 | 0.000 | 0.000 | 0.000 | 0.000 | 0.000 |
| 10 | 0.000 | 0.000 | 0.000 | 0.000 | 0.000 | 0.000 |
| 11 | 0.000 | 0.000 | 0.000 | 0.000 | 0.000 | 0.000 |
| 12 | 0.000 | 0.000 | 0.000 | 0.000 | 0.000 | 0.000 |
| 13 | 0.000 | 0.000 | 0.000 | 0.000 | 0.000 | 0.000 |
| 14 | 0.000 | 0.000 | 0.000 | 0.000 | 0.000 | 0.000 |
| 15 | 0.000 | 0.000 | 0.000 | 0.000 | 0.000 | 0.000 |
| 16 | 0.000 | 0.000 | 0.000 | 0.000 | 0.000 | 0.000 |
| 17 | 0.000 | 0.000 | 0.000 | 0.000 | 0.000 | 0.000 |
| 18 | 0.000 | 0.000 | 0.000 | 0.000 | 0.000 | 0.000 |
| 19 | 0.000 | 0.000 | 0.000 | 0.000 | 0.000 | 0.000 |
| 20 | 0.000 | 0.000 | 0.000 | 0.000 | 0.000 | 0.000 |
| 21 | 0.000 | 0.000 | 0.000 | 0.000 | 0.000 | 0.000 |
| 22 | 0.000 | 0.000 | 0.000 | 0.000 | 0.000 | 0.000 |
| 23 | 0.000 | 0.000 | 0.000 | 0.000 | 0.000 | 0.000 |
| 24 | 0.000 | 0.000 | 0.000 | 0.000 | 0.000 | 0.000 |
| 25 | 0.000 | 0.000 | 0.000 | 0.000 | 0.000 | 0.000 |
| 26 | 0.000 | 0.000 | 0.000 | 0.000 | 0.000 | 0.000 |
| 27 | 0.000 | 0.000 | 0.000 | 0.000 | 0.000 | 0.000 |
| 28 | 0.000 | 0.000 | 0.000 | 0.000 | 0.000 | 0.000 |
| 29 | 0.000 | 0.000 | 0.000 | 0.000 | 0.000 | 0.000 |
| 30 | 0.000 | 0.000 | 0.000 | 0.000 | 0.000 | 0.000 |
| 31 | 0.000 | 0.000 | 0.000 | 0.000 | 0.000 | 0.000 |
| 32 | 0.000 | 0.000 | 0.000 | 0.000 | 0.000 | 0.000 |
| 33 | 0.000 | 0.000 | 0.000 | 0.000 | 0.000 | 0.000 |
| 34 | 0.000 | 0.000 | 0.000 | 0.000 | 0.000 | 0.000 |
| 35 | 0.000 | −78.251 | 0.000 | −24.738 | 0.000 | 0.000 |
| 36 | 0.000 | 95.546 | 0.000 | 24.738 | 0.000 | 0.000 |
| 37 | 0.000 | 13.485 | 0.000 | 38.834 | 0.000 | 0.000 |
| 38 | 0.000 | 0.000 | 0.000 | 0.000 | 0.000 | 0.000 |

TABLE 7-continued

| Lens data | |
| --- | --- |
| IMAGE DISPLAY SIZE | |
| X | 14.516 |
| Y | 9.072 |
| Fno | 2.000 |

TABLE 8

Aspherical (ASP) shape

| SURF. NO. | 4 | 5 | 30 | 31 | 32 | 33 |
| --- | --- | --- | --- | --- | --- | --- |
| Y-ROC | 23.162 | 314.515 | −290.279 | 38.064 | −313.142 | −50.150 |
| CONIC CONST. | −3.7791E−01 | 0.0000E+00 | 0.0000E+00 | −1.2412E+01 | 0.0000E+00 | 0.0000E+00 |
| 4th | 2.6097E−06 | 1.4726E−05 | 1.5164E−05 | 1.8620E−06 | 8.7239E−06 | −3.6616E−06 |
| 6th | −2.3908E−08 | −2.9283E−08 | −1.4803E−08 | −5.4549E−09 | 1.7903E−08 | −5.8965E−09 |
| 8th | −1.1905E−11 | −1.4546E−10 | 1.6813E−11 | −6.2680E−13 | −6.1912E−12 | 7.0213E−12 |
| 10th | −2.4853E−13 | −1.0120E−13 | −9.7800E−15 | 2.2122E−15 | −4.9360E−15 | −2.0643E−14 |
| 12th | −6.9256E−16 | −1.4607E−15 | −1.7306E−18 | 5.0329E−18 | 4.5010E−17 | 2.6007E−16 |
| 14th | 9.9292E−20 | −8.6557E−18 | −4.9402E−21 | 3.1670E−20 | 5.6635E−19 | 3.2594E−18 |
| 16th | −1.8533E−20 | 3.6730E−20 | 4.2862E−23 | 3.7710E−23 | 5.8330E−21 | 0.0000E+00 |
| 18th | 0.0000E+00 | 0.0000E+00 | 0.0000E+00 | 0.0000E+00 | 0.0000E+00 | 0.0000E+00 |

TABLE 9

Free-form surface (FFS) shape

| SURFACE NO. | 34 | 35 | 37 |
| --- | --- | --- | --- |
| Y-ROC | 20.155 | −69.880 | −38.025 |
| CONIC CONST. | 0.0000E+00 | −5.9100E−01 | 0.0000E+00 |
| X | 0.0000E+00 | 0.0000E+00 | 0.0000E+00 |
| Y | 0.0000E+00 | 0.0000E+00 | 0.0000E+00 |
| X**2 | −3.1074E−02 | −1.3379E−02 | 8.0844E−04 |
| X * Y | 0.0000E+00 | 0.0000E+00 | 0.0000E+00 |
| Y**2 | −2.7468E−02 | 1.5959E−02 | 5.5136E−04 |
| X**3 | 0.0000E+00 | 0.0000E+00 | 0.0000E+00 |
| X**2 * Y | −3.5675E−05 | 1.6781E−04 | −1.7175E−05 |
| X Y**2 | 0.0000E+00 | 0.0000E+00 | 0.0000E+00 |
| Y**3 | 4.0866E−04 | −1.9835E−04 | −4.9579E−05 |
| X**4 | 3.2096E−05 | 5.5452E−06 | 1.7396E−07 |
| X**3 * Y | 0.0000E+00 | 0.0000E+00 | 0.0000E+00 |
| X**2 * Y**2 | 1.5544E−06 | −2.3045E−06 | −1.5045E−06 |
| X * Y**3 | 0.0000E+00 | 0.0000E+00 | 0.0000E+00 |
| Y**4 | 3.6285E−05 | 3.3180E−06 | −2.2174E−06 |
| X**5 | 0.0000E+00 | 0.0000E+00 | 0.0000E+00 |
| X**4 * Y | −2.1384E−06 | 1.6279E−08 | 1.2552E−08 |
| X**3 * Y**2 | 0.0000E+00 | 0.0000E+00 | 0.0000E+00 |
| X**2 * Y**3 | −4.6877E−06 | 4.9595E−08 | −4.5893E−08 |
| X * Y**4 | 0.0000E+00 | 0.0000E+00 | 0.0000E+00 |
| Y**5 | 5.8743E−07 | −2.1550E−08 | −6.4626E−08 |
| X**6 | −3.6895E−07 | 8.3415E−09 | 1.3826E−11 |
| X**5 * Y | 0.0000E+00 | 0.0000E+00 | 0.0000E+00 |
| X**4 * Y**2 | −1.2019E−06 | 1.2352E−09 | −1.7751E−09 |
| X**3 * Y**3 | 0.0000E+00 | 0.0000E+00 | 0.0000E+00 |
| X**2 * Y**4 | −4.3453E−07 | 1.6514E−10 | −1.6048E−09 |
| X * Y**5 | 0.0000E+00 | 0.0000E+00 | 0.0000E+00 |
| Y**6 | −1.3510E−07 | −1.5755E−11 | 1.5868E−09 |
| X**7 | 0.0000E+00 | 0.0000E+00 | 0.0000E+00 |
| X**6 * Y | −4.1522E−08 | 1.8154E−10 | −8.1852E−11 |
| X**5 * Y**2 | 0.0000E+00 | 0.0000E+00 | 0.0000E+00 |
| X**4 * Y**3 | −5.6670E−08 | −8.1945E−11 | −1.5471E−10 |
| X**3 * Y**4 | 0.0000E+00 | 0.0000E+00 | 0.0000E+00 |
| X**2 * Y**5 | 3.1207E−08 | 4.5566E−13 | 0.0000E+00 |
| X * Y**6 | 0.0000E+00 | 0.0000E+00 | 0.0000E+00 |
| Y**7 | 4.9203E−09 | 5.9943E−13 | 0.0000E+00 |
| X**8 | 5.0703E−11 | −7.6227E−11 | 0.0000E+00 |
| X**7 * Y | 0.0000E+00 | 0.0000E+00 | 0.0000E+00 |
| X**6 * Y**2 | −8.1597E−09 | 3.0850E−13 | 0.0000E+00 |
| X**5 * Y**3 | 0.0000E+00 | 0.0000E+00 | 0.0000E+00 |
| X**4 * Y**4 | −9.5143E−10 | 8.2195E−13 | 0.0000E+00 |

TABLE 9-continued

Free-form surface (FFS) shape

| SURFACE NO. | 34 | 35 | 37 |
| --- | --- | --- | --- |
| X**3 * Y**5 | 0.0000E+00 | 0.0000E+00 | 0.0000E+00 |
| X**2 * Y**6 | 3.4372E−11 | −3.7132E−13 | 0.0000E+00 |
| X * Y**7 | 0.0000E+00 | 0.0000E+00 | 0.0000E+00 |
| Y**8 | 8.0819E−11 | 1.3291E−15 | 0.0000E+00 |
| X**9 | 0.0000E+00 | 0.0000E+00 | 0.0000E+00 |
| X**8 * Y | 1.5717E−11 | 5.0725E−13 | 0.0000E+00 |
| X**7 * Y**2 | 0.0000E+00 | 0.0000E+00 | 0.0000E+00 |
| X**6 * Y**3 | −3.0806E−10 | 3.5278E−15 | 0.0000E+00 |
| X**5 * Y**4 | 0.0000E+00 | 0.0000E+00 | 0.0000E+00 |
| X**4 * Y**5 | 1.2781E−10 | −9.2294E−15 | 0.0000E+00 |
| X**3 * Y**6 | 0.0000E+00 | 0.0000E+00 | 0.0000E+00 |
| X**2 * Y**7 | −6.9558E−11 | 4.3969E−15 | 0.0000E+00 |
| X * Y**8 | 0.0000E+00 | 0.0000E+00 | 0.0000E+00 |
| Y**9 | −1.1092E−11 | −2.1396E−17 | 0.0000E+00 |
| X**10 | 1.3911E−12 | −1.3494E−13 | 0.0000E+00 |
| X**9 * Y | 0.0000E+00 | 0.0000E+00 | 0.0000E+00 |
| X**8 * Y**2 | 1.6526E−11 | 1.8962E−14 | 0.0000E+00 |
| X**7 * Y**3 | 0.0000E+00 | 0.0000E+00 | 0.0000E+00 |
| X**6 * Y**4 | 3.0969E−12 | −1.1434E−15 | 0.0000E+00 |
| X**5 * Y**5 | 0.0000E+00 | 0.0000E+00 | 0.0000E+00 |
| X**4 * Y**6 | 5.6318E−12 | 1.1328E−16 | 0.0000E+00 |
| X**3 * Y**7 | 0.0000E+00 | 0.0000E+00 | 0.0000E+00 |
| X**2 * Y**8 | 8.3740E−13 | −1.4644E−17 | 0.0000E+00 |
| X * Y**9 | 0.0000E+00 | 0.0000E+00 | 0.0000E+00 |
| Y**10 | −2.8513E−14 | 2.7964E−20 | 0.0000E+00 |

Numerical Example 3

Regarding the optical system of Numerical Example 3 (corresponding to Example 1), Table 10 shows lens data, Table 11 shows aspherical surface shape data of the lenses, and Table 12 shows free-form surface shape data of the prism.

TABLE 10

| | | | | Lens data | | | |
|---|---|---|---|---|---|---|---|
| | SURF. | | | | SURFACE | MATERIAL | |
| | NO. | | | ROC | INTERVAL | Nd | vd |
| REDUC. SIDE (IMG. FORM. ELEMENT) | 1 | | | | 0.000 | | |
| PA | 2 | | | ∞ (infinity) | 28.000 | 1.51680 | 64.20 |
| | 3 | | | ∞ | 4.840 | | |
| L1 | 4 | ASPHERE | | 22.948 | 8.505 | 1.68894 | 31.31 |
| | 5 | ASPHERE | | 391.208 | 1.342 | | |
| L2 | 6 | | | 22.594 | 1.000 | 2.00069 | 25.46 |
| L3 | 7 | | | 13.564 | 8.328 | 1.49700 | 81.61 |
| L4 | 8 | | | −36.620 | 1.000 | 2.00330 | 28.27 |
| | 9 | | | −417.749 | 0.100 | | |
| L5 | 10 | | | 57.862 | 4.653 | 1.59522 | 67.73 |
| L6 | 11 | | | −24.851 | 1.000 | 1.72151 | 29.28 |
| | 12 | | | 184.398 | 11.846 | | |
| L7 | 13 | | | 685.282 | 1.000 | 1.73800 | 32.33 |
| L8 | 14 | | | 15.942 | 5.558 | 1.75520 | 27.58 |
| | 15 | | | −52.749 | 1.889 | | |
| STOP ST | 16 | | | ∞ | 15.000 | | |
| L9 | 17 | | | 161.040 | 3.297 | 1.76182 | 26.62 |
| | 18 | | | −67.676 | 0.793 | | |
| L10 | 19 | | | −31.407 | 1.000 | 1.73400 | 51.51 |
| L11 | 20 | | | −89.793 | 3.072 | 1.73627 | 31.99 |
| | 21 | | | −71.226 | 0.927 | | |
| L12 | 22 | | | 58.700 | 3.844 | 1.45650 | 90.27 |
| | 23 | | | −179.295 | 0.300 | | |
| L13 | 24 | | | 30.654 | 7.711 | 1.48749 | 70.40 |
| | 25 | | | −3445.486 | 1.465 | | |
| L14 | 26 | | | −101.454 | 1.000 | 1.75520 | 27.58 |
| L15 | 27 | | | 28.374 | 5.558 | 1.48746 | 70.03 |
| | 28 | | | −136.667 | 14.446 | | |
| L16 | 29 | ASPHERE | | −341.978 | 1.000 | 1.74077 | 27.71 |
| | 30 | ASPHERE | | 36.136 | 1.559 | | |
| L17 | 31 | ASPHERE | | −1198.817 | 5.409 | 1.56500 | 52.96 |
| | 32 | ASPHERE | | −56.840 | 3.105 | | |
| T1 | 33 | FREE-FORM | | 20.232 | −34.787 | 1.72903 | 54.04 |
| R1 | 34 | FREE-FORM | REF. SURF. | −69.907 | −6.370 | 1.72903 | 54.04 |
| R2 | 35 | | REF. SURF. | ∞ | 15.174 | 1.72903 | 54.04 |
| T1 | 36 | FREE-FORM | | −37.188 | 681.980 | | |
| MAG. SIDE (SCREEN) | 37 | | | | | | |

| | | | ECCENTRICITY DATA | | | | |
|---|---|---|---|---|---|---|---|
| SURF. NO. | X | Y | Z | α | β | γ | |
| 1 | 0.000 | −1.500 | 0.000 | 0.000 | 0.000 | 0.000 | |
| 2 | 0.000 | 0.000 | 0.000 | 0.000 | 0.000 | 0.000 | |
| 3 | 0.000 | 0.000 | 0.000 | 0.000 | 0.000 | 0.000 | |
| 4 | 0.000 | 0.000 | 0.000 | 0.000 | 0.000 | 0.000 | |
| 5 | 0.000 | 0.000 | 0.000 | 0.000 | 0.000 | 0.000 | |
| 6 | 0.000 | 0.000 | 0.000 | 0.000 | 0.000 | 0.000 | |
| 7 | 0.000 | 0.000 | 0.000 | 0.000 | 0.000 | 0.000 | |
| 8 | 0.000 | 0.000 | 0.000 | 0.000 | 0.000 | 0.000 | |
| 9 | 0.000 | 0.000 | 0.000 | 0.000 | 0.000 | 0.000 | |
| 10 | 0.000 | 0.000 | 0.000 | 0.000 | 0.000 | 0.000 | |
| 11 | 0.000 | 0.000 | 0.000 | 0.000 | 0.000 | 0.000 | |
| 12 | 0.000 | 0.000 | 0.000 | 0.000 | 0.000 | 0.000 | |
| 13 | 0.000 | 0.000 | 0.000 | 0.000 | 0.000 | 0.000 | |
| 14 | 0.000 | 0.000 | 0.000 | 0.000 | 0.000 | 0.000 | |
| 15 | 0.000 | 0.000 | 0.000 | 0.000 | 0.000 | 0.000 | |
| 16 | 0.000 | 0.000 | 0.000 | 0.000 | 0.000 | 0.000 | |
| 17 | 0.000 | 0.000 | 0.000 | 0.000 | 0.000 | 0.000 | |
| 18 | 0.000 | 0.000 | 0.000 | 0.000 | 0.000 | 0.000 | |
| 19 | 0.000 | 0.000 | 0.000 | 0.000 | 0.000 | 0.000 | |
| 20 | 0.000 | 0.000 | 0.000 | 0.000 | 0.000 | 0.000 | |
| 21 | 0.000 | 0.000 | 0.000 | 0.000 | 0.000 | 0.000 | |
| 22 | 0.000 | 0.000 | 0.000 | 0.000 | 0.000 | 0.000 | |
| 23 | 0.000 | 0.000 | 0.000 | 0.000 | 0.000 | 0.000 | |
| 24 | 0.000 | 0.000 | 0.000 | 0.000 | 0.000 | 0.000 | |

TABLE 10-continued

Lens data

| | | | | | | |
|---|---|---|---|---|---|---|
| 25 | 0.000 | 0.000 | 0.000 | 0.000 | 0.000 | 0.000 |
| 26 | 0.000 | 0.000 | 0.000 | 0.000 | 0.000 | 0.000 |
| 27 | 0.000 | 0.000 | 0.000 | 0.000 | 0.000 | 0.000 |
| 28 | 0.000 | 0.000 | 0.000 | 0.000 | 0.000 | 0.000 |
| 29 | 0.000 | 0.000 | 0.000 | 0.000 | 0.000 | 0.000 |
| 30 | 0.000 | 0.000 | 0.000 | 0.000 | 0.000 | 0.000 |
| 31 | 0.000 | 0.000 | 0.000 | 0.000 | 0.000 | 0.000 |
| 32 | 0.000 | 0.000 | 0.000 | 0.000 | 0.000 | 0.000 |
| 33 | 0.000 | 0.000 | 0.000 | 0.000 | 0.000 | 0.000 |
| 34 | 0.000 | −78.288 | 0.000 | −24.963 | 0.000 | 0.000 |
| 35 | 0.000 | 96.065 | 0.000 | 24.963 | 0.000 | 0.000 |
| 36 | 0.000 | 13.248 | 0.000 | 39.423 | 0.000 | 0.000 |
| 37 | 0.000 | 0.000 | 0.000 | 0.000 | 0.000 | 0.000 |

IMAGE DISPLAY SIZE

| | |
|---|---|
| X | 14.516 |
| Y | 9.072 |
| Fno | 2.000 |

TABLE 11

Aspherical (ASP) shape

| SURF. NO. | 4 | 5 | 29 |
|---|---|---|---|
| Y-ROC | 22.948 | 391.208 | −341.978 |
| CONIC CONST. | −3.5728E−01 | 0.0000E+00 | 0.0000E+00 |
| 4th | 3.0011E−06 | 1.5540E−05 | 1.5164E−05 |
| 6th | −2.4045E−08 | −3.0723E−08 | −1.4803E−08 |
| 8th | −1.9974E−11 | −1.4984E−10 | 1.6813E−11 |
| 10th | −2.7805E−13 | −1.1523E−13 | −9.7800E−15 |
| 12th | −7.1681E−16 | −1.6886E−15 | −1.7306E−18 |
| 14th | 5.2194E−21 | −1.0260E−17 | −4.9402E−21 |
| 16th | −2.5559E−20 | 4.1352E−20 | 4.2862E−23 |
| 18th | 0.0000E+00 | 0.0000E+00 | 0.0000E+00 |

| SURF. NO. | 30 | 31 | 32 |
|---|---|---|---|
| Y-ROC | 36.136 | −1198.817 | −56.840 |
| CONIC CONST. | −1.2412E+01 | 0.0000E+00 | 0.0000E+00 |
| 4th | 1.8620E−06 | 1.3990E−05 | −5.5384E−06 |
| 6th | −5.4549E−09 | 2.4480E−08 | −7.4670E−09 |
| 8th | −6.2680E−13 | −9.8399E−12 | −4.2993E−12 |
| 10th | 2.2122E−15 | −5.7657E−14 | −1.2550E−13 |
| 12th | 5.0329E−18 | −2.7626E−16 | 4.8632E−17 |
| 14th | 3.1670E−20 | −1.9696E−19 | 4.9004E−18 |
| 16th | 3.7710E−23 | 1.2294E−20 | 0.0000E+00 |
| 18th | 0.0000E+00 | 0.0000E+00 | 0.0000E+00 |

TABLE 12

Free-form surface (FFS) shape

| SURFACE NO. | 33 | 34 | 36 |
|---|---|---|---|
| Y-ROC | 20.232 | −69.907 | −37.188 |
| CONIC CONST. | 0.0000E+00 | −5.9100E−01 | 0.0000E+00 |
| X | 0.0000E+00 | 0.0000E+00 | 0.0000E+00 |
| Y | 0.0000E+00 | 0.0000E+00 | 0.0000E+00 |
| X**2 | −3.0639E−02 | −1.5670E−02 | 7.4727E−04 |
| X * Y | 0.0000E+00 | 0.0000E+00 | 0.0000E+00 |
| Y**2 | −2.7283E−02 | 1.5932E−02 | 4.8806E−04 |
| X**3 | 0.0000E+00 | 0.0000E+00 | 0.0000E+00 |
| X**2 * Y | 2.1889E−05 | 1.9318E−04 | −1.5422E−05 |
| X Y**2 | 0.0000E+00 | 0.0000E+00 | 0.0000E+00 |
| Y**3 | 4.3959E−04 | −1.9841E−04 | −4.7187E−05 |
| X**4 | 2.6965E−05 | 6.8456E−06 | 1.3006E−07 |
| X**3 * Y | 0.0000E+00 | 0.0000E+00 | 0.0000E+00 |
| X**2 * Y**2 | 3.9412E−06 | −2.1721E−06 | −1.4185E−06 |
| X * Y**3 | 0.0000E+00 | 0.0000E+00 | 0.0000E+00 |
| Y**4 | 4.0540E−05 | 3.3195E−06 | −2.1598E−06 |
| X**5 | 0.0000E+00 | 0.0000E+00 | 0.0000E+00 |

TABLE 12-continued

Free-form surface (FFS) shape

| SURFACE NO. | 33 | 34 | 36 |
|---|---|---|---|
| X**4 * Y | −3.2511E−06 | 7.0019E−09 | 1.5037E−08 |
| X**3 * Y**2 | 0.0000E+00 | 0.0000E+00 | 0.0000E+00 |
| X**2 * Y**3 | −5.2247E−06 | 4.9546E−08 | −5.4583E−08 |
| X * Y**4 | 0.0000E+00 | 0.0000E+00 | 0.0000E+00 |
| Y**5 | 7.2351E−07 | −2.1519E−08 | −6.9915E−08 |
| X**6 | −3.6980E−07 | 1.9570E−08 | 5.3641E−11 |
| X**5 * Y | 0.0000E+00 | 0.0000E+00 | 0.0000E+00 |
| X**4 * Y**2 | −1.4521E−06 | 1.0133E−09 | −1.9957E−09 |
| X**3 * Y**3 | 0.0000E+00 | 0.0000E+00 | 0.0000E+00 |
| X**2 * X**4 | −5.5961E−07 | 1.6207E−10 | −1.8988E−09 |
| X * Y**5 | 0.0000E+00 | 0.0000E+00 | 0.0000E+00 |
| Y**6 | −1.5931E−07 | −1.5344E−11 | 1.4027E−09 |
| X**7 | 0.0000E+00 | 0.0000E+00 | 0.0000E+00 |
| X**6 * Y | −4.7809E−08 | 2.1030E−10 | −8.8443E−11 |
| X**5 * Y**2 | 0.0000E+00 | 0.0000E+00 | 0.0000E+00 |
| X**4 * Y**3 | −6.4495E−08 | −8.4359E−11 | −1.6165E−10 |
| X**3 * Y**4 | 0.0000E+00 | 0.0000E+00 | 0.0000E+00 |
| X**2 * Y**5 | 4.0857E−08 | 3.4417E−13 | 0.0000E+00 |
| X * Y**6 | 0.0000E+00 | 0.0000E+00 | 0.0000E+00 |
| Y**7 | 6.2263E−09 | 6.0321E−13 | 0.0000E+00 |
| X**8 | −3.0065E−10 | −9.8865E−11 | 0.0000E+00 |
| X**7 * Y | 0.0000E+00 | 0.0000E+00 | 0.0000E+00 |
| X**6 * Y**2 | −1.0158E−08 | −6.8089E−14 | 0.0000E+00 |
| X**5 * Y**3 | 0.0000E+00 | 0.0000E+00 | 0.0000E+00 |
| X**4 * Y**4 | −1.1916E−09 | 8.1211E−13 | 0.0000E+00 |
| X**3 * Y**5 | 0.0000E+00 | 0.0000E+00 | 0.0000E+00 |
| X**2 * Y**6 | 2.0653E−10 | −3.7195E−13 | 0.0000E+00 |
| X * Y**7 | 0.0000E+00 | 0.0000E+00 | 0.0000E+00 |
| Y**8 | 5.2047E−11 | 1.3433E−15 | 0.0000E+00 |
| X**9 | 0.0000E+00 | 0.0000E+00 | 0.0000E+00 |
| X**8 * Y | 2.3424E−11 | 5.7753E−13 | 0.0000E+00 |
| X**7 * Y**2 | 0.0000E+00 | 0.0000E+00 | 0.0000E+00 |
| X**6 * Y**3 | −4.6526E−10 | −6.3444E−15 | 0.0000E+00 |
| X**5 * Y**4 | 0.0000E+00 | 0.0000E+00 | 0.0000E+00 |
| X**4 * Y**5 | 1.7475E−10 | −8.9354E−15 | 0.0000E+00 |
| X**3 * Y**6 | 0.0000E+00 | 0.0000E+00 | 0.0000E+00 |
| X**2 * Y**7 | −1.2141E−10 | 4.3972E−15 | 0.0000E+00 |
| X * Y**8 | 0.0000E+00 | 0.0000E+00 | 0.0000E+00 |
| Y**9 | −1.2567E−11 | −2.1379E−17 | 0.0000E+00 |
| X**10 | 2.8259E−12 | −1.8428E−13 | 0.0000E+00 |
| X**9 * Y | 0.0000E+00 | 0.0000E+00 | 0.0000E+00 |
| X**8 * Y**2 | 2.1097E−11 | 2.4381E−14 | 0.0000E+00 |
| X**7 * Y**3 | 0.0000E+00 | 0.0000E+00 | 0.0000E+00 |
| X**6 * Y**4 | 1.8845E−12 | −1.2953E−15 | 0.0000E+00 |
| X**5 * Y**5 | 0.0000E+00 | 0.0000E+00 | 0.0000E+00 |
| X**4 * Y**6 | 9.5438E−12 | 1.1825E−16 | 0.0000E+00 |
| X**3 * Y**7 | 0.0000E+00 | 0.0000E+00 | 0.0000E+00 |
| X**2 * Y**8 | −4.7809E−13 | −1.4723E−17 | 0.0000E+00 |

TABLE 12-continued

| Free-form surface (FFS) shape | | | |
|---|---|---|---|
| SURFACE NO. | 33 | 34 | 36 |
| X * Y**9 | 0.0000E+00 | 0.0000E+00 | 0.0000E+00 |
| Y**10 | 1.9009E−13 | 2.3904E−20 | 0.0000E+00 |

Numerical Example 4

Regarding the optical system of Numerical Example 4 (corresponding to Example 1), Table 13 shows lens data, Table 14 shows aspherical surface shape data of the lenses, and Table 15 shows free-form surface shape data of the prism.

TABLE 13

| | SURF NO. | | | ROC | SURFACE INTERVAL | MATERIAL Nd | vd |
|---|---|---|---|---|---|---|---|
| REDUC. SIDE (IMG. FORM. ELEMENT) | 1 | | | | 0.000 | | |
| PA | 2 | | | ∞ (infinity) | 28.000 | 1.51680 | 64.20 |
| | 3 | | | ∞ | 2.284 | | |
| L1 | 4 | ASPHERE | | 22.737 | 8.541 | 1.69453 | 30.66 |
| | 5 | ASPHERE | | 457.221 | 3.325 | | |
| L2 | 6 | | | 21.800 | 1.000 | 2.00069 | 25.46 |
| L3 | 7 | | | 13.757 | 8.530 | 1.49700 | 81.61 |
| L4 | 8 | | | −37.288 | 1.000 | 2.00330 | 28.27 |
| | 9 | | | −340.890 | 0.100 | | |
| L5 | 10 | | | 55.360 | 5.104 | 1.59522 | 67.73 |
| L6 | 11 | | | −19.470 | 1.000 | 1.72151 | 29.28 |
| | 12 | | | 182.483 | 9.368 | | |
| L7 | 13 | | | 911.565 | 1.000 | 1.73800 | 32.33 |
| L8 | 14 | | | 14.595 | 5.497 | 1.75520 | 27.58 |
| | 15 | | | −53.689 | 3.453 | | |
| STOP ST | 16 | | | ∞ | 14.000 | | |
| L9 | 17 | | | 145.862 | 5.371 | 1.78474 | 25.91 |
| | 18 | | | −66.501 | 1.314 | | |
| L10 | 19 | | | −30.484 | 1.549 | 1.72903 | 54.04 |
| | 20 | | | −70.142 | 6.294 | | |
| L11 | 21 | | | 54.785 | 4.329 | 1.45650 | 90.27 |
| | 22 | | | −203.099 | 0.300 | | |
| L12 | 23 | | | 27.212 | 6.466 | 1.49700 | 81.61 |
| | 24 | | | −1757.130 | 1.049 | | |
| L13 | 25 | | | −100.520 | 1.000 | 1.75520 | 27.58 |
| L14 | 26 | | | 44.258 | 5.227 | 1.49700 | 81.61 |
| | 27 | | | −132.626 | 12.457 | | |
| L15 | 28 | ASPHERE | | 4297.819 | 1.000 | 1.92119 | 23.96 |
| | 29 | ASPHERE | | 37.384 | 0.718 | | |
| L16 | 30 | ASPHERE | | 173.104 | 5.679 | 1.58913 | 61.25 |
| | 31 | ASPHERE | | −124.217 | 3.000 | | |
| T1 | 32 | FREE-FORM | | 20.899 | −42.404 | 1.85135 | 40.10 |
| R1 | 33 | FREE-FORM | REF. SURF. | −70.415 | 0.634 | 1.85135 | 40.10 |
| R2 | 34 | | REF. SURF. | ∞ | 13.153 | 1.85135 | 40.10 |
| T1 | 35 | FREE-FORM | | −32.807 | 680.552 | | |
| MAG. SIDE (SCREEN) | 36 | | | | | | |

| | ECCENTRICITY DATA | | | | | |
|---|---|---|---|---|---|---|
| SURF. NO. | X | Y | Z | α | β | γ |
| 1 | 0.000 | −1.500 | 0.000 | 0.000 | 0.000 | 0.000 |
| 2 | 0.000 | 0.000 | 0.000 | 0.000 | 0.000 | 0.000 |
| 3 | 0.000 | 0.000 | 0.000 | 0.000 | 0.000 | 0.000 |
| 4 | 0.000 | 0.000 | 0.000 | 0.000 | 0.000 | 0.000 |
| 5 | 0.000 | 0.000 | 0.000 | 0.000 | 0.000 | 0.000 |
| 6 | 0.000 | 0.000 | 0.000 | 0.000 | 0.000 | 0.000 |
| 7 | 0.000 | 0.000 | 0.000 | 0.000 | 0.000 | 0.000 |
| 8 | 0.000 | 0.000 | 0.000 | 0.000 | 0.000 | 0.000 |
| 9 | 0.000 | 0.000 | 0.000 | 0.000 | 0.000 | 0.000 |
| 10 | 0.000 | 0.000 | 0.000 | 0.000 | 0.000 | 0.000 |
| 11 | 0.000 | 0.000 | 0.000 | 0.000 | 0.000 | 0.000 |
| 12 | 0.000 | 0.000 | 0.000 | 0.000 | 0.000 | 0.000 |
| 13 | 0.000 | 0.000 | 0.000 | 0.000 | 0.000 | 0.000 |

TABLE 13-continued

| Lens data | | | | | | |
|---|---|---|---|---|---|---|
| 14 | 0.000 | 0.000 | 0.000 | 0.000 | 0.000 | 0.000 |
| 15 | 0.000 | 0.000 | 0.000 | 0.000 | 0.000 | 0.000 |
| 16 | 0.000 | 0.000 | 0.000 | 0.000 | 0.000 | 0.000 |
| 17 | 0.000 | 0.000 | 0.000 | 0.000 | 0.000 | 0.000 |
| 18 | 0.000 | 0.000 | 0.000 | 0.000 | 0.000 | 0.000 |
| 19 | 0.000 | 0.000 | 0.000 | 0.000 | 0.000 | 0.000 |
| 20 | 0.000 | 0.000 | 0.000 | 0.000 | 0.000 | 0.000 |
| 21 | 0.000 | 0.000 | 0.000 | 0.000 | 0.000 | 0.000 |
| 22 | 0.000 | 0.000 | 0.000 | 0.000 | 0.000 | 0.000 |
| 23 | 0.000 | 0.000 | 0.000 | 0.000 | 0.000 | 0.000 |
| 24 | 0.000 | 0.000 | 0.000 | 0.000 | 0.000 | 0.000 |
| 25 | 0.000 | 0.000 | 0.000 | 0.000 | 0.000 | 0.000 |
| 26 | 0.000 | 0.000 | 0.000 | 0.000 | 0.000 | 0.000 |
| 27 | 0.000 | 0.000 | 0.000 | 0.000 | 0.000 | 0.000 |
| 28 | 0.000 | 0.000 | 0.000 | 0.000 | 0.000 | 0.000 |
| 29 | 0.000 | 0.000 | 0.000 | 0.000 | 0.000 | 0.000 |
| 30 | 0.000 | 0.000 | 0.000 | 0.000 | 0.000 | 0.000 |
| 31 | 0.000 | 0.000 | 0.000 | 0.000 | 0.000 | 0.000 |
| 32 | 0.000 | 0.000 | 0.000 | 0.000 | 0.000 | 0.000 |
| 33 | 0.000 | −79.143 | 0.000 | −26.073 | 0.000 | 0.000 |
| 34 | 0.000 | 95.136 | 0.000 | 26.073 | 0.000 | 0.000 |
| 35 | 0.000 | 17.560 | 0.000 | 44.550 | 0.000 | 0.000 |
| 36 | 0.000 | 0.000 | 0.000 | 0.000 | 0.000 | 0.000 |

| IMAGE DISPLAY SIZE | |
|---|---|
| X | 14.516 |
| Y | 9.072 |
| Fno | 2.000 |

TABLE 14

| Aspherical (ASP) shape | | | |
|---|---|---|---|
| SURF. NO. | 4 | 5 | 28 |
| Y-ROC | 22.737 | 457.221 | 4297.819 |
| CONIC CONST. | −4.2132E−01 | 0.0000E+00 | 0.0000E+00 |
| 4th | 1.9250E−06 | 1.7666E−05 | 1.5164E−05 |
| 6th | −2.6525E−08 | −3.6877E−08 | −1.4803E−08 |
| 8th | −2.3889E−11 | −1.5143E−10 | 1.6813E−11 |
| 10th | −3.1723E−13 | −2.0198E−14 | −9.7800E−15 |
| 12th | −6.0647E−16 | −1.9150E−15 | −1.7306E−18 |
| 14th | 1.5992E−18 | −1.4624E−17 | −4.9402E−21 |
| 16th | −3.4628E−20 | 5.6436E−20 | 4.2862E−23 |
| 18th | 0.0000E+00 | 0.0000E+00 | 0.0000E+00 |

| SURF. NO. | 29 | 30 | 31 |
|---|---|---|---|
| Y-ROC | 37.384 | 173.104 | −124.217 |
| CONIC CONST. | −1.2412E+01 | 0.0000E+00 | 0.0000E+00 |
| 4th | 1.8620E−06 | 2.2350E−05 | −7.4551E−06 |
| 6th | −5.4549E−09 | 2.7740E−08 | 1.1377E−08 |
| 8th | −6.2680E−13 | 5.9355E−11 | −2.3254E−11 |
| 10th | 2.2122E−15 | 1.2351E−13 | −5.3615E−13 |
| 12th | 5.0329E−18 | −9.5729E−16 | 1.8337E−16 |
| 14th | 3.1670E−20 | −4.2158E−18 | 1.9260E−17 |
| 16th | 3.7710E−23 | 5.6704E−20 | 0.0000E+00 |
| 18th | 0.0000E+00 | 0.0000E+00 | 0.0000E+00 |

TABLE 15

| Free-form surface (FFS) shape | | | |
|---|---|---|---|
| SURFACE NO. | 32 | 33 | 35 |
| Y-ROC | 20.899 | −70.415 | −32.807 |
| CONIC CONST. | 0.0000E+00 | −5.9100E−01 | 0.0000E+00 |
| X | 0.0000E+00 | 0.0000E+00 | 0.0000E+00 |
| Y | 0.0000E+00 | 0.0000E+00 | 0.0000E+00 |
| X**2 | −3.0324E−02 | −3.3624E−02 | 4.9675E−04 |
| X * Y | 0.0000E+00 | 0.0000E+00 | 0.0000E+00 |
| Y**2 | −2.7024E−02 | 1.5867E−02 | 1.7931E−04 |

TABLE 15-continued

| Free-form surface (FFS) shape | | | |
|---|---|---|---|
| SURFACE NO. | 32 | 33 | 35 |
| X**3 | 0.0000E+00 | 0.0000E+00 | 0.0000E+00 |
| X**2 * Y | 2.0557E−04 | 3.8149E−04 | −1.6361E−05 |
| X Y**2 | 0.0000E+00 | 0.0000E+00 | 0.0000E+00 |
| Y**3 | 5.9991E−04 | −1.9859E−04 | −5.6739E−05 |
| X**4 | −2.8516E−06 | 1.4312E−05 | −7.2104E−08 |
| X**3 * Y | 0.0000E+00 | 0.0000E+00 | 0.0000E+00 |
| X**2 * Y**2 | −3.6863E−06 | −1.0091E−06 | −1.6994E−06 |
| X * Y**3 | 0.0000E+00 | 0.0000E+00 | 0.0000E+00 |
| Y**4 | 5.9176E−05 | 3.3176E−06 | −2.9266E−06 |
| X**5 | 0.0000E+00 | 0.0000E+00 | 0.0000E+00 |
| X**4 * Y | −9.3577E−08 | −1.1895E−08 | 2.0870E−08 |
| X**3 * Y**2 | 0.0000E+00 | 0.0000E+00 | 0.0000E+00 |
| X**2 * Y**3 | −1.0198E−05 | 5.3893E−08 | −7.9519E−08 |
| X * Y**4 | 0.0000E+00 | 0.0000E+00 | 0.0000E+00 |
| Y**5 | 1.5539E−06 | −2.1516E−08 | −5.7835E−08 |
| X**6 | −1.0748E−07 | 5.2912E−08 | 1.2786E−10 |
| X**5 * Y | 0.0000E+00 | 0.0000E+00 | 0.0000E+00 |
| X**4 * Y**2 | −2.6669E−06 | 2.4153E−10 | −3.8258E−09 |
| X**3 * Y**3 | 0.0000E+00 | 0.0000E+00 | 0.0000E+00 |
| X**2 * Y**4 | −8.8968E−07 | 1.2759E−10 | −2.3465E−09 |
| X * Y**5 | 0.0000E+00 | 0.0000E+00 | 0.0000E+00 |
| Y**6 | −3.0791E−07 | −1.4836E−11 | 2.6879E−09 |
| X**7 | 0.0000E+00 | 0.0000E+00 | 0.0000E+00 |
| X**6 * Y | −8.9403E−08 | 2.1587E−10 | −1.4596E−10 |
| X**5 * Y**2 | 0.0000E+00 | 0.0000E+00 | 0.0000E+00 |
| X**4 * Y**3 | −9.6386E−08 | −9.5086E−11 | −2.5449E−10 |
| X**3 * Y**4 | 0.0000E+00 | 0.0000E+00 | 0.0000E+00 |
| X**2 * Y**5 | 9.1842E−08 | −4.6622E−13 | 0.0000E+00 |
| X * Y**6 | 0.0000E+00 | 0.0000E+00 | 0.0000E+00 |
| Y**7 | 1.2391E−08 | 6.1199E−13 | 0.0000E+00 |
| X**8 | −4.4227E−09 | −1.4592E−10 | 0.0000E+00 |
| X**7 * Y | 0.0000E+00 | 0.0000E+00 | 0.0000E+00 |
| X**6 * Y**2 | −2.3402E−08 | −2.7243E−12 | 0.0000E+00 |
| X**5 * Y**3 | 0.0000E+00 | 0.0000E+00 | 0.0000E+00 |
| X**4 * Y**4 | −3.4506E−09 | 7.3381E−13 | 0.0000E+00 |
| X**3 * Y**5 | 0.0000E+00 | 0.0000E+00 | 0.0000E+00 |
| X**2 * Y**6 | −7.9162E−10 | −3.8214E−13 | 0.0000E+00 |
| X * Y**7 | 0.0000E+00 | 0.0000E+00 | 0.0000E+00 |
| Y**8 | 2.4006E−10 | 1.4394E−15 | 0.0000E+00 |

TABLE 15-continued

| Free-form surface (FFS) shape | | | |
|---|---|---|---|
| SURFACE NO. | 32 | 33 | 35 |
| X**9 | 0.0000E+00 | 0.0000E+00 | 0.0000E+00 |
| X**8 * Y | 4.2894E-10 | 1.2705E-12 | 0.0000E+00 |
| X**7 * Y**2 | 0.0000E+00 | 0.0000E+00 | 0.0000E+00 |
| X**6 * Y**3 | -1.0388E-09 | -4.6427E-14 | 0.0000E+00 |
| X**5 * Y**4 | 0.0000E+00 | 0.0000E+00 | 0.0000E+00 |
| X**4 * Y**5 | 5.1028E-10 | -8.8501E-15 | 0.0000E+00 |
| X**3 * Y**6 | 0.0000E+00 | 0.0000E+00 | 0.0000E+00 |
| X**2 * Y**7 | -3.0100E-10 | 4.3542E-15 | 0.0000E+00 |
| X * Y**8 | 0.0000E+00 | 0.0000E+00 | 0.0000E+00 |
| Y**9 | -4.7611E-11 | -2.0653E-17 | 0.0000E+00 |
| X**10 | 2.2650E-11 | -7.9420E-13 | 0.0000E+00 |
| X**9 * Y | 0.0000E+00 | 0.0000E+00 | 0.0000E+00 |
| X**8 * Y**2 | 1.0181E-11 | 5.1038E-14 | 0.0000E+00 |
| X**7 * Y**3 | 0.0000E+00 | 0.0000E+00 | 0.0000E+00 |
| X**6 * Y**4 | 1.8067E-11 | -1.4507E-15 | 0.0000E+00 |
| X**5 * Y**5 | 0.0000E+00 | 0.0000E+00 | 0.0000E+00 |

TABLE 15-continued

| Free-form surface (FFS) shape | | | |
|---|---|---|---|
| SURFACE NO. | 32 | 33 | 35 |
| X**4 * Y**6 | 5.8798E-11 | 1.4068E-16 | 0.0000E+00 |
| X**3 * Y**7 | 0.0000E+00 | 0.0000E+00 | 0.0000E+00 |
| X**2 * Y**8 | 4.4328E-12 | -1.3956E-17 | 0.0000E+00 |
| X * Y**9 | 0.0000E+00 | 0.0000E+00 | 0.0000E+00 |
| Y**10 | -1.6737E-13 | 2.4801E-20 | 0.0000E+00 |

Numerical Example 5

Regarding the optical system of Numerical Example 5 (corresponding to Example 1), Table 16 shows lens data, Table 17 shows aspherical surface shape data of the lenses, and Table 18 shows free-form surface shape data of the prism.

TABLE 16

| | SURF. | | | SURFACE | MATERIAL | |
|---|---|---|---|---|---|---|
| | NO. | | ROC | INTERVAL | Nd | vd |
| REDUC. SIDE (IMG. FORM. ELEMENT ) | 1 | | | 0.000 | | |
| PA | 2 | | ∞ (infinity) | 28.000 | 1.51680 | 64.20 |
| | 3 | | ∞ | 19.781 | | |
| L1 | 4 | ASPHERE | -945.099 | 3.561 | 1.78800 | 47.37 |
| | 5 | ASPHERE | -83.393 | 0.100 | | |
| L2 | 6 | | 41.032 | 5.149 | 1.90460 | 21.49 |
| | 7 | | -425.288 | 6.139 | | |
| L3 | 8 | | 75.490 | 3.840 | 1.63246 | 63.77 |
| | 9 | | -208.617 | 0.100 | | |
| L4 | 10 | | 33.191 | 10.041 | 1.65224 | 62.22 |
| L5 | 11 | | -22.475 | 1.000 | 1.84666 | 23.78 |
| | 12 | | 16.938 | 2.411 | | |
| STOP ST | 13 | | ∞ | 5.782 | | |
| L6 | 14 | | -17.582 | 1.000 | 1.68893 | 31.16 |
| L7 | 15 | | 16.621 | 5.757 | 1.69560 | 59.05 |
| | 16 | | -27.067 | 0.100 | | |
| L8 | 17 | | 726.134 | 3.169 | 1.63860 | 63.43 |
| | 18 | | -55.272 | 44.486 | | |
| L9 | 19 | | 91.696 | 11.987 | 1.85135 | 40.10 |
| | 20 | | -83.500 | 0.552 | | |
| L10 | 21 | | -76.867 | 3.000 | 1.64769 | 33.84 |
| | 22 | | -786.267 | 0.100 | | |
| L11 | 23 | | 51.656 | 8.961 | 1.94595 | 17.98 |
| | 24 | | 180.856 | 24.229 | | |
| L12 | 25 | | -72.500 | 3.000 | 1.45600 | 90.90 |
| | 26 | | 24.555 | 15.488 | | |
| L13 | 27 | ASPHERE | 29.348 | 8.759 | 1.80279 | 46.77 |
| | 28 | | -320.141 | 0.100 | | |
| L14 | 29 | | 86.231 | 6.398 | 1.63246 | 63.77 |
| | 30 | | -99.599 | 0.100 | | |
| L15 | 31 | | -1615.770 | 2.534 | 1.94595 | 17.98 |
| | 32 | ASPHERE | -249.939 | 0.261 | | |
| L16 | 33 | | 25.010 | 1.000 | 1.92119 | 23.96 |
| L17 | 34 | | 14.406 | 12.671 | 1.69097 | 58.40 |
| | 35 | | -48.640 | 0.487 | | |
| L18 | 36 | | -44.622 | 1.000 | 1.77830 | 23.91 |
| | 37 | | 54.039 | 2.513 | | |
| L19 | 38 | | -72.892 | 1.000 | 1.80519 | 25.48 |
| | 39 | | 37.260 | 1.966 | | |
| L20 | 40 | | 40.755 | 4.598 | 1.61996 | 63.93 |
| | 41 | | -35.230 | 5.802 | | |
| L21 | 42 | | 743.991 | 3.016 | 1.94595 | 17.98 |
| | 43 | | -39.084 | 7.119 | | |
| L22 | 44 | | -38.096 | 1.000 | 1.86074 | 23.08 |
| | 45 | | -207.573 | 3.246 | | |

TABLE 16-continued

| | | | | Lens data | | | |
|---|---|---|---|---|---|---|---|
| L23 | 46 | | | 50.921 | 4.161 | 1.61996 | 63.93 |
| | 47 | | | −149.790 | 2.142 | | |
| L24 | 48 | | | 34.938 | 5.223 | 1.65949 | 57.38 |
| | 49 | | | 636.719 | 0.648 | | |
| L25 | 50 | | | 127.313 | 1.000 | 1.94595 | 17.98 |
| | 51 | | | 47.659 | 1.055 | | |
| L26 | 52 | | | 35.793 | 4.957 | 1.48563 | 85.19 |
| | 53 | | | 38.244 | 8.602 | | |
| L27 | 54 | ASPHERE | | −660.732 | 17.224 | 2.00100 | 29.12 |
| | 55 | ASPHERE | | 82.254 | 10.566 | | |
| T1 | 56 | FREE-FORM | | −32.963 | −37.064 | 1.69680 | 55.46 |
| R1 | 57 | FREE-FORM | REF. SURF. | −118.467 | −26.329 | 1.69680 | 55.46 |
| R2 | 58 | | REF. SURF. | ∞ | 41.617 | 1.69680 | 55.46 |
| T1 | 59 | FREE-FORM | | −57.138 | 253.375 | | |
| MAG. SIDE (SCREEN) | | | | | | | |

| ECCENTRICITY DATA | | | | | | |
|---|---|---|---|---|---|---|
| SURF. NO. | X | Y | Z | α | β | γ |
| 1 | 0.000 | 1.424 | 0.000 | 0.000 | 0.000 | 0.000 |
| 2 | 0.000 | 0.000 | 0.000 | 0.000 | 0.000 | 0.000 |
| 3 | 0.000 | 0.000 | 0.000 | 0.000 | 0.000 | 0.000 |
| 4 | 0.000 | 0.000 | 0.000 | 0.000 | 0.000 | 0.000 |
| 5 | 0.000 | 0.000 | 0.000 | 0.000 | 0.000 | 0.000 |
| 6 | 0.000 | 0.000 | 0.000 | 0.000 | 0.000 | 0.000 |
| 7 | 0.000 | 0.000 | 0.000 | 0.000 | 0.000 | 0.000 |
| 8 | 0.000 | 0.000 | 0.000 | 0.000 | 0.000 | 0.000 |
| 9 | 0.000 | 0.000 | 0.000 | 0.000 | 0.000 | 0.000 |
| 10 | 0.000 | 0.000 | 0.000 | 0.000 | 0.000 | 0.000 |
| 11 | 0.000 | 0.000 | 0.000 | 0.000 | 0.000 | 0.000 |
| 12 | 0.000 | 0.000 | 0.000 | 0.000 | 0.000 | 0.000 |
| 13 | 0.000 | 0.000 | 0.000 | 0.000 | 0.000 | 0.000 |
| 14 | 0.000 | 0.000 | 0.000 | 0.000 | 0.000 | 0.000 |
| 15 | 0.000 | 0.000 | 0.000 | 0.000 | 0.000 | 0.000 |
| 16 | 0.000 | 0.000 | 0.000 | 0.000 | 0.000 | 0.000 |
| 17 | 0.000 | 0.000 | 0.000 | 0.000 | 0.000 | 0.000 |
| 18 | 0.000 | 0.000 | 0.000 | 0.000 | 0.000 | 0.000 |
| 19 | 0.000 | 0.000 | 0.000 | 0.000 | 0.000 | 0.000 |
| 20 | 0.000 | 0.000 | 0.000 | 0.000 | 0.000 | 0.000 |
| 21 | 0.000 | 0.000 | 0.000 | 0.000 | 0.000 | 0.000 |
| 22 | 0.000 | 0.000 | 0.000 | 0.000 | 0.000 | 0.000 |
| 23 | 0.000 | 0.000 | 0.000 | 0.000 | 0.000 | 0.000 |
| 24 | 0.000 | 0.000 | 0.000 | 0.000 | 0.000 | 0.000 |
| 25 | 0.000 | 0.000 | 0.000 | 0.000 | 0.000 | 0.000 |
| 26 | 0.000 | 0.000 | 0.000 | 0.000 | 0.000 | 0.000 |
| 27 | 0.000 | 0.000 | 0.000 | 0.000 | 0.000 | 0.000 |
| 28 | 0.000 | 0.000 | 0.000 | 0.000 | 0.000 | 0.000 |
| 29 | 0.000 | 0.000 | 0.000 | 0.000 | 0.000 | 0.000 |
| 30 | 0.000 | 0.000 | 0.000 | 0.000 | 0.000 | 0.000 |
| 31 | 0.000 | 0.000 | 0.000 | 0.000 | 0.000 | 0.000 |
| 32 | 0.000 | 0.000 | 0.000 | 0.000 | 0.000 | 0.000 |
| 33 | 0.000 | 0.000 | 0.000 | 0.000 | 0.000 | 0.000 |
| 34 | 0.000 | 0.000 | 0.000 | 0.000 | 0.000 | 0.000 |
| 35 | 0.000 | 0.000 | 0.000 | 0.000 | 0.000 | 0.000 |
| 36 | 0.000 | 0.000 | 0.000 | 0.000 | 0.000 | 0.000 |
| 37 | 0.000 | 0.000 | 0.000 | 0.000 | 0.000 | 0.000 |
| 38 | 0.000 | 0.000 | 0.000 | 0.000 | 0.000 | 0.000 |
| 39 | 0.000 | 0.000 | 0.000 | 0.000 | 0.000 | 0.000 |
| 40 | 0.000 | 0.000 | 0.000 | 0.000 | 0.000 | 0.000 |
| 41 | 0.000 | 0.000 | 0.000 | 0.000 | 0.000 | 0.000 |
| 42 | 0.000 | 0.000 | 0.000 | 0.000 | 0.000 | 0.000 |
| 43 | 0.000 | 0.000 | 0.000 | 0.000 | 0.000 | 0.000 |
| 44 | 0.000 | 0.000 | 0.000 | 0.000 | 0.000 | 0.000 |
| 45 | 0.000 | 0.000 | 0.000 | 0.000 | 0.000 | 0.000 |
| 46 | 0.000 | 0.000 | 0.000 | 0.000 | 0.000 | 0.000 |
| 47 | 0.000 | 0.000 | 0.000 | 0.000 | 0.000 | 0.000 |
| 48 | 0.000 | 0.000 | 0.000 | 0.000 | 0.000 | 0.000 |
| 49 | 0.000 | 0.000 | 0.000 | 0.000 | 0.000 | 0.000 |
| 50 | 0.000 | 0.000 | 0.000 | 0.000 | 0.000 | 0.000 |
| 51 | 0.000 | 0.000 | 0.000 | 0.000 | 0.000 | 0.000 |
| 52 | 0.000 | 0.000 | 0.000 | 0.000 | 0.000 | 0.000 |
| 53 | 0.000 | 0.000 | 0.000 | 0.000 | 0.000 | 0.000 |

TABLE 16-continued

Lens data

| | | | | | | |
|---|---|---|---|---|---|---|
| 54 | 0.000 | 0.000 | 0.000 | 0.000 | 0.000 | 0.000 |
| 55 | 0.000 | 0.000 | 0.000 | 0.000 | 0.000 | 0.000 |
| 56 | 0.000 | 0.000 | 0.000 | 0.000 | 0.000 | 0.000 |
| 57 | 0.000 | −71.665 | 0.000 | −41.418 | 0.000 | 0.000 |
| 58 | 0.000 | 6.848 | 0.000 | −3.745 | 0.000 | 0.000 |
| 59 | 0.000 | 89.440 | 0.000 | 6.743 | 0.000 | 0.000 |
| | 0.000 | | 0.000 | −44.837 | 0.000 | 0.000 |

IMAGE DISPLAY SIZE

| | |
|---|---|
| X | 14.516 |
| Y | −9.072 |
| Fno | 2.056 |

TABLE 17

Aspherical (ASP) shape

| SURF. NO. | 4 | 5 | 27 |
|---|---|---|---|
| Y-ROC | −945.099 | −83.393 | 29.348 |
| CONIC CONST. | 0.0000E+00 | 0.0000E+00 | −3.9143E−01 |
| 4th | −2.2627E−07 | 3.4534E−07 | −1.3039E−05 |
| 6th | −9.2279E−09 | −3.2847E−09 | 5.8477E−09 |
| 8th | −1.0932E−11 | −3.0242E−11 | 1.4931E−11 |
| 10th | −2.1997E−13 | −1.3532E−13 | −2.7077E−15 |
| 12th | 0.0000E+00 | 0.0000E+00 | −1.7837E−16 |
| 14th | 0.0000E+00 | 0.0000E+00 | 3.3052E−19 |
| 16th | 0.0000E+00 | 0.0000E+00 | −2.1521E−22 |

| SURF. NO. | 32 | 54 | 55 |
|---|---|---|---|
| Y-ROC | −249.939 | −660.732 | 82.254 |
| CONIC CONST. | 0.0000E+00 | 0.0000E+00 | 0.0000E+00 |
| 4th | 2.2167E−05 | 2.0560E−05 | −3.8989E−07 |
| 6th | −3.8667E−08 | −2.2048E−08 | −9.4080E−09 |
| 8th | 8.1075E−11 | 2.0895E−11 | 3.6122E−11 |
| 10th | 7.7021E−14 | −1.2844E−14 | −7.5955E−16 |
| 12th | −3.5001E−16 | 3.4394E−18 | −8.7191E−17 |
| 14th | −1.1847E−18 | 1.1193E−21 | −5.8948E−20 |
| 16th | 2.3553E−21 | 9.8373E−24 | 2.9700E−22 |
| 18th | 0.0000E+00 | 0.0000E+00 | 0.0000E+00 |

TABLE 18

Free-form surface (FFS) shape

| SURFACE NO. | 56 | 57 | 59 |
|---|---|---|---|
| Y-ROC | −32.963 | −118.467 | −57.138 |
| CONIC CONST. | 0.0000E+00 | −5.9097E−01 | 0.0000E+00 |
| X | 0.0000E+00 | 0.0000E+00 | 0.0000E+00 |
| Y | 0.0000E+00 | 0.0000E+00 | 0.0000E+00 |
| X**2 | 6.7473E−04 | 1.1547E−03 | −2.5146E−04 |
| X * Y | 0.0000E+00 | 0.0000E+00 | 0.0000E+00 |
| Y**2 | −2.3222E−03 | 1.7100E−02 | 7.4029E−04 |
| X**3 | 0.0000E+00 | 0.0000E+00 | 0.0000E+00 |
| X**2 * Y | −1.6215E−05 | −7.4510E−05 | 1.3942E−05 |
| X Y**2 | 0.0000E+00 | 0.0000E+00 | 0.0000E+00 |
| Y**3 | −2.8954E−04 | −2.6413E−04 | −1.9117E−05 |
| X**4 | 1.0844E−05 | −3.9492E−06 | −1.9942E−08 |
| X**3 * Y | 0.0000E+00 | 0.0000E+00 | 0.0000E+00 |
| X**2 * Y**2 | 5.9228E−06 | −4.8396E−06 | −5.8933E−07 |
| X * Y**3 | 0.0000E+00 | 0.0000E+00 | 0.0000E+00 |
| Y**4 | −8.2910E−06 | 3.4886E−06 | −7.1775E−08 |
| X**5 | 0.0000E+00 | 0.0000E+00 | 0.0000E+00 |
| X**4 * Y | 1.4282E−06 | 1.4121E−07 | −8.0347E−10 |
| X**3 * Y**2 | 0.0000E+00 | 0.0000E+00 | 0.0000E+00 |
| X**2 * Y**3 | 4.1988E−07 | 6.4812E−08 | 9.3034E−09 |
| X * Y**4 | 0.0000E+00 | 0.0000E+00 | 0.0000E+00 |
| Y**5 | 5.0218E−07 | −2.5385E−08 | 1.3096E−08 |
| X**6 | −5.5948E−08 | −8.9506E−10 | −5.9957E−12 |
| X**5 * Y | 0.0000E+00 | 0.0000E+00 | 0.0000E+00 |

TABLE 18-continued

Free-form surface (FFS) shape

| SURFACE NO. | 56 | 57 | 59 |
|---|---|---|---|
| X**4 * Y**2 | −1.4599E−07 | 1.7425E−09 | −1.7514E−11 |
| X**3 * Y**3 | 0.0000E+00 | 0.0000E+00 | 0.0000E+00 |
| X**2 * Y**4 | −1.0828E−07 | 4.8973E−10 | 2.1335E−10 |
| X * Y**5 | 0.0000E+00 | 0.0000E+00 | 0.0000E+00 |
| Y**6 | −2.3205E−08 | −7.7624E−12 | −4.5933E−10 |
| X**7 | 0.0000E+00 | 0.0000E+00 | 0.0000E+00 |
| X**6 * Y | −3.2027E−09 | 4.1859E−11 | −9.7265E−13 |
| X**5 * Y**2 | 0.0000E+00 | 0.0000E+00 | 0.0000E+00 |
| X**4 * Y**3 | −3.9896E−09 | −1.2248E−10 | −1.9379E−12 |
| X**3 * Y**4 | 0.0000E+00 | 0.0000E+00 | 0.0000E+00 |
| X**2 * Y**5 | 2.4093E−09 | 4.2207E−12 | −1.8010E−11 |
| X * Y**6 | 0.0000E+00 | 0.0000E+00 | 0.0000E+00 |
| Y**7 | −7.3945E−10 | 8.7712E−13 | 1.9596E−12 |
| X**8 | 4.4577E−11 | 5.1256E−13 | 3.8981E−15 |
| X**7 * Y | 0.0000E+00 | 0.0000E+00 | 0.0000E+00 |
| X**6 * Y**2 | 1.1805E−10 | −1.3620E−12 | 9.5879E−14 |
| X**5 * Y**3 | 0.0000E+00 | 0.0000E+00 | 0.0000E+00 |
| X**4 * Y**4 | 2.6706E−10 | 1.3577E−12 | −9.8723E−14 |
| X**3 * Y**5 | 0.0000E+00 | 0.0000E+00 | 0.0000E+00 |
| X**2 * Y**6 | 2.9918E−10 | −4.8351E−13 | 3.8597E−13 |
| X * Y**7 | 0.0000E+00 | 0.0000E+00 | 0.0000E+00 |
| Y**8 | 2.2789E−11 | 2.0452E−15 | 2.5426E−13 |
| X**9 | 0.0000E+00 | 0.0000E+00 | 0.0000E+00 |
| X**8 * Y | 0.0000E+00 | −1.1963E−14 | −7.4179E−17 |
| X**7 * Y**2 | 0.0000E+00 | 0.0000E+00 | 0.0000E+00 |
| X**6 * Y**3 | 0.0000E+00 | 2.5697E−14 | −9.9869E−16 |
| X**5 * Y**4 | 0.0000E+00 | 0.0000E+00 | 0.0000E+00 |
| X**4 * Y**5 | 0.0000E+00 | −1.9312E−15 | 3.2015E−15 |
| X**3 * Y**6 | 0.0000E+00 | 0.0000E+00 | 0.0000E+00 |
| X**2 * Y**7 | 0.0000E+00 | 5.8388E−15 | −3.9061E−15 |
| X * Y**8 | 0.0000E+00 | 0.0000E+00 | 0.0000E+00 |
| Y**9 | 0.0000E+00 | −3.6665E−17 | −8.4566E−15 |
| X**10 | 0.0000E+00 | 5.8520E−17 | −7.6137E−19 |
| X**9 * Y | 0.0000E+00 | 0.0000E+00 | 0.0000E+00 |
| X**8 * Y**2 | 0.0000E+00 | 2.4377E−17 | −2.8173E−17 |
| X**7 * Y**3 | 0.0000E+00 | 0.0000E+00 | 0.0000E+00 |
| X**6 * Y**4 | 0.0000E+00 | −1.6639E−16 | −1.0295E−17 |
| X**5 * Y**5 | 0.0000E+00 | 0.0000E+00 | 0.0000E+00 |
| X**4 * Y**6 | 0.0000E+00 | −2.3796E−17 | −5.3013E−17 |
| X**3 * Y**7 | 0.0000E+00 | 0.0000E+00 | 0.0000E+00 |
| X**2 * Y**8 | 0.0000E+00 | −2.2043E−17 | 2.1622E−17 |
| X * Y**9 | 0.0000E+00 | 0.0000E+00 | 0.0000E+00 |
| Y**10 | 0.0000E+00 | −7.1748E−21 | 1.0228E−16 |

Numerical Example 6

Regarding the optical system of Numerical Example 6 (corresponding to Example 1), Table 19 shows lens data, Table 20 shows aspherical surface shape data of the lenses, and Table 21 shows free-form surface shape data of the prism.

TABLE 19

| | SURF. | | | | SURFACE | MATERIAL | |
| Lens data | | | | | | | |
| | NO. | | | ROC | INTERVAL | Nd | vd |
|---|---|---|---|---|---|---|---|
| REDUC. SIDE (IMG. FORM. ELEMENT) | 1 | | | | 0.000 | | |
| PA | 2 | | | ∞ (infinity) | 18.544 | 1.51852 | 64.20 |
| | 3 | | | ∞ | 11.234 | | |
| L1 | 4 | ASPHERE | | 16.558 | 7.159 | 1.69377 | 31.17 |
| | 5 | ASPHERE | | 134.423 | 0.413 | | |
| L2 | 6 | | | 14.878 | 0.700 | 2.01080 | 28.27 |
| L3 | 7 | | | 9.760 | 8.722 | 1.49830 | 81.61 |
| L4 | 8 | | | −21.654 | 0.700 | 1.90952 | 25.26 |
| | 9 | | | −420.940 | 2.457 | | |
| L5 | 10 | | | −263.611 | 0.700 | 1.95825 | 29.83 |
| L6 | 11 | | | 20.452 | 3.657 | 1.59885 | 65.34 |
| | 12 | | | −38.382 | 11.865 | | |
| STOP ST | 13 | | | ∞ | 2.000 | | |
| L7 | 14 | | | 439.468 | 2.913 | 1.93306 | 18.90 |
| | 15 | | | −34.346 | 18.452 | | |
| L8 | 16 | | | −16.820 | 1.000 | 1.75816 | 51.16 |
| | 17 | | | −67.590 | 0.183 | | |
| L9 | 18 | | | 40.274 | 4.515 | 1.58701 | 40.83 |
| | 19 | | | −174.471 | 0.366 | | |
| L10 | 20 | | | 29.785 | 7.595 | 1.49830 | 81.61 |
| L11 | 21 | | | −38.709 | 1.000 | 1.95693 | 17.98 |
| | 22 | | | 184.302 | 18.234 | | |
| L12 | 23 | ASPHERE | | 22936.630 | 9.519 | 2.00826 | 29.13 |
| | 24 | ASPHERE | | 49.689 | 2.098 | | |
| L13 | 25 | | | 76.290 | 7.560 | 1.57014 | 42.85 |
| | 26 | | | −41.268 | 1.000 | | |
| T1 | 27 | FREE-FORM | | 96.004 | −33.249 | 1.80788 | 46.50 |
| R1 | 28 | FREE-FORM | REF. SURF. | −47.943 | −19.097 | | |
| R2 | 29 | | REF. SURF. | ∞ | 13.856 | 1.80788 | 46.50 |
| T1 | 30 | FREE-FORM | | −29.749 | 335.459 | | |
| MAG. SIDE (SCREEN) | 31 | | | | | | |

| | ECCENTRICITY DATA | | | | | |
| SURF. NO. | X | Y | Z | α | β | γ |
|---|---|---|---|---|---|---|
| 1 | 0.000 | −2.250 | 0.000 | 0.000 | 0.000 | 0.000 |
| 2 | 0.000 | 0.000 | 0.000 | 0.000 | 0.000 | 0.000 |
| 3 | 0.000 | 0.000 | 0.000 | 0.000 | 0.000 | 0.000 |
| 4 | 0.000 | 0.000 | 0.000 | 0.000 | 0.000 | 0.000 |
| 5 | 0.000 | 0.000 | 0.000 | 0.000 | 0.000 | 0.000 |
| 6 | 0.000 | 0.000 | 0.000 | 0.000 | 0.000 | 0.000 |
| 7 | 0.000 | 0.000 | 0.000 | 0.000 | 0.000 | 0.000 |
| 8 | 0.000 | 0.000 | 0.000 | 0.000 | 0.000 | 0.000 |
| 9 | 0.000 | 0.000 | 0.000 | 0.000 | 0.000 | 0.000 |
| 10 | 0.000 | 0.000 | 0.000 | 0.000 | 0.000 | 0.000 |
| 11 | 0.000 | 0.000 | 0.000 | 0.000 | 0.000 | 0.000 |
| 12 | 0.000 | 0.000 | 0.000 | 0.000 | 0.000 | 0.000 |
| 13 | 0.000 | 0.000 | 0.000 | 0.000 | 0.000 | 0.000 |
| 14 | 0.000 | 0.000 | 0.000 | 0.000 | 0.000 | 0.000 |
| 15 | 0.000 | 0.000 | 0.000 | 0.000 | 0.000 | 0.000 |
| 16 | 0.000 | 0.000 | 0.000 | 0.000 | 0.000 | 0.000 |
| 17 | 0.000 | 0.000 | 0.000 | 0.000 | 0.000 | 0.000 |
| 18 | 0.000 | 0.000 | 0.000 | 0.000 | 0.000 | 0.000 |
| 19 | 0.000 | 0.000 | 0.000 | 0.000 | 0.000 | 0.000 |
| 20 | 0.000 | 0.000 | 0.000 | 0.000 | 0.000 | 0.000 |
| 21 | 0.000 | 0.000 | 0.000 | 0.000 | 0.000 | 0.000 |
| 22 | 0.000 | 0.000 | 0.000 | 0.000 | 0.000 | 0.000 |
| 23 | 0.000 | 0.000 | 0.000 | 0.000 | 0.000 | 0.000 |
| 24 | 0.000 | 0.000 | 0.000 | 0.000 | 0.000 | 0.000 |
| 25 | 0.000 | 0.000 | 0.000 | 0.000 | 0.000 | 0.000 |
| 26 | 0.000 | 0.000 | 0.000 | 0.000 | 0.000 | 0.000 |
| 27 | 0.000 | 0.000 | 0.000 | 0.000 | 0.000 | 0.000 |
| 28 | 0.000 | −47.251 | −1.540 | −48.327 | 0.000 | 0.000 |
| 29 | 0.000 | 79.723 | −0.108 | 2.531 | 0.000 | 0.000 |

TABLE 19-continued

Lens data

| | | | | | | |
|---|---|---|---|---|---|---|
| 30 | 0.000 | −1.447 | 0.206 | 37.798 | 0.000 | 0.000 |
| 31 | 0.000 | −262.406 | 0.000 | −82.003 | 0.000 | 0.000 |

IMAGE DISPLAY SIZE

| | |
|---|---|
| X | 10.588 |
| Y | 5.956 |
| Fno | 2.778 |

TABLE 20

Aspherical (ASP) shape

| SURF. NO. | 4 | 5 |
|---|---|---|
| Y-ROC | 16.558 | 134.423 |
| CONIC CONST. | −4.6274E−01 | 0.0000E+00 |
| 4th | 3.5663E−06 | 3.3509E−05 |
| 6th | −1.5190E−08 | −4.8370E−08 |
| 8th | −1.5990E−10 | −1.1736E−09 |
| 10th | −1.0474E−12 | 1.5577E−12 |
| 12th | −1.6098E−14 | −1.8818E−14 |
| 14th | 6.3787E−17 | −4.2654E−16 |
| 16th | −9.5488E−19 | 2.3722E−18 |
| 18th | 0.0000E+00 | 0.0000E+00 |

| SURF. NO. | 23 | 24 |
|---|---|---|
| Y-ROC | 22936.630 | 49.689 |
| CONIC CONST. | 0.0000E+00 | 8.9769E−01 |
| 4th | 5.8692E−05 | 1.3989E−05 |
| 6th | −1.5007E−07 | −6.0118E−08 |
| 8th | 3.9306E−10 | 2.2356E−10 |
| 10th | −5.9303E−13 | 2.8975E−13 |
| 12th | 3.6232E−16 | −1.6049E−15 |
| 14th | 2.3528E−19 | 6.4116E−19 |
| 16th | −2.2609E−22 | 5.3528E−21 |
| 18th | 0.0000E+00 | 0.0000E+00 |

TABLE 21

Free-form surface (FFS) shape

| SURFACE NO. | 27 | 28 | 30 |
|---|---|---|---|
| Y-ROC | 96.004 | −47.943 | −29.749 |
| CONIC CONST. | 0.0000E+00 | −5.9097E−01 | 0.0000E+00 |
| X | 0.0000E+00 | 0.0000E+00 | 0.0000E+00 |
| Y | 0.0000E+00 | 0.0000E+00 | 0.0000E+00 |
| X**2 | −2.4673E−03 | 4.0312E−03 | −6.0000E−05 |
| X * Y | 0.0000E+00 | 0.0000E+00 | 0.0000E+00 |
| Y**2 | −4.9919E−03 | 2.3381E−02 | −2.5319E−03 |
| X**3 | 0.0000E+00 | 0.0000E+00 | 0.0000E+00 |
| X**2 * Y | −7.5095E−04 | −3.6000E−05 | −8.0000E−06 |
| X Y**2 | 0.0000E+00 | 0.0000E+00 | 0.0000E+00 |
| Y**3 | −2.0495E−04 | −5.3496E−04 | −2.5000E−05 |
| X**4 | −1.0000E−06 | −1.0000E−06 | −2.5975E−07 |
| X**3 * Y | 0.0000E+00 | 0.0000E+00 | 0.0000E+00 |
| X**2 * Y**2 | −1.1000E−05 | −1.6000E−05 | −1.0000E−06 |
| X * Y**3 | 0.0000E+00 | 0.0000E+00 | 0.0000E+00 |
| Y**4 | −5.0000E−06 | 1.3000E−05 | 2.0000E−06 |
| X**5 | 0.0000E+00 | 0.0000E+00 | 0.0000E+00 |
| X**4 * Y | 2.0000E−06 | 4.3563E−08 | −1.8697E−08 |
| X**3 * Y**2 | 0.0000E+00 | 0.0000E+00 | 0.0000E+00 |
| X**2 * Y**3 | 4.0000E−06 | 3.1597E−07 | 2.2403E−08 |
| X * Y**4 | 0.0000E+00 | 0.0000E+00 | 0.0000E+00 |
| Y**5 | −3.8550E−07 | −1.3910E−07 | 8.4472E−08 |
| X**6 | −1.1532E−07 | −5.2122E−08 | 1.9270E−10 |
| X**5 * Y | 0.0000E+00 | 0.0000E+00 | 0.0000E+00 |
| X**4 * Y**2 | −1.0000E−06 | 1.9374E−08 | −1.6402E−09 |
| X**3 * Y**3 | 0.0000E+00 | 0.0000E+00 | 0.0000E+00 |
| X**2 * Y**4 | −1.0000E−06 | 3.0248E−09 | 1.0207E−09 |
| X * Y**5 | 0.0000E+00 | 0.0000E+00 | 0.0000E+00 |

TABLE 21-continued

Free-form surface (FFS) shape

| SURFACE NO. | 27 | 28 | 30 |
|---|---|---|---|
| Y**6 | −1.5045E−07 | −1.3234E−10 | −4.0750E−09 |
| X ** 7 | 0.0000E+00 | 0.0000E+00 | 0.0000E+00 |
| X**6 * Y | −2.3277E−08 | 8.9648E−10 | −8.5838E−12 |
| X**5 * Y**2 | 0.0000E+00 | 0.0000E+00 | 0.0000E+00 |
| X**4 * Y**3 | −3.0759E−08 | −1.0348E−09 | 6.1237E−11 |
| X**3 * Y**4 | 0.0000E+00 | 0.0000E+00 | 0.0000E+00 |
| X**2 * Y**5 | −7.2911E−09 | 4.8437E−11 | 0.0000E+00 |
| X * Y**6 | 0.0000E+00 | 0.0000E+00 | 0.0000E+00 |
| Y**7 | 3.5132E−10 | 1.0747E−11 | 0.0000E+00 |
| X**8 | −7.5074E−11 | −1.5315E−10 | 0.0000E+00 |
| X**7 * Y | 0.0000E+00 | 0.0000E+00 | 0.0000E+00 |
| X** 6 * Y**2 | −9.3587E−10 | 5.1826E−12 | 0.0000E+00 |
| X** 5 * Y**3 | 0.0000E+00 | 0.0000E+00 | 0.0000E+00 |
| X ** 4 * Y**4 | 2.2495E−09 | 2.3704E−11 | 0.0000E+00 |
| X** 3 * Y**5 | 0.0000E+00 | 0.0000E+00 | 0.0000E+00 |
| X ** 2 * Y**6 | 1.3512E−09 | −8.6293E−12 | 0.0000E+00 |
| X * Y**7 | 0.0000E+00 | 0.0000E+00 | 0.0000E+00 |
| Y**8 | 1.1959E−10 | 5.5462E−14 | 0.0000E+00 |
| X**9 | 0.0000E+00 | 0.0000E+00 | 0.0000E+00 |
| X**8 * Y | 8.5214E−11 | 1.2665E−12 | 0.0000E+00 |
| X**7 * Y**2 | 0.0000E+00 | 0.0000E+00 | 0.0000E+00 |
| X**6 * Y**3 | 9.2407E−11 | 1.1151E−12 | 0.0000E+00 |
| X**5 * Y**4 | 0.0000E+00 | 0.0000E+00 | 0.0000E+00 |
| X**4 * Y**5 | −2.7850E−11 | −3.8622E−13 | 0.0000E+00 |
| X**3 * Y**6 | 0.0000E+00 | 0.0000E+00 | 0.0000E+00 |
| X**2 * Y**7 | −4.5033E−11 | 1.7609E−13 | 0.0000E+00 |
| X * Y**8 | 0.0000E+00 | 0.0000E+00 | 0.0000E+00 |
| Y**9 | 1.6716E−12 | −6.4899E−16 | 0.0000E+00 |
| X**10 | 1.0190E−12 | −2.8582E−13 | 0.0000E+00 |
| X**9 * Y | 0.0000E+00 | 0.0000E+00 | 0.0000E+00 |
| X**8 * Y**2 | 1.0316E−11 | 5.6832E−14 | 0.0000E+00 |
| X**7 * Y**3 | 0.0000E+00 | 0.0000E+00 | 0.0000E+00 |
| X**6 * Y**4 | 1.5491E−12 | −2.2496E−14 | 0.0000E+00 |
| X**5 * Y**5 | 0.0000E+00 | 0.0000E+00 | 0.0000E+00 |
| X**4 * Y**6 | −1.0756E−11 | 3.2248E−15 | 0.0000E+00 |
| X**3 * Y**7 | 0.0000E+00 | 0.0000E+00 | 0.0000E+00 |
| X**2 * Y**8 | −4.9476E−12 | −1.1617E−15 | 0.0000E+00 |
| X * Y**9 | 0.0000E+00 | 0.0000E+00 | 0.0000E+00 |
| Y**10 | −4.5915E−14 | −2.8405E−18 | 0.0000E+00 |

Tables 22 to 28 below show the corresponding values of the respective conditional expressions (1) to (4) in the Numerical Reference and the respective Numerical Examples 1 to 6.

TABLE 22

| | | | | | TOTAL OPTICAL SYSTEM | | | | |
|---|---|---|---|---|---|---|---|---|---|
| | OVR. LENGTH OF OPT. SYSTEM V1 | RECT. SIZE OF MAG. CONJ. POINT X (LONG. DIR.) V2 | Y V3 | IMAGING MAG. OF TOTAL OPT. SYSTEM X V4 | Y V5 | INTER. IMAGING NO. N V6 | PERIPHERAL LIGHT RAY Co V7 | V8 | Tr V9 |
| REF. | 202.71 | 7.26 | 9.07 | 186.53 | 186.49 | 1.00 | 62.95 | 1.96 | 0.26 |
| EX. 1 | 190.09 | 7.26 | 9.07 | 186.56 | 186.52 | 1.00 | 63.00 | 1.96 | 0.25 |
| EX. 2 | 177.64 | 7.26 | 9.07 | 186.52 | 186.47 | 1.00 | 62.96 | 1.96 | 0.26 |
| EX. 3 | 170.66 | 7.26 | 9.07 | 186.52 | 186.46 | 1.00 | 62.98 | 1.96 | 0.26 |
| EX. 4 | 168.35 | 7.26 | 9.07 | 186.48 | 186.46 | 1.00 | 63.19 | 1.98 | 0.25 |
| EX. 5 | 380.00 | 7.26 | 9.07 | −185.93 | −185.96 | 2.00 | 78.82 | 5.06 | 0.10 |
| EX. 6 | 160.07 | 5.29 | 5.96 | 166.61 | 166.74 | 1.00 | 71.82 | 3.05 | 0.16 |

TABLE 23

| | | PRISM | | |
|---|---|---|---|---|
| | MATERIAL GLASS V10 | Nd V11 | vd V12 | OPT. PATH LENGTH PRISM Z1F1 OPT. RAY V13 |
| REF. | SBAL12 | 1.53996 | 59.46 | 73.23 |
| EX. 1 | BACD14 | 1.60311 | 60.69 | 73.39 |
| EX. 2 | LAC12 | 1.67790 | 55.52 | 70.65 |
| EX. 3 | MTAC80 | 1.72903 | 54.04 | 68.98 |
| EX. 4 | MTAFD305 | 1.85135 | 40.10 | 60.65 |
| EX. 5 | MLAC14 | 1.69680 | 55.46 | 122.98 |
| EX. 6 | TAF3 | 1.80420 | 46.50 | 53.66 |

| | | SUB-OPTICS | | | |
|---|---|---|---|---|---|
| | IMAGING MAG. X V14 | Y V15 | PARAXIAL AMOUNT f V16 | S1 to FRONT PRINCPIAL POINT V17 | S1 to REAR PRINCPIAL POINT V18 |
| REF. | −1.95 | −1.93 | 47.94 | −49.10 | −126.99 |
| EX. 1 | −1.93 | −1.91 | 39.88 | −37.98 | −103.18 |
| EX. 2 | −1.86 | −1.84 | 32.65 | −27.09 | −80.99 |
| EX. 3 | −1.81 | −1.79 | 30.74 | −24.26 | −75.28 |
| EX. 4 | −1.66 | −1.63 | 34.46 | −34.30 | −82.49 |
| EX. 5 | 4.49 | 5.40 | −10.18 | 46.46 | −17.27 |
| EX. 6 | −2.92 | −2.59 | 29.73 | −15.91 | −114.18 |

TABLE 24

| | | SUB-OPTICS | | | | | |
|---|---|---|---|---|---|---|---|
| | PARAXIAL AMOUNT OBJ. DIST. V19 | BF V20 | P V21 | MATERIAL POS. LENS AVE. INDEX V22 | NEG. LENS AVE. INDEX V23 | POS. LENS AVE. ABV. V24 | NEG. LENS AVE. ABV. V25 |
| REF. | 23.30 | 14.90 | −0.0412 | 1.60091 | 1.80393 | 55.21 | 31.81 |
| EX. 1 | 22.45 | 14.14 | −0.0418 | 1.60091 | 1.80393 | 55.21 | 31.81 |
| EX. 2 | 22.98 | 12.86 | −0.0408 | 1.61337 | 1.81335 | 53.13 | 31.73 |
| EX. 3 | 23.30 | 11.59 | −0.0415 | 1.59963 | 1.81335 | 54.86 | 31.73 |
| EX. 4 | 20.74 | 9.66 | −0.0456 | 1.59626 | 1.83842 | 60.91 | 31.56 |
| EX. 5 | 38.24 | 25.36 | −0.0402 | 1.73600 | 1.79517 | 50.04 | 32.32 |
| EX. 6 | 23.46 | 7.28 | −0.0500 | 1.62202 | 1.92646 | 51.76 | 30.27 |

TABLE 25

| COND. | | COND. (1) $(V22 - (V6 - 1)/8)/V11{^2}$ | COND. (2) V11 | COND. (3) (V13/V5)/V7 | COND. (4) V22/V3 |
|---|---|---|---|---|---|
| CLAIM RANGE | UPPER LIMIT | 0.64 | 1.90 | 0.25 | −0.0020 |
| | LOWER LIMIT | 0.40 | 1.60 | 0.05 | −0.0100 |
| EXAMPLE RANGE | UPPER LIMIT | 0.62 | 1.85 | 0.17 | −0.0044 |
| | LOWER LIMIT | 0.47 | 1.60 | 0.11 | −0.0084 |
| REF. | | 0.68 | 1.54 | 0.13 | −0.0045 |
| EX. 1 | | 0.62 | 1.60 | 0.13 | −0.0046 |
| EX. 2 | | 0.57 | 1.68 | 0.12 | −0.0045 |
| EX. 3 | | 0.54 | 1.73 | 0.12 | −0.0046 |
| EX. 4 | | 0.47 | 1.85 | 0.11 | −0.0050 |
| EX. 5 | | 0.56 | 1.70 | 0.17 | −0.0044 |
| EX. 6 | | 0.50 | 1.80 | 0.13 | −0.0084 |

| COND. | | COND. (5) V14/V15 | COND. (6) V24 | COND. (7) V11/V22 × V24/V12 |
|---|---|---|---|---|
| CLAIM RANGE | UPPER LIMIT | 1.50 | 65.00 | 1.90 |
| | LOWER LIMIT | 0.50 | 45.00 | 0.70 |
| EXAMPLE RANGE | UPPER LIMIT | 1.13 | 60.91 | 1.76 |
| | LOWER LIMIT | 0.83 | 50.04 | 0.88 |
| REF. | | 1.01 | 55.21 | 0.89 |
| EX. 1 | | 1.01 | 55.21 | 0.91 |
| EX. 2 | | 1.01 | 53.13 | 1.00 |
| EX. 3 | | 1.01 | 54.86 | 1.10 |
| EX. 4 | | 1.02 | 60.91 | 1.76 |
| EX. 5 | | 0.83 | 50.04 | 0.88 |
| EX. 6 | | 1.13 | 51.76 | 1.24 |

TABLE 26

| COND. | | COND. (8) V22 | COND. (9) V12 | COND. (10) V24 |
|---|---|---|---|---|
| CLAIM RANGE | UPPER LIMIT | 1.75 | 65.00 | 65.00 |
| | LOWER LIMIT | 1.55 | 35.00 | 45.00 |
| EXAMPLE RANGE | UPPER LIMIT | 1.74 | 60.69 | 60.91 |
| | LOWER LIMIT | 1.60 | 40.10 | 50.04 |
| REF. | | 1.60 | 59.46 | 55.21 |
| EX. 1 | | 1.60 | 60.69 | 55.21 |
| EX. 2 | | 1.61 | 55.52 | 53.13 |
| EX. 3 | | 1.60 | 54.04 | 54.86 |
| EX. 4 | | 1.60 | 40.10 | 60.91 |
| EX. 5 | | 1.74 | 55.46 | 50.04 |
| EX. 6 | | 1.62 | 46.50 | 51.76 |

| COND. | | COND. (11) | | COND. (12) | COND. (13) |
|---|---|---|---|---|---|
| CLAIM RANGE | UPPER LIMIT | 45.000 | | 0.100 | 30.00 |
| | LOWER LIMIT | | 0.014 | 0.001 | 2.00 |
| EXAMPLE RANGE | UPPER LIMIT | 40.31 | | 0.037 | 16.28 |
| | LOWER LIMIT | | 0.05 | 0.002 | 8.18 |
| REF. | | 1.94 | 0.36 | 0.014 | 10.29 |
| EX. 1 | | 1.91 | 0.18 | 0.009 | 10.20 |
| EX. 2 | | 0.74 | 0.08 | 0.003 | 9.63 |
| EX. 3 | | 0.75 | 0.05 | 0.002 | 9.37 |
| EX. 4 | | 0.89 | 0.11 | 0.003 | 8.18 |
| EX. 5 | | 40.31 | 0.35 | 0.037 | 16.28 |
| EX. 6 | | 33.07 | 0.43 | 0.008 | 9.18 |

TABLE 27

INCIDENT AND EXIT ANGLE ON PRISM OPTICAL SURFACE (COND. 11)

| | | | REF. | EX. 1 | EX. 2 | EX. 3 |
|---|---|---|---|---|---|---|
| 1ST. TRANS. SURF. | REDUC. SIDE | MAX. | 2.878 | 1.988 | 4.742 | 3.549 |
| | | MIN. | 0.941 | 0.083 | 4.002 | 2.800 |
| | | DIF. | 1.937 | 1.905 | 0.740 | 0.749 |
| | MAG. SIDE | MAX. | 1.869 | 1.240 | 2.824 | 2.052 |
| | | MIN. | 0.611 | 0.052 | 2.384 | 1.619 |
| | | DIF. | 1.257 | 1.188 | 0.440 | 0.433 |
| 1ST. REF. SURF. | REDUC. SIDE | MAX. | 25.164 | 25.016 | 26.145 | 26.349 |
| | | MIN. | 24.713 | 24.834 | 25.795 | 25.987 |
| | | DIF. | 0.451 | 0.182 | 0.350 | 0.362 |
| | MAG. SIDE | MAX. | 25.164 | 25.016 | 26.145 | 26.349 |
| | | MIN. | 24.713 | 24.834 | 25.795 | 25.987 |
| | | DIF. | 0.451 | 0.182 | 0.350 | 0.362 |
| 2ND. REF. SURF. | REDUC. SIDE | MAX. | 57.340 | 57.811 | 59.672 | 60.085 |
| | | MIN. | 56.699 | 57.505 | 59.203 | 59.603 |
| | | DIF. | 0.641 | 0.306 | 0.469 | 0.482 |
| | MAG. SIDE | MAX. | 57.340 | 57.811 | 59.672 | 60.085 |
| | | MIN. | 56.699 | 57.505 | 59.203 | 59.603 |
| | | DIF. | 0.641 | 0.306 | 0.469 | 0.482 |
| 2ND. TRANS. SURF. | REDUC. SIDE | MAX. | 10.616 | 8.742 | 4.928 | 4.023 |
| | | MIN. | 10.261 | 8.525 | 4.846 | 3.976 |
| | | DIF. | 0.356 | 0.218 | 0.082 | 0.047 |
| | MAG. SIDE | MAX. | 16.482 | 14.102 | 8.288 | 6.967 |
| | | MIN. | 15.921 | 13.747 | 8.149 | 6.885 |
| | | DIF. | 1.035 | 0.355 | 0.139 | 0.082 |

TABLE 27-continued

INCIDENT AND EXIT ANGLE ON PRISM
OPTICAL SURFACE (COND. 11)

| | | | EX. 4 | EX. 5 | EX. 6 |
|---|---|---|---|---|---|
| 1ST. | REDUC. | MAX. | 3.270 | 12.587 | 4.638 |
| TRANS. | SIDE | MIN. | 2.381 | 10.732 | 2.347 |
| SURF. | | DIF. | 0.889 | 1.855 | 2.291 |
| | MAG. | MAX. | 1.765 | 7.379 | 2.569 |
| | SIDE | MIN. | 1.286 | 6.301 | 1.301 |
| | | DIF. | 0.480 | 1.078 | 1.268 |
| 1ST. | REDUC. | MAX. | 26.745 | 22.737 | 34.603 |
| REF. | SIDE | MIN. | 26.343 | 22.390 | 34.176 |
| SURF. | | DIF. | 0.403 | 0.348 | 0.428 |
| | MAG. | MAX. | 26.745 | 22.737 | 34.603 |
| | SIDE | MIN. | 26.343 | 22.390 | 34.176 |
| | | DIF. | 0.403 | 0.348 | 0.428 |
| 2ND. | REDUC. | MAX. | 61.007 | 71.454 | 61.351 |
| REF. | SIDE | MIN. | 60.552 | 31.142 | 28.283 |
| SURF. | | DIF. | 0.455 | 40.312 | 33.068 |
| | MAG. | MAX. | 61.007 | 71.454 | 61.351 |
| | SIDE | MIN. | 60.552 | 31.142 | 28.283 |
| | | DIF. | 0.455 | 40.312 | 33.068 |
| 2ND. | REDUC. | MAX. | 2.688 | 4.478 | 1.726 |
| TRANS. | SIDE | MIN. | 2.575 | 4.051 | 0.811 |
| SURF. | | DIF. | 0.113 | 0.427 | 0.915 |
| | MAG. | MAX. | 4.982 | 7.612 | 3.115 |
| | SIDE | MIN. | 4.771 | 6.884 | 1.463 |
| | | DIF. | 0.210 | 0.728 | 1.652 |

TABLE 28

PRISM OPTICAL PATH LENGTH (COND. 12)

| | | REF. | EX. 1 | EX. 2 | EX. 3 |
|---|---|---|---|---|---|
| TOTAL | MAX. | 76.256 | 75.605 | 71.346 | 69.434 |
| PRISM | MIN. | 76.151 | 75.537 | 71.326 | 69.419 |
| | DIF. | 0.105 | 0.068 | 0.021 | 0.015 |
| | r | 7.411 | 7.411 | 7.411 | 7.411 |
| | DIF./r | 0.014 | 0.009 | 0.003 | 0.002 |
| | MAX. OPT. PATH/r | 10.289 | 10.201 | 9.627 | 9.369 |

PRISM OPTICAL PATH LENGTH (COND. 12)

| | | EX. 4 | EX. 5 | EX. 6 |
|---|---|---|---|---|
| TOTAL | MAX. | 60.652 | 120.416 | 52.780 |
| PRISM | MIN. | 60.634 | 120.142 | 52.732 |
| | DIF. | 0.019 | 0.274 | 0.048 |
| | r | 7.411 | 7.396 | 5.752 |
| | DIF./r | 0.003 | 0.037 | 0.008 |
| | MAX. OPT. PATH/r | 8.184 | 16.280 | 9.175 |

In this embodiment, making the refractive index of the prism PM relatively larger allows the prism to be smaller in size, and thereby to project or image a larger screen with a shorter focus. Examples of high refractive index optical materials for prism PM include M-TAFD305 (Nd=1.85135, vd=40.10), M-TAFD307 (Nd=1.88202, vd=37.22), and M-FDS2 (Nd=2.00178, vd=19.32) manufactured by HOYA Co. Ltd., and K-VC91 (Nd=1.88660, vd=35.0), K-PSFn1 (Nd=1.90680, vd=21.2), K-PSFn202 (Nd=2.01960, vd=21.5), P-PSFn214P (Nd=2.14400, vd=17.8) manufactured by Sumita Optical Glass Co. Ltd., etc., can be used.

FIGS. 24A to 24G are graphs showing the shapes of the rectangular region and the concentric circle at the reduction conjugate point in Numerical Reference and Numerical Examples 1 to 6.

FIGS. 25A to 25G are graphs showing the shape of distortion at the conjugate point on the magnification side due to the distortion of the optical system according to the Numerical Reference and Numerical Examples 1 to 6. In each graph, the image size at the magnification conjugate point is 125 inches in Reference Examples and Examples 1 to 5, and 80 inches in Example 6. From these graphs, it can be seen that the distortion at the magnification conjugate point of the optical system 1 according to the Reference and Examples 1 to 6 is appropriately corrected.

Figure 26A:
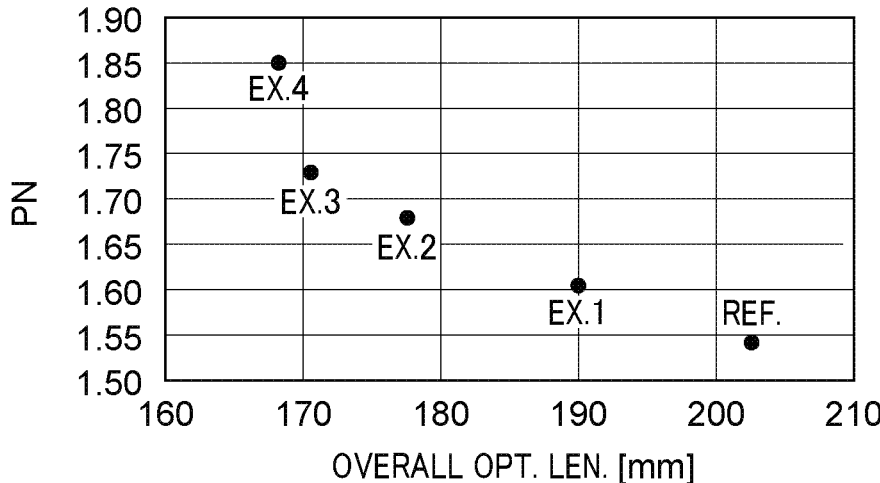
FIG. 26A is a graph showing a relationship between the refractive index of the prism PM and the overall optical length.
Figure 26B:
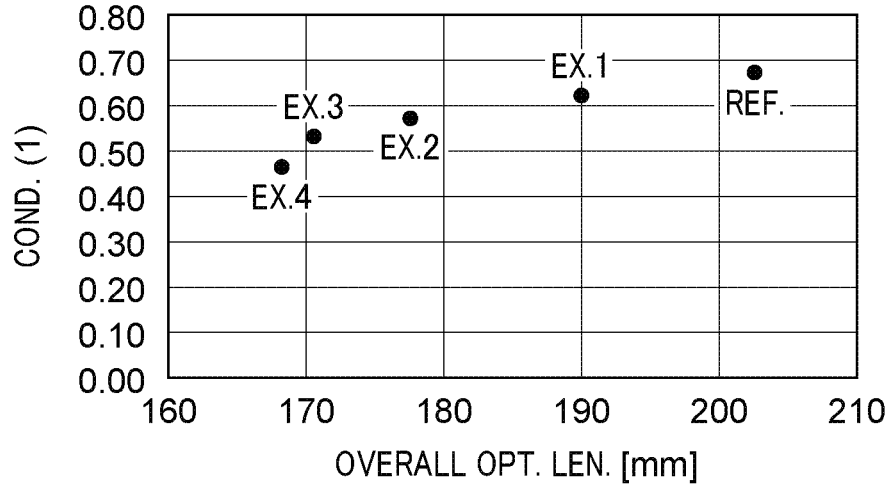
FIG. 26B is a graph showing a relationship between Expression (1) and the overall optical length.

FIG. 26A is a graph showing a relationship between the refractive index of the prism PM and the overall optical length from the reduction conjugate point to the prism PM in the optical system 1. FIG. 26B is a graph showing a relationship between Expression (1) and the overall optical length. Here, for easy understanding, Numerical Reference and Numerical Examples 1 to 4 each having a similar basic configuration of the optical system 1 are compared with each other.

First, as shown in FIG. 26A, it can be seen that, as the refractive index (d-line) of the prism PM increases as follows: 1.53996→1.60311→1.67790→1.72903→1.85135, the overall optical length decreases as follows: about 203 mm→about 190 mm→about 178 mm→about 170 mm→about 168 mm.

Next, as shown in FIG. 26B, when the numerical value of the following Expression (1) is calculated for Numerical Reference and Numerical Examples 1 to 4, obtained are 0.68 for Reference, 0.62 for Example 1, and 0.57 for Example 2, 0.54 for Example 3, and 0.47 for Example 4. Therefore, it can be seen that since Examples 1 to 4 satisfy equation (1), the overall optical length becomes smaller than that of Reference.

$$0.40 < (TN - ((NI-1)/8))/PN^2 < 0.64 \tag{1}$$

The optical surfaces forming the prism PM according to the embodiment of the present disclosure are eccentrically arranged with respect to each other. The coordinate origin of the optical surface forming the first transmission surface T1 is located on the extension line of the reference optical axis A, and the coordinate origins of the respective optical surfaces forming the first reflection surface R1 and the second reflection surface R2 and the second transmission surface T2 are not located on the extension line of the reference optical axis A. As for each of the optical surfaces in Reference and Examples 1 to 4 and Example 6, in the YZ cross-section, the first transmission surface T1 has a coordinate origin on the extension line of the reference optical axis A, and the first reflection surface R1 is located below the extension line of the reference optical axis A, and the second reflection surface R2 and the second transmission surface T2 are located above the reference optical axis A. As for each of the optical surfaces in Example 5, in the YZ cross-section, the first transmission surface T1 has a coordinate origin on the extension line of the reference optical axis A, and the first reflection surface R1, the second reflection surface R2 and the second transmission surface T2 are located below the reference optical axis A. Here, the coordinate origin of the optical surface of the first transmission surface T1 does not need to be located on the extension line of the reference optical axis A, and may be eccentrically located above or below the reference optical axis A. The coordinate origin of each optical surface may be located on the extension line of the reference optical axis A. Further, when each optical surface forming the prism PM is formed of a rotationally asymmetric free-form surface, the coordinate origin of each optical surface may be eccentrically located, thereby further enhancing the effect of shortening the projection distance and downsizing.

The prism PM according to the embodiment of the present disclosure has a shape symmetrical only with respect to the YZ cross-section. By making the prism PM symmetrical with respect to the YZ cross-section, a reference plane during molding and assembly can be easily defined, and the efficiency of design work, such as optical design and lens barrel design, is improved.

Even when the prism PM is configured with a spherical or aspherical optical surface having a rotationally symmetrical axis, similar effects can be obtained within the range of conditional Expressions (1) and (2). The same applies to some cases, for example, where the coordinate origin of each of the optical surfaces constituting the prism PM is located on the extension line of the reference optical axis A, and where the coordinate origin of each of the optical surfaces constituting the prism PM is eccentrically located away from the extension line of the reference optical axis A. Further, even greater effects can be obtained where each of the optical surfaces of the prism PM is formed of a rotationally asymmetric free-form surface.

Second Embodiment

Figure 27:
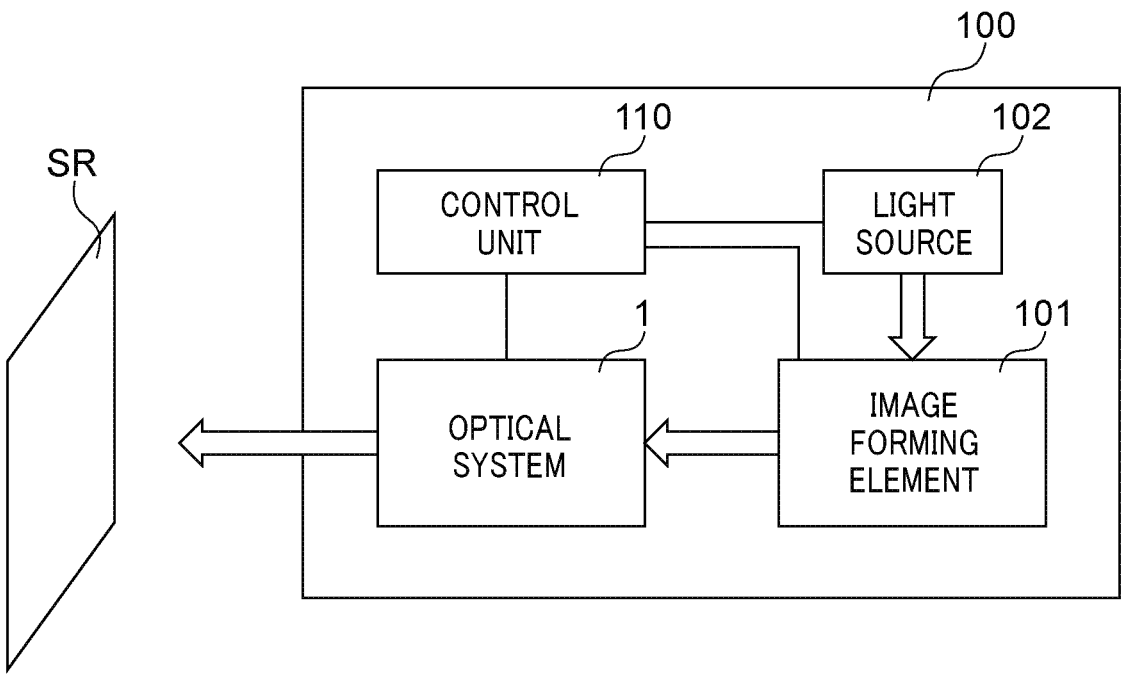
FIG. 27 is a block diagram showing an example of the image projection apparatus according to the present disclosure.

Hereinafter, a second embodiment of the present disclosure is described with reference to FIG. 27. FIG. 27 is a block diagram showing an example of the image projection apparatus according to the present disclosure. The image projection apparatus 100 includes such an optical system 1 as disclosed in First Embodiment, an image forming element 101, a light source 102, a control unit 110, and others. The image forming element 101 is constituted of, for example, liquid crystal or DMD, for generating an image to be projected through the optical system 1 onto a screen SR. The light source 102 is constituted of, for example, light emitting diode (LED) or laser, for supplying light to the image forming element 101. The control unit 110 is constituted of, for example, central processing unit (CPU) or micro-processing unit (MPU), for controlling the entire apparatus and respective components. The optical system 1 may be configured as either an interchangeable lens that can be detachably attached to the image projection apparatus 100 or a built-in lens that is integrated in the image projection apparatus 100.

The image projection apparatus 100 including the optical system 1 according to First Embodiment can realize projection with a shorter focal length and a larger-sized screen.

Third Embodiment

Figure 28:
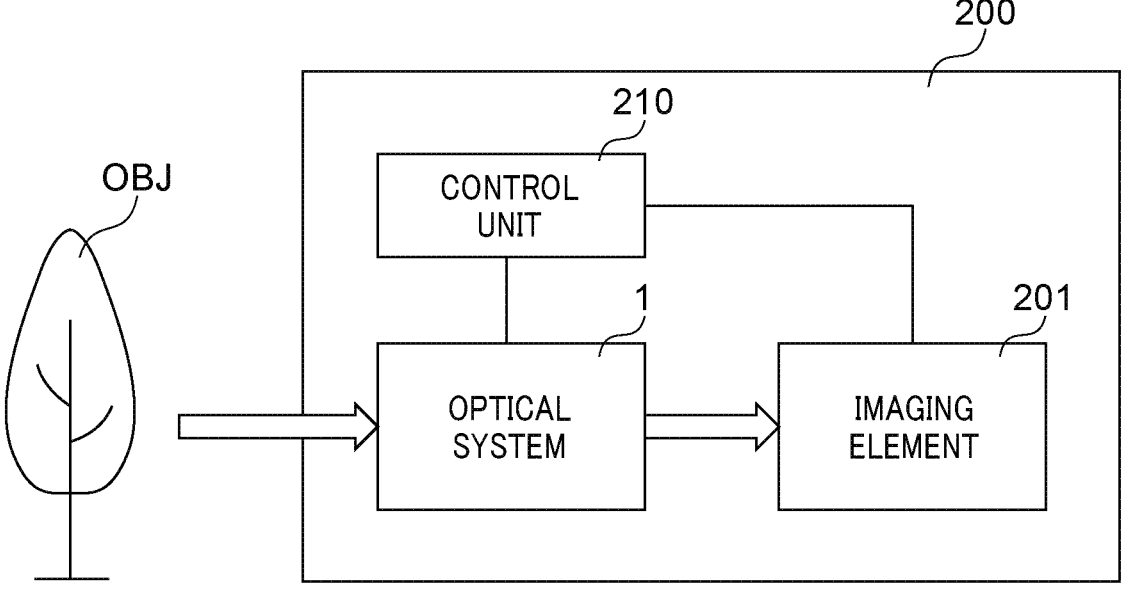
FIG. 28 is a block diagram showing an example of the imaging apparatus according to the present disclosure.

Hereinafter, a third embodiment of the present disclosure is described with reference to FIG. 28. FIG. 28 is a block diagram showing an example of the imaging apparatus according to the present disclosure. The imaging apparatus 200 includes such an optical system 1 as disclosed in First Embodiment, an imaging element 201, a control unit 210, and others. The imaging element 201 is constituted of, for example, charge coupled device (CCD) image sensor or complementary metal oxide semiconductor (CMOS) image sensor, for receiving an optical image of an object OBJ formed by the optical system 1 to convert the image into an electrical image signal. The control unit 110 is constituted of, for example, CPU or MPU, for controlling the entire apparatus and respective components. The optical system 1 may be configured as either an interchangeable lens that can be detachably attached to the imaging apparatus 200 or a built-in lens that is integrated in the imaging apparatus 200.

The imaging apparatus 200 including the optical system 1 according to First Embodiment can realize imaging with a shorter focal length and a larger-sized screen.

As described above, the embodiments have been described to disclose the technology in the present disclosure. To that end, the accompanying drawings and detailed description are provided.

Therefore, among the components described in the accompanying drawings and the detailed description, not only the components that are essential for solving the problem, but also the components that are not essential for solving the problem may also be included in order to exemplify the above-described technology. Therefore, it should not be directly appreciated that the above non-essential components are essential based on the fact that the non-essential components are described in the accompanying drawings and the detailed description.

Further, the above-described embodiments have been described to exemplify the technology in the present disclosure. Thus, various modification, substitution, addition, omission and so on can be made within the scope of the claims or equivalents thereof.

INDUSTRIAL APPLICABILITY

The present disclosure can be applied to image projection apparatuses such as projectors and head-up displays, and imaging apparatuses such as digital still cameras, digital video cameras, surveillance cameras in surveillance systems, web cameras, and onboard cameras. In particular, the present disclosure can be applied to optical systems that require a high image quality, such as projectors, digital still camera systems, and digital video camera systems.

The invention claimed is:

1. An optical system having a reduction conjugate point having a rectangular region on a reduction side and a magnification conjugate point having a rectangular region on a magnification side, and internally having an intermediate imaging position having a conjugate relationship with each of the reduction conjugate point and the magnification conjugate point, the optical system including:

a prism provided on the magnification side, the prism formed of a transparent medium; and a sub-optical system provided between the reduction conjugate point and the prism, the sub-optical system including a plurality of optical elements and an aperture stop, wherein the prism includes a first transmission surface positioned on the reduction side, a second transmission surface positioned on the magnification side, and at least one reflection surface positioned on an optical path between the first transmission surface and the second transmission surface, wherein the aperture stop is positioned between the reduction conjugate point and the intermediate imaging position, wherein a first reflection surface closest to the first transmission surface on the optical path in the prism has a shape with a concave surface facing a direction into which a light ray made incident on the first reflection surface is reflected, wherein the second transmission surface has a shape with a convex surface facing the magnification side, wherein a part or the whole of an intermediate image formed at the intermediate imaging position is positioned inside a medium of the prism, and wherein the following Expression (1) or Expression (2) is satisfied:

$$0.40 < (TN - ((NI - 1)/8))/PN^2 < 0.64 \qquad (1)$$

$$PN > 1.60 \qquad (2)$$

where TN represents an average of d-line refractive indexes of positive lenses included in the sub-optical system, NI represents the number of intermediate images, and PN represents a line refractive index of the prism.

2. The optical system according to claim 1, wherein the intermediate image positioned inside the medium of the prism is present only between the first transmission surface and the first reflection surface.

3. The optical system according to claim 1, wherein the reduction conjugate point has an image-forming relationship in a rectangular region having a longitudinal direction and a lateral direction; and a plane including a position where a principal ray passing through the center in the longitudinal direction of the rectangular region is reflected by the first reflection surface is defined as a Y cross-section, a cross-section perpendicular to the Y cross-section is defined as an X cross-section, and the curvature shape of the first reflection surface is set so that, when viewed from a direction perpendicular to the Y cross-section, some of a plurality of principal rays passing through the reduction conjugate point intersect with each other on an optical path between the first reflection surface and the second transmission surface, and so that, when viewed from a direction perpendicular to the X cross-section, some of a plurality of principal rays passing through the reduction conjugate point intersect with each other on an optical path between the first reflection surface and the second transmission surface.

4. The optical system according to claim 2, wherein the following Expression (3) is satisfied:

$$0.05 < (LP/YI)/((|\theta a| + |\theta b|)/2) < 0.25 \qquad (3)$$

where LP represents an optical path length of a principal ray of a reference light ray passing through the prism, YI represents a maximum image height in the Y-direction along the Y cross-section from the center of the rectangular region of the reduction conjugate point, and θa, θb represent incident angles of two peripheral light rays that form an image at the magnification conjugate point with reference to the principal ray of the reference light ray.

5. The optical system according to claim 1, wherein the following Expression (4) is satisfied:

$$-0.0100 < Tp/YI < -0.0020 \qquad (4)$$

where Tp represents a Petzval sum of the sub-optical system, and YI represents a maximum image height in the Y-direction along the Y cross-section from the center of the rectangular region of the reduction conjugate point.

6. The optical system according to claim 1, wherein the following Expression (5) is satisfied:

$$0.50 < XMM/YMM < 1.50 \qquad (5)$$

where XMM represents an X-direction imaging magnification at the intermediate imaging position with respect to the reduction conjugate point, and YMM represents a Y-direction imaging magnification at the intermediate imaging position with respect to the reduction conjugate point.

7. The optical system according to claim 2, wherein the following Expression (6) is satisfied:

$$45 < Tv < 65 \qquad (6)$$

where Tv represents an average of Abbe numbers of positive lenses included in the sub-optical system.

8. The optical system according to claim 2, wherein the following Expression (7) is satisfied:

$$0.70 < (PN/TN) \times (Tv/Pv) < 1.90 \qquad (7)$$

where Pv represents an Abbe number of the prism, and Tv represents an average of Abbe numbers of positive lenses included in the sub-optical system.

9. The optical system according to claim 2, wherein the following Expression (8) is satisfied:

$$1.55 < TN < 1.75. \qquad (8)$$

10. The optical system according to claim 2, wherein the following Expression (9) is satisfied:

$$35 < Pv < 65 \qquad (9)$$

where Pv represents an Abbe number of the prism.

11. The optical system according to claim 2, wherein the following Expression (10) is satisfied:

$$45 < Pv < 65 \qquad (10)$$

where Tv represents an average of Abbe numbers of positive lenses included in the sub-optical system.

12. The optical system according to claim 2, wherein at least any one of the first transmission surface, the second transmission surface, and the at least one reflection surface of the prism includes a rotationally asymmetric surface.

13. The optical system according to claim 2, wherein the prism includes a prism main body integrally molded with a single refractive index material, and a coating.

14. The optical system according to claim 2, wherein the sub-optical system includes a plurality of rotationally symmetric lens elements, and when an axis passing through at least two centers of the rotationally symmetric lens elements is defined as a reference optical axis, at least one optical surface among an optical surface group consisting of the first transmission surface, the second transmission surface, and the at least one reflection surface of the prism is formed so that in a plane perpendicular to the reference optical axis, a maximum angle θmax and a minimum angle θmin of an angle at which a principal ray of light rays having an image-forming relationship on a concentric circle centered on an intersection of the reference optical axis and a reduction conjugate point of the rectangular region intersects with a normal line of a plane at a position where the principal ray is made incident on the optical surface satisfy the following Expression (11):

$$0.014° < |\theta\text{max}| - |\theta\text{min}| < 45.000°. \tag{11}$$

15. The optical system according to claim 1, wherein the sub-optical system includes a plurality of rotationally symmetric lens elements, and when an axis passing through at least two centers of the rotationally symmetric lens elements is defined as a reference optical axis, and when a principal ray of a light ray has an image forming relationship on a concentric circle centered on an intersection of the reference optical axis and a reduction conjugate point of the rectangular region in a plane perpendicular to the reference optical axis, the maximum optical path length Lmax of the optical path through which the principal ray passes through the inside of the prism satisfies the following Expression (13) using the radius r of the concentric circle:

$$2 < L\text{max}/r < 30. \tag{13}$$

16. The optical system according to claim 15, wherein a maximum optical path length difference ΔLmax of an optical path through which the principal ray passes through the inside of the prism satisfies the following Expression (12) using a radius r of the concentric circle:

$$0.001 < \Delta L\text{max}/r < 0.100. \tag{12}$$

17. The optical system according to claim 2, wherein the optical system has a reduction conjugate point on the reduction side and a magnification conjugate point on the magnification side and internally has one intermediate imaging position, the intermediate imaging position having a conjugate relationship with each of the reduction conjugate point and the magnification conjugate point, and the following Expression (14) is satisfied:

$$0.80 < TN/PN < 1.01. \tag{14}$$

18. An image projection apparatus comprising:

the optical system according to claim 2; and an image forming element that generates an image to be projected through the optical system onto a screen.

19. An imaging apparatus comprising:

the optical system according to claim 2; and an imaging element that receives an optical image formed by the optical system to convert the optical image into an electrical image signal.

* * * * *